United States Patent [19]
Shinjo et al.

[11] Patent Number: 5,604,613
[45] Date of Patent: Feb. 18, 1997

[54] LIQUID CRYSTAL DISPLAY DEVICE WITH PIXELS HAVING STRIPE-SHAPED PROJECTIONS WITH EQUAL HEIGHTS

[75] Inventors: Katsuhiko Shinjo, Isehara; Tetsuya Kaneko; Shuzo Kaneko, both of Yokohama; Takeo Tsukamoto, Atsugi, all of Japan

[73] Assignee: Canon Kabushiki Kaisha, Tokyo, Japan

[21] Appl. No.: 452,019

[22] Filed: May 26, 1995

Related U.S. Application Data

[62] Division of Ser. No. 099,054, Jul. 29, 1993, Pat. No. 5,495,352.

[30] Foreign Application Priority Data

| Jul. 30, 1992 | [JP] | Japan | 4-222287 |
| Jul. 30, 1992 | [JP] | Japan | 4-222288 |
| Jul. 30, 1992 | [JP] | Japan | 4-222289 |
| Dec. 28, 1992 | [JP] | Japan | 4-348689 |

[51] Int. Cl.$^6$ ............................ G02F 1/1343; G02F 1/13
[52] U.S. Cl. ........................................ 349/147; 349/184
[58] Field of Search ........................... 359/56, 54, 74, 359/87, 100

[56] References Cited

U.S. PATENT DOCUMENTS

| 4,712,877 | 12/1987 | Okada et al. | 350/350 S |
| 4,763,994 | 8/1988 | Kaneko et al. | 350/336 |
| 4,765,720 | 8/1988 | Toyono et al. | 350/350 |

(List continued on next page.)

FOREIGN PATENT DOCUMENTS

| 0219479 | 4/1987 | European Pat. Off. . |
| 240010 | 10/1987 | European Pat. Off. . |
| 0353760 | 2/1990 | European Pat. Off. . |
| 0374865 | 6/1990 | European Pat. Off. . |
| 58-02821 | 1/1983 | Japan . |
| 59-193427 | 11/1984 | Japan . |
| 61-166590 | 7/1986 | Japan . |
| 62-131225 | 6/1987 | Japan . |

(List continued on next page.)

OTHER PUBLICATIONS

"Preparation of core-shell particles having a hydrogel layer, and surface characteristics thereof," Polymer Preprints, Japan, vol. 40, No. 11, pp. 4090–4092 (1991).
Patent Abstracts of Japan, vol. 015, No. 198 (P-1204) May 22, 1991 & JP-A-03 048 819 (Matsushita) Mar. 1, 1991 * Whole document*.
Patent Abstracts of Japan, vol. 016, No. 390 (P-1405) Aug. 19, 1992 & JP-A-04 127 124 (Asahi Chem) Apr. 28, 1992 *Whole document*.
Database WPI, Section Ch, Week 8827, Derwent Publications Ltd., AN 88-185 314 & JP-A-63 121 020 (Canon KK) May 25, 1988 *Abstract*.
Patent Abstracts of Japan, vol. 012, No. 180 (P-709) May 27, 1988 & JP-A-62 291 620 (Canon Inc.) Dec. 18, 1987 *Abstract*.

*Primary Examiner*—William L. Sikes
*Assistant Examiner*—Charles Miller
*Attorney, Agent, or Firm*—Fitzpatrick, Cella, Harper & Scinto

[57] ABSTRACT

A liquid crystal display device is constituted by a pair of oppositely disposed substrates each having a plurality of opposing electrodes, and a ferroelectric liquid crystal disposed between the substrates so as to form a plurality of pixels each composed by a combination of a pair of the opposing electrodes and the ferroelectric liquid crystal disposed therebetween. Each pixel is provided with regions of different polarity inversion threshold voltages, and at least one of the pair of opposing electrodes is provided with a plurality of regions having unevennesses at different densities including a region with a higher density of unevennesses corresponding to a region of a lower polarity inversion threshold voltage and a region with a lower density of unevennesses corresponding to a region of a higher polarity inversion threshold voltage.

23 Claims, 40 Drawing Sheets

U.S. PATENT DOCUMENTS

| | | | |
|---|---|---|---|
| 4,773,737 | 9/1988 | Yokono et al. | 350/339 |
| 4,796,980 | 1/1989 | Kaneko et al. | 350/350 |
| 4,815,823 | 3/1989 | Kaneko | 350/336 |
| 4,818,078 | 4/1989 | Mouri et al. | 350/350 |
| 4,824,218 | 4/1989 | Kuno et al. | 350/350 |
| 4,861,143 | 8/1989 | Yamazaki et al. | 350/350 S |
| 4,906,072 | 3/1990 | Kaneko et al. | 350/333 |
| 4,938,574 | 7/1990 | Kaneko et al. | 350/350 |
| 4,958,912 | 9/1990 | Inaba et al. | 350/333 |
| 5,009,489 | 4/1991 | Eguchi et al. | 350/341 |
| 5,095,378 | 3/1992 | Suzuki | 359/62 |
| 5,124,695 | 6/1992 | Green | 340/784 |
| 5,157,524 | 10/1992 | Dijon et al. | 359/54 |
| 5,251,050 | 10/1993 | Kurematsu et al. | 359/57 |
| 5,257,122 | 10/1993 | Dubul et al. | 359/75 |
| 5,327,272 | 7/1994 | Fujwara et al. | 359/75 |
| 5,495,352 | 2/1996 | Shinjo et al. | 359/54 |

FOREIGN PATENT DOCUMENTS

| | | |
|---|---|---|
| 62-291620 | 12/1987 | Japan . |
| 64-33521 | 2/1989 | Japan . |
| 64-77023 | 3/1989 | Japan . |
| 3154030 | 7/1991 | Japan . |
| 4127124 | 4/1992 | Japan . |
| 4296821 | 10/1992 | Japan . |

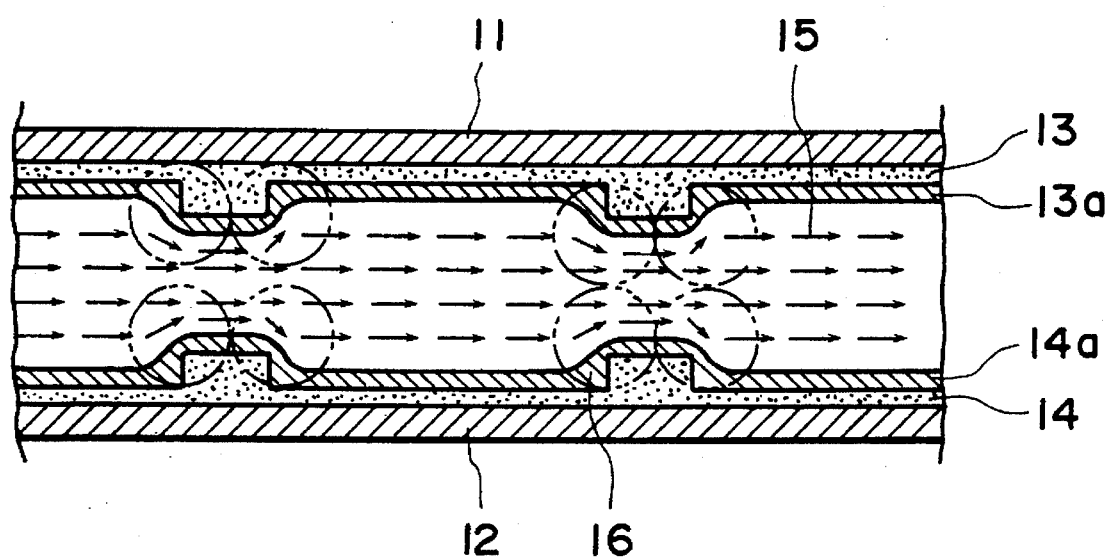
F I G. 1

(a)

(b)

(c)

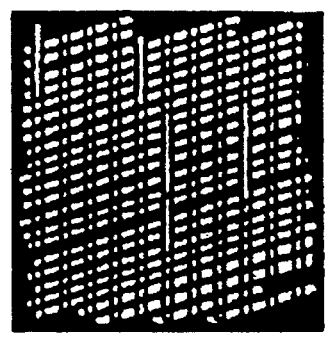
(a)
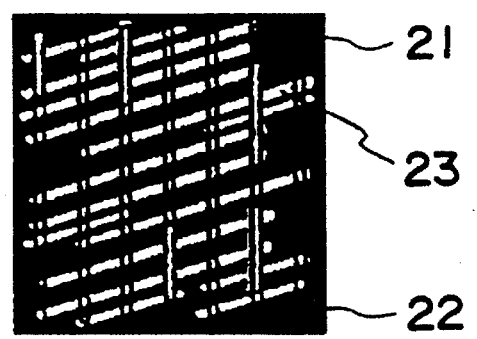
(b)
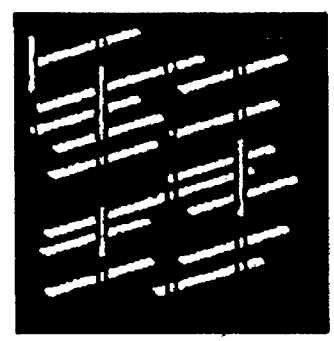
(c)
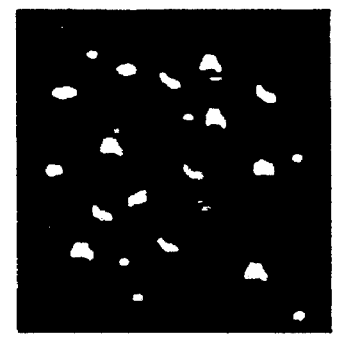
(d)
F I G. 14

(a)

(b)

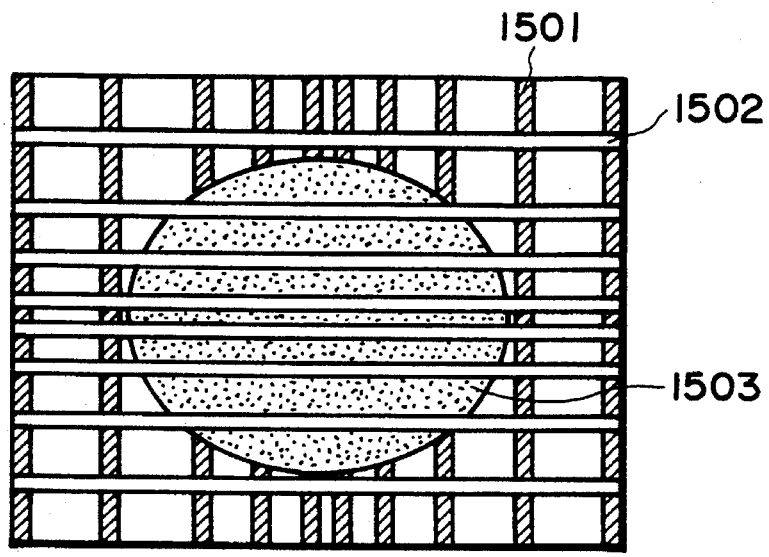
F I G. 35
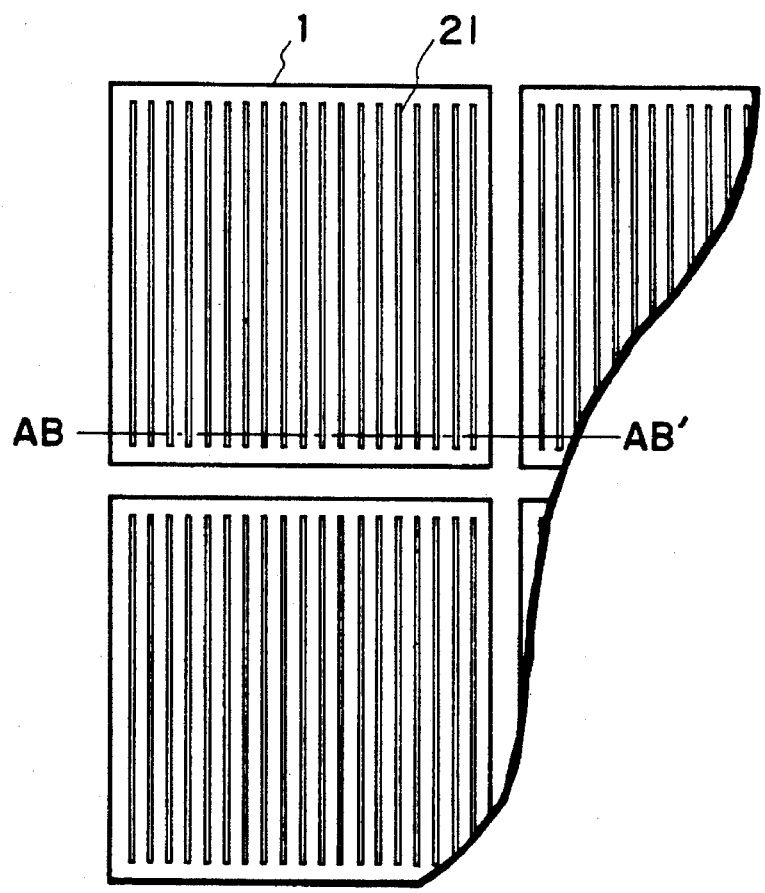
F I G. 36

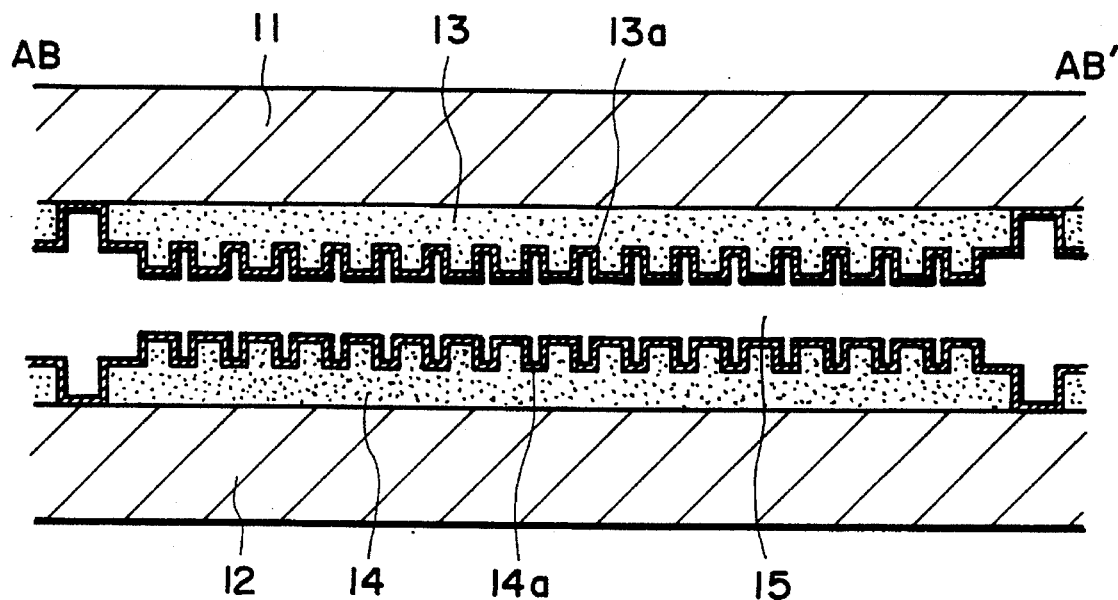
F I G. 37
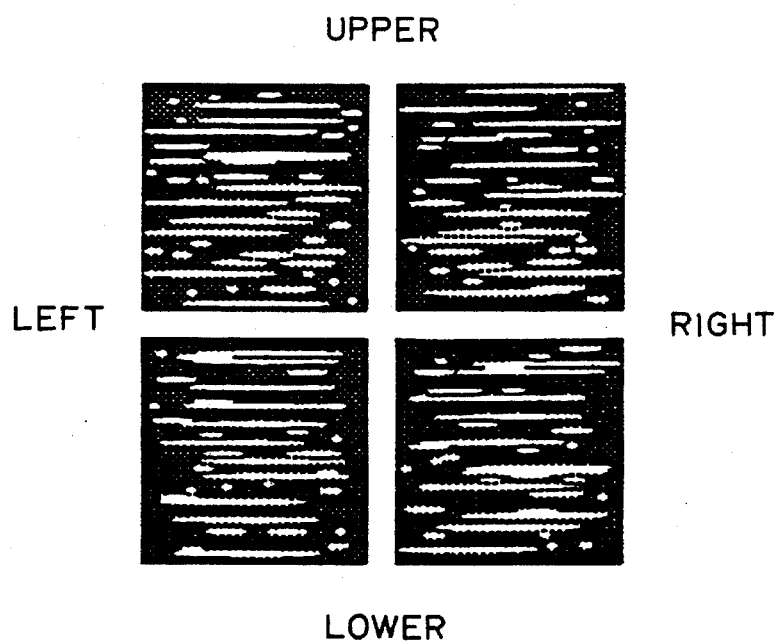
F I G. 38

(a)

(b)

(a)
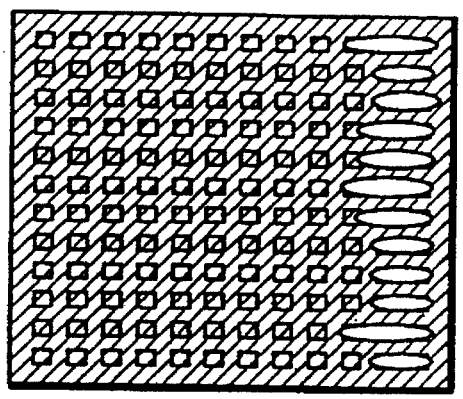
(b)
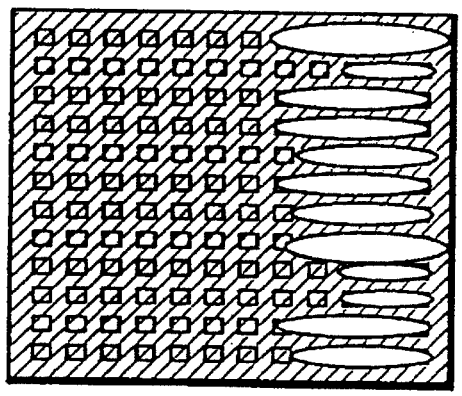
(c)
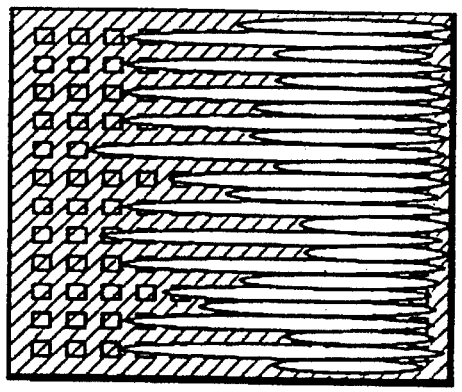
←—— GRADIENT DIRECTION ——→
F I G. 44

STRIPE DIRECTION (a) 16V (b) 17V (c) 18V (d) 19V (a) 16V
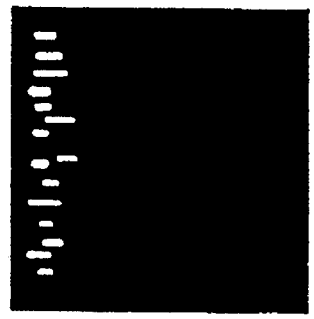
(b) 18V
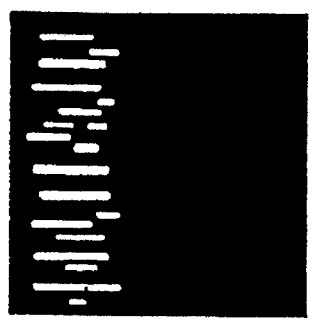
(c) 20V
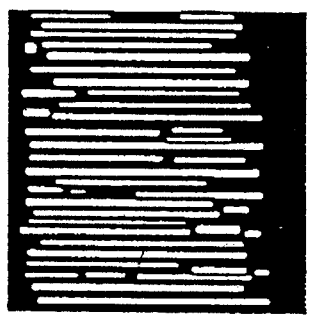
(d) 22V
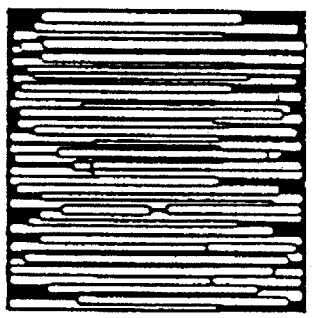
F I G. 51 ered by Kaneko et al. In this method, an
LIQUID CRYSTAL DISPLAY DEVICE WITH PIXELS HAVING STRIPE-SHAPED PROJECTIONS WITH EQUAL HEIGHTS This application is a division of application Ser. No. 08/099,054, filed Jul. 29, 1993 now U.S. Pat. No. 5,495,352.

FIELD OF THE INVENTION AND RELATED ART

The present invention relates to a liquid crystal device for use in a display apparatus, such as a television receiver, a computer terminal, a video camera view finder, etc., particularly a liquid crystal device with an improved gradational display characteristic.

As an example of conventional liquid crystal display device, there is known a liquid crystal display device based on an active matrix drive scheme using a TN (twisted nematic) liquid crystal. In this type of device, thin film transistors (TFT) are disposed each at a pixel and in a matrix as a whole. For driving, a drive pulse is applied to the gate of a TFT to make the source-drain conductive to accumulate an image signal applied through the source at a capacitor on the drain side, so that the TN-liquid crystal molecules at a pixel change their orientation depending on the accumulated image signal to change the transmittance of light therethrough. As a result, a gray-scale (gradational) display can be effected by modulating the voltage of the image signal.

A device of such an active matrix drive scheme using a TN-liquid crystal however requires a matrix arrangement of TFTs each having a complicated structure and requiring a large number of production steps, thus requiring a high production cost. Further, it is difficult to form a thin semiconductor film of poly-crystalline silicon or amorphous silicon constituting TFTs with a uniform characteristic over a wide area.

On the other hand, as an inexpensively producible liquid crystal display device, one of the passive matrix drive scheme using a TN-liquid crystal is known. In this type of liquid crystal display device (panel), however, the proportion of time (duty factor) in which a selected pixel receives an effective electric field during one picture (frame) scanning decreases at a rate of 1/N as the number (N) of scanning lines constituting the panel increases. Accordingly, there are involved difficulties such that crosstalk occurs and a high contrast image cannot be obtained. Further, as the duty factor decreases, it becomes difficult to control the gradation of each pixel by voltage modulation. In this way, it is difficult to regard the liquid crystal display device of the passive matrix scheme using TN-liquid crystal as a display device with a large number of lines at a high density, such as a liquid crystal television panel.

On the other hand, as a device solving such a basic problem of a conventional TN-liquid crystal, there is also known a liquid crystal device using a ferroelectric liquid crystal showing bistability. Since liquid crystal molecules in the ferroelectric liquid crystal device ideally tend to be stabilized in either one of the two table states and do not assume an intermediate position, the ferroelectric liquid crystal device has been considered to be unsuitable for gradational display. For this reason, gradational display using a ferroelectric liquid crystal device has relied on a digital technique such as a pixel division scheme.

In such a gradational display method using a digital technique as described above, one frame is divided into a plurality of sub-frames each composed of plural pixels and, during one frame of writing, respective pixels within a sub-frame are supplied with electric fields of different duty factors for driving. In this case, in order to obtain a large number of gradation levels, one sub-frame has to be composed of an increased number of pixels, so that the duty factor of each pixel is made considerably small as the display screen becomes large. Accordingly, the liquid crystal material is required to show a high-speed responsiveness in order to obtain a high contrast. Further, one sub-frame requires a large number of driving electrodes for the gradational display. Further, a complicated operation circuit is required. These technical requirements may be too many in order to adopt the gradational display method for a display apparatus of a large number of gradation levels, such as a high-definition television (HDTV) set.

Other gradational display schemes using a ferroelectric liquid crystal (FLC) have been proposed by Japanese Laid-Open Patent Applications (JP-A) 59-193427, 61-166590, 62-131225, 64-77023, etc.

One suitable method of gradational display using an optical modulation material inclusive of a ferroelectric liquid crystal has been disclosed in U.S. Pat. No. 4,796,980 entitled "FERROELECTRIC LIQUID CRYSTAL OPTICAL MODULATION DEVICE WITH REGIONS WITHIN PIXELS TO INITIATE NUCLEATION AND INVERSION" and issued to Kaneko et al. In this method, an inverted region and a non-inverted region are formed within a pixel, and the transmittance through the pixel is controlled based on the areal ratio between the regions. In order to form a locally inverted region, an alignment film having different uniaxial alignment control forces is used, or locally different electric fields are applied within a pixel.

When a ferroelectric liquid crystal is used in this method, however, it is necessary to control the applied voltages at a very high accuracy since the ferroelectric liquid crystal has a steep threshold characteristic. Further, there is a tendency that the position and the direction of growth of a polarity inversion region (domain) locally occurring within a pixel depending on an applied voltage are at random, so that it is not easy to obtain a linear voltage-transmittance characteristic.

Further, because of the temperature-dependence of the inversion threshold of a ferroelectric liquid crystal, a desired gradation cannot be reproduced as required in some cases. Further, it has been also found that a display image is affected by a previously displayed image and an improved reproducibility is required also in this respect.

SUMMARY OF THE INVENTION

In view of the above-mentioned technical problems, an object of the present invention is to provide a liquid crystal display device with a simple structure yet which is capable of realizing a larger number of gradation levels than before.

Another object of the present invention is to provide a liquid crystal display device capable of easily realizing a linear voltage-transmittance characteristic and a stable gradational display.

A further object of the present invention is to provide a liquid crystal display device with excellent temperature characteristics and excellent image display reproducibility.

According to the present invention, there is provided a liquid crystal display device, comprising: a pair of oppositely disposed substrates each having a plurality of opposing electrodes, and a ferroelectric liquid crystal disposed between the substrates so as to form a plurality of pixels each composed by a combination of a pair of the opposing electrodes and the ferroelectric liquid crystal disposed therebetween;

wherein each pixel is provided with regions of different polarity inversion threshold voltages, and at least one of said pair of opposing electrodes is provided with a plurality of regions having unevennesses at different densities including a region with a higher density of unevennesses corresponding to a region of a lower polarity inversion threshold voltage and a region with a lower density of unevennesses corresponding to a region of a higher polarity inversion threshold voltage.

According to another aspect of the present invention, there is provided a liquid crystal display device, comprising a pair of opposing electrodes and a ferroelectric liquid crystal disposed between the opposing electrodes; wherein at least one of the opposing electrodes is provided with a means for causing a lowering in polarity inversion threshold voltage of the ferroelectric liquid crystal in the form of a line, and at least one of the opposing electrodes is provided with a means for causing a change in shape of a polarity-inverted region in direction of the line of lowered polarity inversion threshold voltage.

According to another aspect of the present invention, there is provided a liquid crystal device, comprising a plurality of pixels each comprising a pair of opposing electrodes, and a ferroelectric smectic liquid crystal disposed between the opposing electrodes so as to develop bistable states, the liquid crystal device being equipped with a halftone signal application means for applying a halftone signal between the opposing electrodes, each pixel being provided with locally different inversion threshold voltages so as to develop a polarity-inverted region corresponding to the halftone signal in a stripe pattern substantially parallel to smectic layers of the liquid crystal.

According to another aspect of the present invention, there is provided a liquid crystal device, comprising a plurality of pixels each comprising a pair of opposing electrodes, and a ferroelectric smectic liquid crystal disposed between the opposing electrodes so as to develop bistable states, wherein at least one of the opposing electrodes is provided with stripe-shaped unevennesses extending in a direction such that said direction forms acute angles with two molecular orientation directions in the bistable states of the liquid crystal, the smallest one of the acute angles in terms of absolute value not exceeding a cone angle of the ferroelectric liquid crystal in chiral smectic phase.

According to another aspect of the present invention, there is provided a liquid crystal optical device: comprising a plurality of pixels each comprising a pair of opposing electrodes and a ferroelectric liquid crystal layer disposed between the opposing electrodes, wherein at least one opposing electrode is coated with a fine particle-dispersion layer containing electroconductive ultrafine particles having an average particle size of 30–300 Å and further an alignment control layer disposed to allow a local direct contact of the fine particle dispersion layer with the ferroelectric liquid crystal layer.

According to further aspect of the present invention, there is provided a liquid crystal optical device: comprising a plurality of pixels each comprising a pair of opposing electrodes and a ferroelectric liquid crystal layer disposed between the opposing electrodes, wherein at least one opposing electrode is coated with a layer of minute unevennesses providing an average stepwise difference of 30–300 Å, and a means for providing unevennesses having a stepwise difference larger than that of the minute unevennesses and disposed at a pitch larger than an average thickness of the ferroelectric liquid crystal layer.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a schematic sectional view of a liquid crystal device according to the invention.

FIGS. 14(a)–(d) are schematic top views illustrating a display state of a liquid crystal device.

FIG. 35 is a schematic illustration of a pixel in Example 4 of the invention.

FIG. 36 is an illustration of a pixel pattern used in Example 5.

FIG. 37 is a sectional view of an AB–AB' section in FIG. 36.

FIG. 38 is an illustration of polarity-inverted domains observed in Example 5.

FIGS. 44(a)–(b) are illustrations of polarity-inverted domains observed in Example 7.

FIGS. 51(a)–(b) are schematic illustrations of inverted domains at different voltages in Example 11.

DESCRIPTION OF THE PREFERRED EMBODIMENTS

Figure 2:
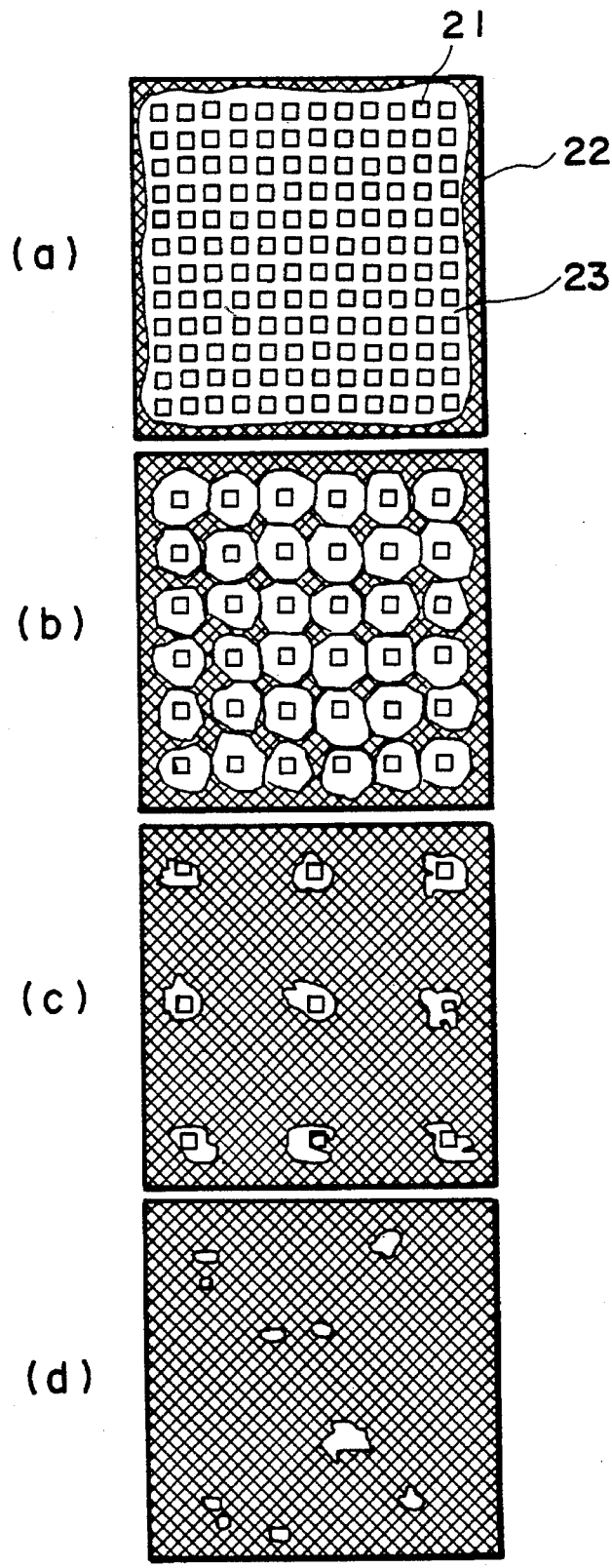
FIGS. 2(a)–(d) are schematic top views of a pixel in a liquid crystal device according to the invention.

According to a suitable embodiment of the present invention, a minute inverted region is formed based on a region within a unit pixel and a gray-scale or intermediate gradation level is displayed by controlling the areal size of the inverted region.

More specifically, according to a first embodiment of the present invention, there is provided a liquid crystal display device, comprising: a pair of oppositely disposed substrates each having a plurality of opposing electrodes, and a ferroelectric liquid crystal disposed between the substrates so as to form a plurality of pixels each composed by a combination of a pair of the opposing electrodes and the ferroelectric liquid crystal disposed therebetween;

wherein each pixel is provided with regions of different polarity inversion threshold voltages, and at least one of said pair of opposing electrodes is provided with a plurality of regions having unevennesses at different densities including a region with a higher density of unevennesses corresponding to a region of a lower polarity inversion threshold voltage and a region with a lower density of unevennesses corresponding to a region of a higher polarity inversion threshold voltage.

In the present invention, it is preferred that the above-mentioned unevennesses are provided to both substrates, and the shape of an unevenness (pattern) may preferably be a projecting island or a projecting stripe (or a corresponding indentation) but need not be restricted thereto. The unevennesses may be provided directly to a transparent film electrode, or a conductor or insulator formed on the transparent electrode. Each unevennesses may preferably have a height (or depth) of 5–1000 nm, more preferably 50–300 nm. Each pixel may have a region having unevennesses at a higher density and a region having unevennesses at a lower density. The unevennesses (projections or indentations) may preferably be spaced from each other by 2–1000 µm, more preferably 5–100 µm.

The above-mentioned regions having unevennesses at a higher density and at a lower density correspond to the regions having a higher and a lower polarity inversion threshold voltage, respectively, in the present invention.

Hereinafter, the principle of gradational display is described with reference to FIGS. 1–4.

FIG. 1 is a schematic sectional view of a liquid crystal device including a pair of substrates 11 and 12 of, e.g., glass, respectively coated with transparent film electrodes 13 and 14 and alignment films 13a and 14a of, e.g., polyimide, and a ferroelectric liquid crystal disposed between the substrates including molecules with axes represented by arrows 15. In case where the transparent film electrodes 13 and 14 are provided with unevennesses, the liquid crystal molecular axes 15 are disordered at the edge of an unevenness. In other words, at such an edge (region 16 surrounded by a dotted circle), molecular axes 15 are inclined at a large angle with respect to the surfaces of the substrate to cause an increased interaction between the spontaneous polarization and the electric field, thus being liable to cause molecular inversion. This phenomenon is particularly noticeably observed in case where the edge shape is sharply formed.

FIGS. 2(a)–2(d) are schematic top views of a liquid crystal device and illustrate states of inverted domain regions within a cell including a transparent film electrode with island-like projections 21 of a constant size at different pitches (or spacings). The pitch is gradually increased from FIG. 2(a) to FIG. 2(c), and FIG. 2(d) shows a case with no projection. In all the cases, the cells are assumed to be initially occupied with a black region 22 entirely. When such four types of cells are supplied with identical voltages, the respective cells are provided with inverted domains 23, of which the areas are in the order of (a)>(b)>(c)>(d). Further, in the cells (a)–(c), the inverted domains 23 are formed at positions corresponding to the projections but, in the cell (d), the inverted domains 23 are formed at random. From FIGS. 2(a)–2(d), it is clear that surface modification with unevennesses provides a lowered threshold voltage at the modified parts and it is also understood that, in a region provided with a high density of such modifications, the threshold voltage is lowered not only at the projections but also at intermediate parts between the projections. This suggests that the lowering in threshold voltage is caused not only by an increase in effective voltage due to a smaller cell gap at the projections but also by a change in dynamic characteristic of the liquid crystal in the vicinity of the modified parts. Accordingly, such an unevenness modification can be obtained not only by projections as shown above but also by indentations. In this way, by providing an unevenness pattern onto a transparent film electrode, it becomes possible to control the position of inversion domains and, by controlling the density of unevennesses, it is possible to vary the voltage-transmittance characteristic.

Figure 3:
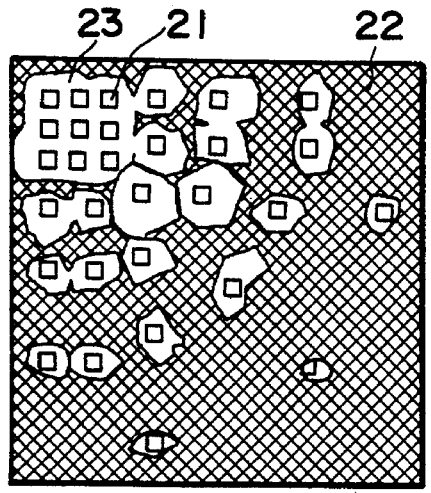
FIG. 3 is a schematic top view of another example of a pixel in a liquid crystal device according to the invention.

As a variation of the cells shown in FIG. 2, FIG. 3 shows a unit pixel in which island-like projections 21 are disposed at locally different densities along with a state of instantaneous inversion. More specifically, in the pixel shown in FIG. 3, projections are disposed at a higher density in an upper left region and at a lower density in a lower right region.

Figure 4:
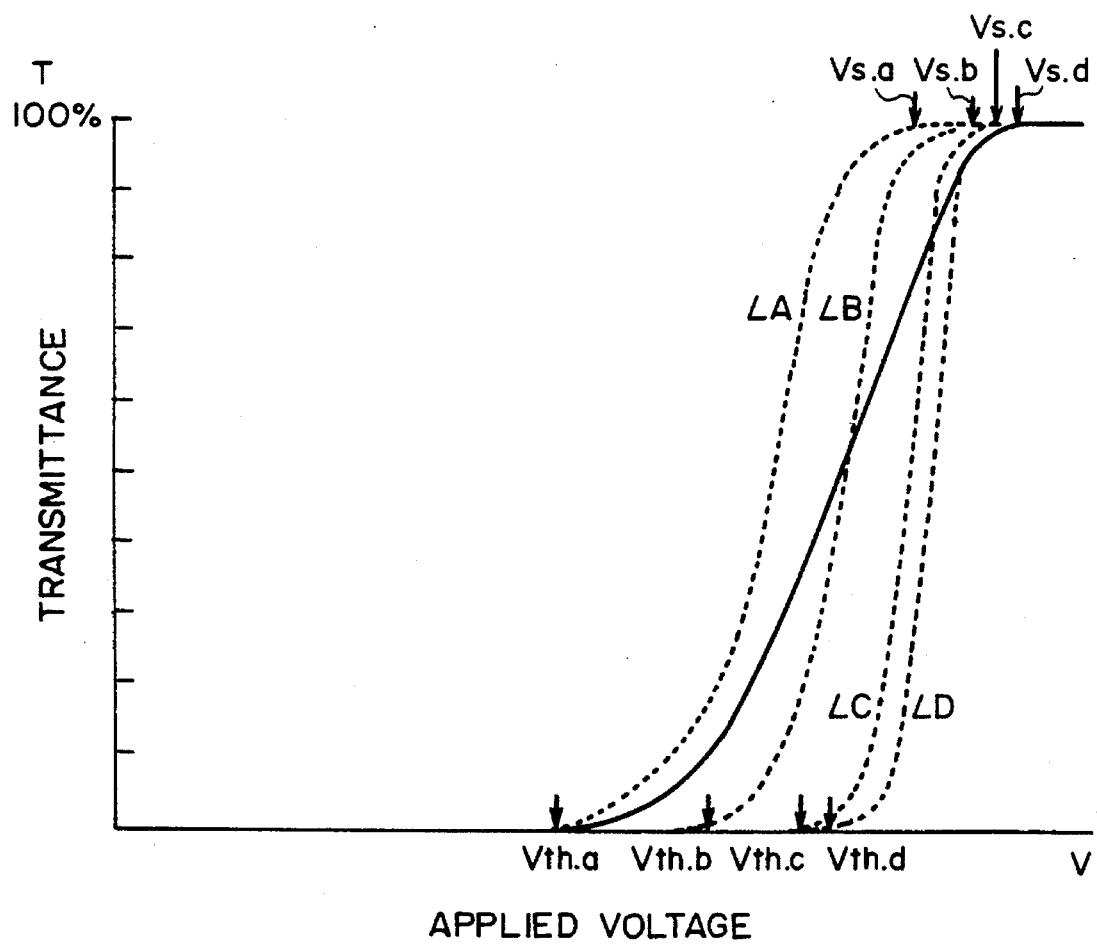
FIG. 4 is a graph showing a voltage-transmittance characteristic according to the invention.

FIG. 4 shows voltage-transmittance characteristics represented by four dashed curves LA, LB, LC and LD corresponding to the four cells (a)–(d) of FIG. 2, respectively, showing threshold voltages Vth.a, Vth.b, Vth.c and Vth.d satisfying Vth.a<Vth.b<Vth.c<Vth.d and saturation voltages Vs.a, Vs.b, Vs.c and Vs.d satisfying Vs.a<Vs.b<Vs.c<Vs.d. Herein, a difference in threshold voltage (e.g., Vth.b–Vth.a) is larger than a corresponding difference in saturation voltage (E.g., Vs.b–Vs.a). Accordingly, if a gradation display characteristic is represented by a factor γ=saturation voltage/ threshold voltage (Vs/Vth), i.e., γa=Vs.a/Vth.a, γb=Vs.b/ Vth.b, γc=Vs.c/Vth.c and γd=Vs.d/Vth.d, respectively, for the cells (a)–(d) in FIG. 2, a relationship of γa>γb>γc >γd holds. Accordingly, if one pixel is provided with unevennesses disposed at locally different densities as shown in FIG. 3, it is possible to not only control the position of inverted domains but also provide a desired γ-characteristic as represented by a solid line in FIG. 4. Further, as a relationship of (Vth.d–Vth.c)<(Vth.c–Vth.b)<(Vth.b–Vth.a) holds, i.e., a larger variation in threshold voltage is attained in a higher unevenness density region, a desired gradation characteristic can be accomplished within a small area by disposing regions with different unevenness densities within one pixel, thus decreasing the area of one pixel. The variation in threshold voltage particularly noticeably caused when a writing pulse of 100 µs or shorter, particularly 40 µs or shorter, is applied so that it is possible to obtain a sufficient gradation characteristic even if the number of scanning lines is increased.

Another embodiment of the present invention will now be described. In this embodiment, the growth of a domain is controlled so as to improve the linearity of voltage-transmittance characteristic (γ-characteristic) and also the reproducibility thereof. More specifically, the inverted domain is designed to be enlarged preferentially in a certain direction.

Figure 5A:
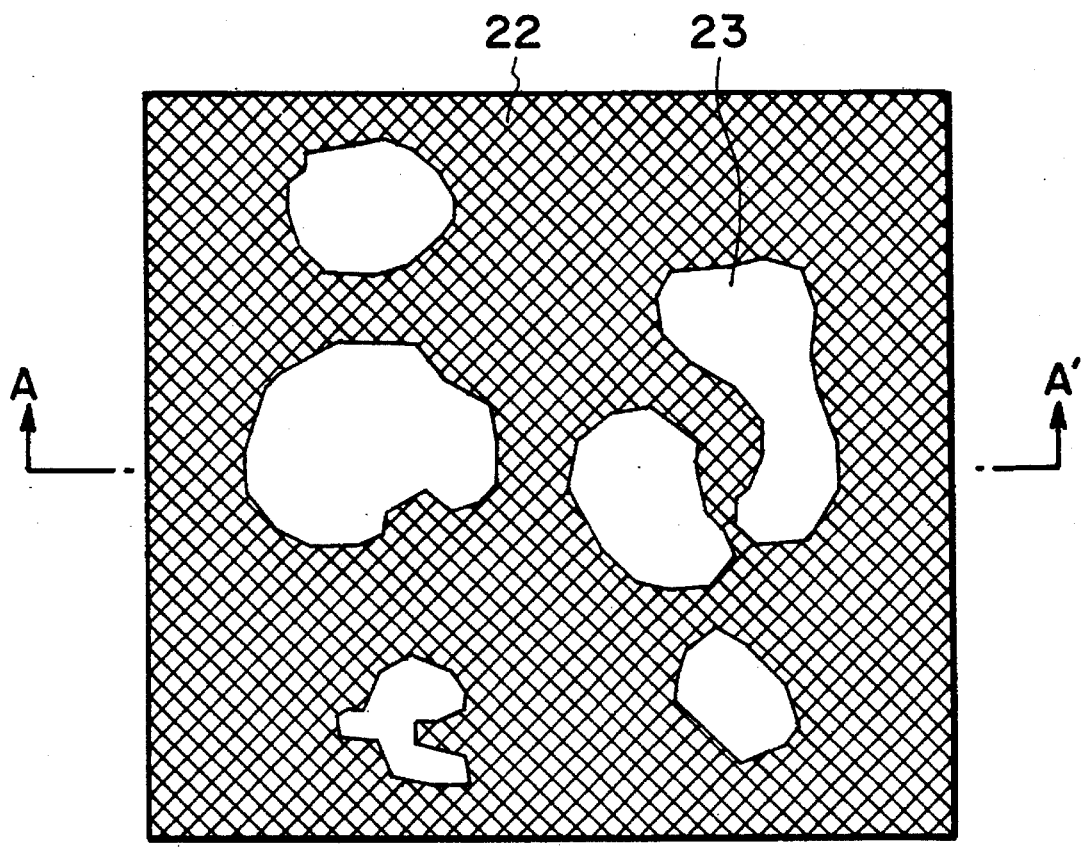
FIGS. 5A and 5B are a schematic top view and a sectional view, respectively, of a liquid crystal device illustrating a state of domain formation in a liquid crystal device.
Figure 5B:
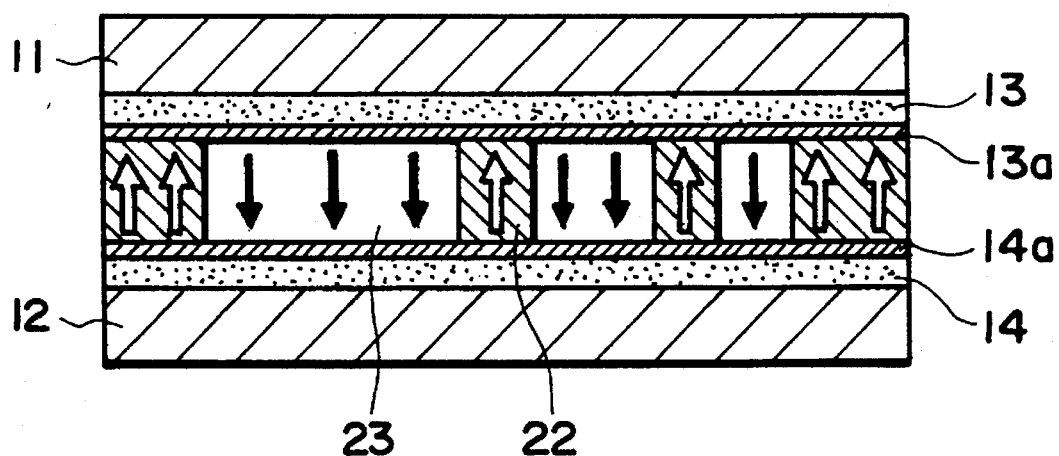
Figure 6:
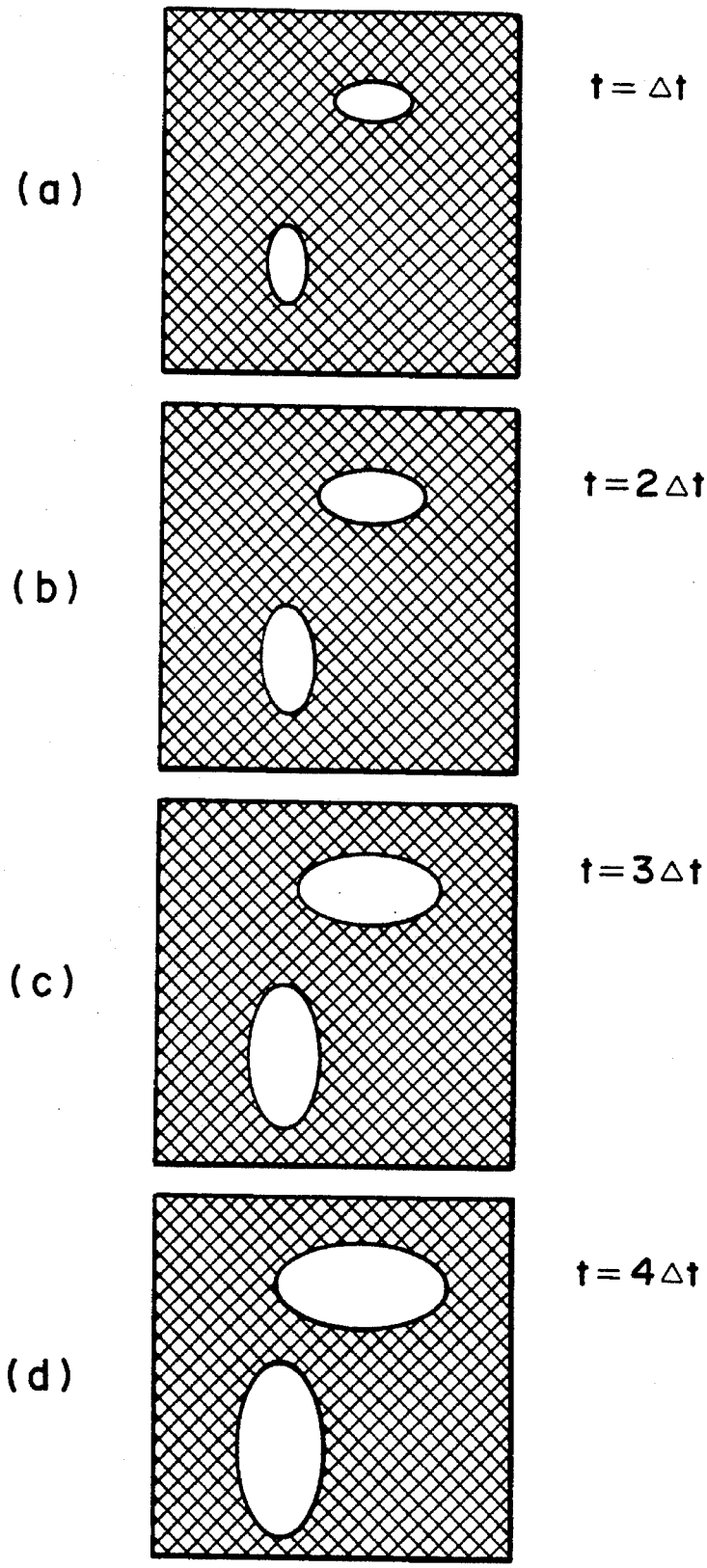
FIGS. 6(a)–(d) are schematic top views of a liquid crystal device showing a state of domain growth.

FIGS. 5A and 5B are a plan view and a sectional view (of A–A' section in FIG. 5A) of a liquid crystal cell showing a state of domains extending at random in a planar direction. Referring to the figures, the cell includes a pair of glass plates 11 and 12 respectively provided with opposite electrodes 13 and 14 of transparent conductor films and alignment films 13a and 14a of, e.g., polyimide. An optically black domain 22 is formed of liquid crystal molecules having upward spontaneous polarization denoted by white arrows in FIG. 5B, and optically white domains 23 are formed of liquid crystal molecules having downward spontaneous polarization denoted by black arrows in FIG. 5B.

As shown in FIG. 5B, a white or black domain may be regarded as almost uniform in the direction perpendicular to the substrates 11 and 12, and the ratio between the number of molecules having downward spontaneous polarization to the number of molecules having upward spontaneous polarization (optically, an overall transmittance through a pixel) correspond to the two-dimensional areal ratio between the white domains and the black domains.

FIGS. 6(a)–6(d) show four views of a cell at four points of time (t=Δt–4Δt) when the cell is continually supplied with a voltage in one direction. As shown in FIG. 6, white (or black) domains grow (or shrink) while the external voltage application is continued. Accordingly, by controlling the magnitude or duration of the applied voltage, it is possible to control the white domain/black domain areal ratio within one pixel, thus effecting a gradational display.

Incidentally, the appearance of the domain growth (or shrinkage) greatly varies whether it is accompanied with a two-dimensional shape change or one-dimensional shape change.

Figure 7:
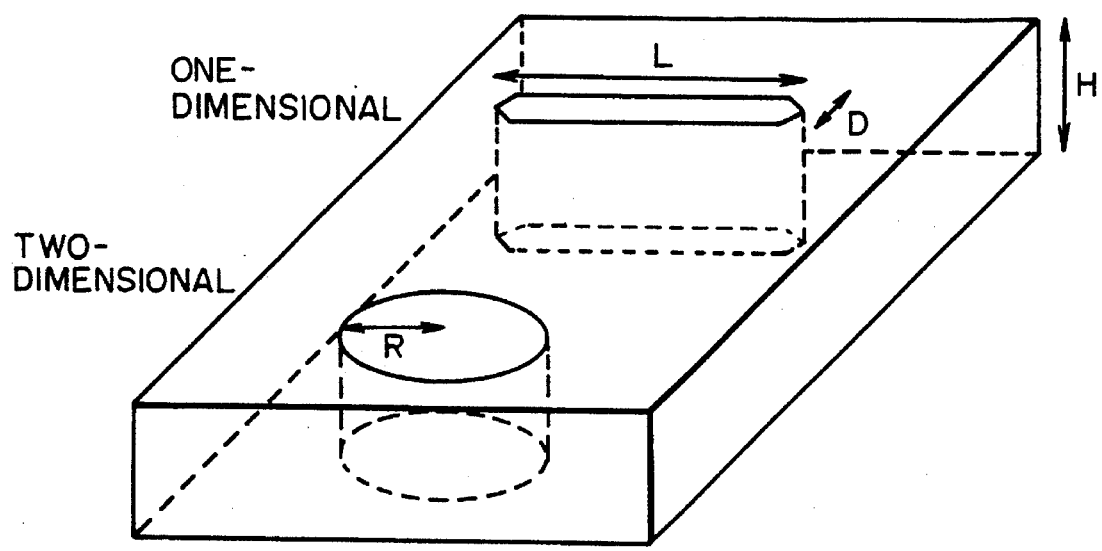
FIG. 7 is a schematic illustration of a one-dimensionally grown domain and a two-dimensionally grown domain.

FIG. 7 schematically illustrates a one-dimensional domain change and a two-dimensional domain change.

If explanation is made with reference to a straight-forward case, one-dimensional domain change refers to a shape change caused principally or only by a growth/shrinkage of length L while the width D does not remarkably increase as the length L increases. On the other hand, two-dimensional domain change refers to a shape change represented by a change in R as shown in FIG. 7.

Now, a free energy G possessed by each domain under voltage application is considered. As the elastic energy of a domain at a boundary wall is proportional to the boundary wall area and the electric energy is proportional to the volume of the domain, the following equations with α, β, k1, α' and γ are given:

$$G = \alpha L - \beta L = k1 \times L \text{ for one-dimensional domain,}$$

$$G = \alpha' R - R^2 \text{ for two-dimensional domain.}$$

Figure 8A:
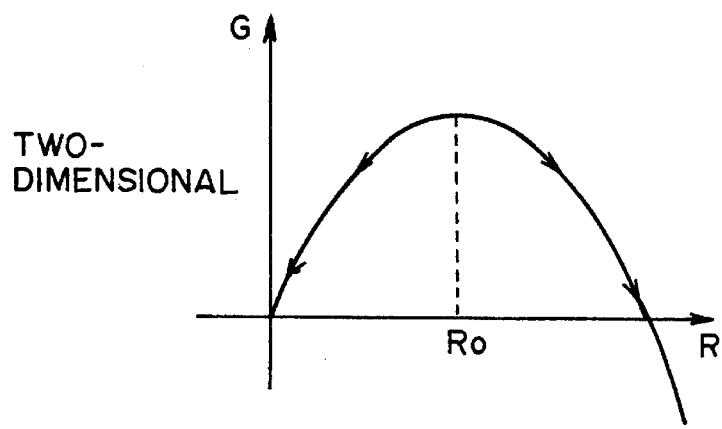
FIGS. 8A and 8B are graphs showing a free energy change.
Figure 8B:
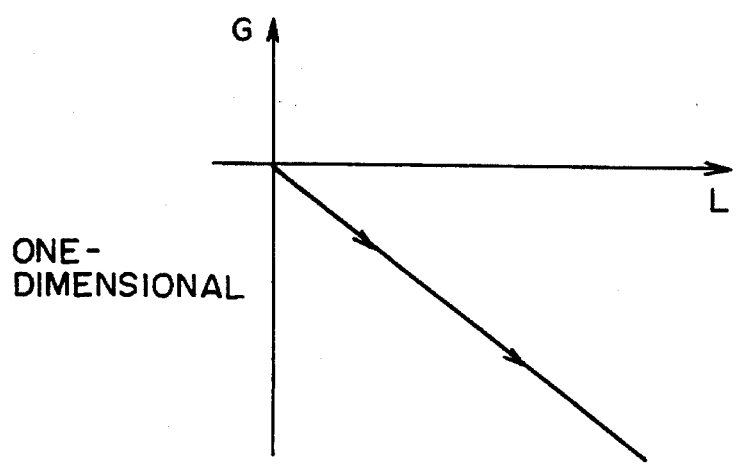
Figure 9:
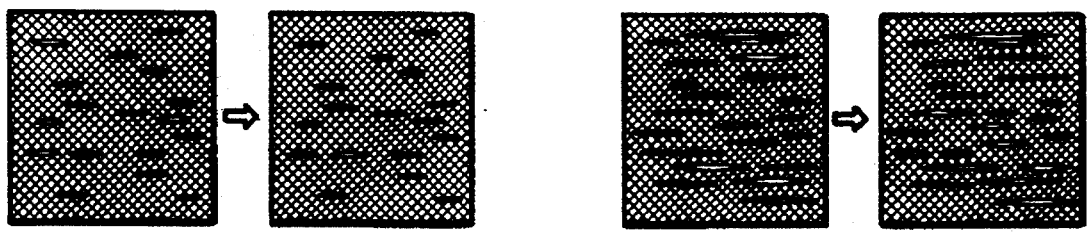
FIGS. 9(a) and (b) are schematic views showing changes with time of domains.
Figure 9:
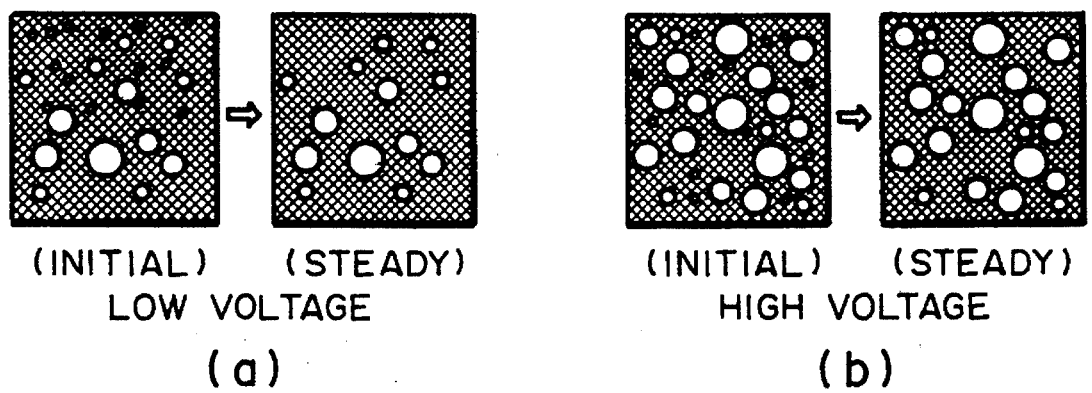
Figure 10:
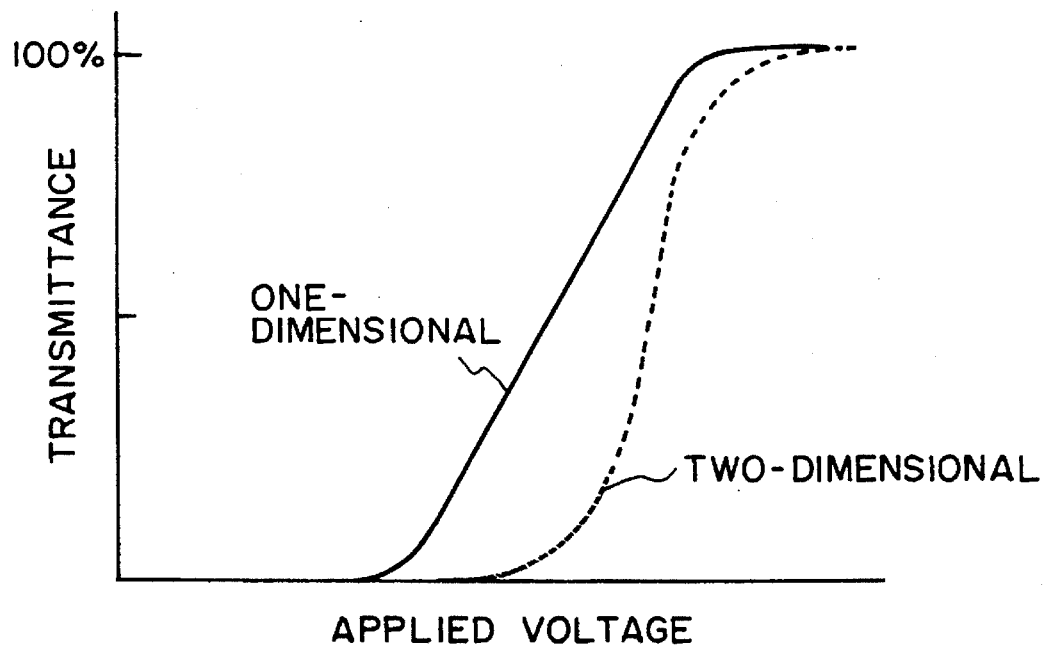
FIG. 10 is a graph showing voltage-transmittance characteristics of a one-dimensional domain and a two-dimensional domain.

FIGS. 8A and 8B are graphs illustrating the free energy changes. As is understood from FIG. 8A, according to a two-dimensional domain change, a domain having a radius smaller than a critical value $R_0$ disappears under continual voltage application. Further, with reference to FIG. 9 illustrating one-dimensional domain change and two-dimensional domain change both under low-voltage application (a) and under high-voltage application (b), the number of one-dimensional domains does not substantially change from the initial state to the steady state both under low-voltage application and high-voltage application. However, with respect to two-dimensional monodomains, small domains present in the initial state of, particularly, low-voltage application disappear under continuation of the voltage application. In this way, in case of voltage application near the threshold voltage to two-dimensional domains, the transmittance cannot be readily changed but provides a voltage-transmittance characteristic as represented by a dashed line in FIG. 10. Such a characteristic is disadvantageous for gradational display compared with one-dimensional domains.

It can be seen from the above that in order to effect a gradational display by using a ferroelectric liquid crystal, it is preferable to control one-dimensionally changing domains rather than two-dimensionally changing domains.

According to this embodiment of the present invention, one-dimensionally changing domains are controlled to effect gradational display.

For the above purpose, the polarity inversion threshold voltage of a ferroelectric liquid crystal may be decreased in the form of a line so as to facilitate the polarity inversion along the line, thus promoting one-dimensional domain change as described above.

The means for causing a lowering in polarity inversion threshold voltage of the ferroelectric liquid crystal in the form of a line may for example comprise linearly arranged island-like unevennesses or stripe unevennesses arranged in parallel.

An unevenness thus formed functions to cause an alignment disorder of ferroelectric liquid crystal molecules particularly in the vicinity of a corner thereof and instabilize the portion, thus resulting in a decreased threshold voltage. In the case of island-like unevennesses, due to the closeness between unevennesses, the above-mentioned alignment disordered portions appear to be in continuity, thus forming a line of lowered threshold voltage. On the other hand, in the case of stripe unevennesses, lines of lowered threshold voltage are formed along the stripe unevennesses.

Each island-like or stripe-shaped unevenness (particularly, projection) may preferably have a height of 50–10000 Å, further preferably 500–3000 Å, and the adjacent unevennesses may preferably be spaced from each other by 1–50 μm. The island-like unevenness may have a shape of a rectangle, a circle or any other shape with a preferable size of, e.g., 1–50 μm in side length or diameter. The stripe unevenness may preferably have a width of φ1–50 μm.

On the other hand, the means for causing a change in shape of a polarity-inverted region in the direction of the line of lowered threshold functions to cause a one-dimensional change in combination with the above means for causing a lowering in polarity inversion threshold voltage in the form of a line, and may for example comprise the following.

First of all, the means may comprise island-shaped or stripe-shaped unevennesses along a line or lines of the decreased threshold voltage. In this case, it is possible to apply a voltage preferentially in the direction of the line of decreased threshold voltage, thereby developing stripe-like domain changes.

The island-shaped or stripe-shaped unevennesses may preferably have a height of generally 50–10000 Å, more preferably 500–10000 Å.

As another measure, it is preferred to form a gradually decreasing or increasing gradient of electric field applied to the ferroelectric liquid crystal along the line of decreased threshold voltage. If such a measure is taken with respect to the opposing electrodes, it is possible to gradually elongate a polarity inverted region along the line of decreased threshold voltage from a higher electric region to a lower electric region. An example of opposing electrode adopting such a measure may comprise island-like or stripe-shaped unevennesses disposed with different spacing, e.g., sparse to dense or dense to sparse, along the line of decreased threshold voltage. Another example of such an opposing electrode may be one having a slope along the line of decreased threshold voltage or one equipped with a bias voltage application means along the line of decreased threshold voltage.

An opposing electrode having such island-like or stripe-shaped unevennesses provides a higher electric field-applying region in its region with a higher density of unevennesses and a lower electric field applying region in its region with a lower density of unevennesses. Further, an opposing electrode having a slope provides a higher electric field-applying region at a part providing a higher projection (i.e., a part providing a smaller spacing with its counter electrode) and a lower electric field-applying region at a part providing a lower or recessed part (i.e., a part providing a larger spacing with its counter electrode). Further, an opposing electrode equipped with a bias voltage-application means provides a gradually increasing or decreasing electric field strength applied to the ferroelectric liquid crystal depending on the direction of applying the bias voltage.

Still another embodiment of the present invention will be described hereinbelow. In this embodiment, image display with a better reproducibility may be realized by improving the alignment characteristic of a liquid crystal material.

A halftone display (gradational display) is effected by using a liquid crystal display device according to this embodiment comprising a pair of opposing electrodes and a ferroelectric smectic liquid crystal disposed between the opposing electrodes so as to develop bistable states, and by developing a polarity-inverted region corresponding to a halftone signal applied between the opposing electrodes in a stripe pattern substantially parallel to smectic layers of the ferroelectric liquid crystal.

More specifically, the liquid crystal display device according to this embodiment comprises a plurality of pixels each comprising a pair of opposing electrodes, and a ferroelectric smectic liquid crystal disposed between the opposing electrodes so as to develop bistable states, the liquid crystal device being equipped with a halftone signal application means for applying a halftone signal between the opposing electrodes, each pixel being provided with locally different inversion threshold voltages so as to develop a polarity-inverted region corresponding to the halftone signal in a stripe pattern substantially parallel to smectic layers of the liquid crystal.

More preferably, at least one of the electrodes is provided with a stripe unevenness pattern forming acute angles with two molecular orientation directions in the bistable states of the liquid crystal so that the smallest one in terms of an absolute value of the acute angles is set to be at most the cone angle of the ferroelectric liquid crystal in the chiral smectic phase.

According to this embodiment, the size and density of domains are caused to respond well and with a good reproducibility to applied voltages, so that it is possible to obtain a linear voltage-transmittance characteristic easily and stably, thus allowing an excellent gradational display.

It is possible to form a domain responding well to an applied voltage by relying on substantially only a combination of reliable techniques of setting of a liquid crystal alignment state and formation of a unevenness pattern, thus allowing an analog gradational display with good controllability.

Figure 11:
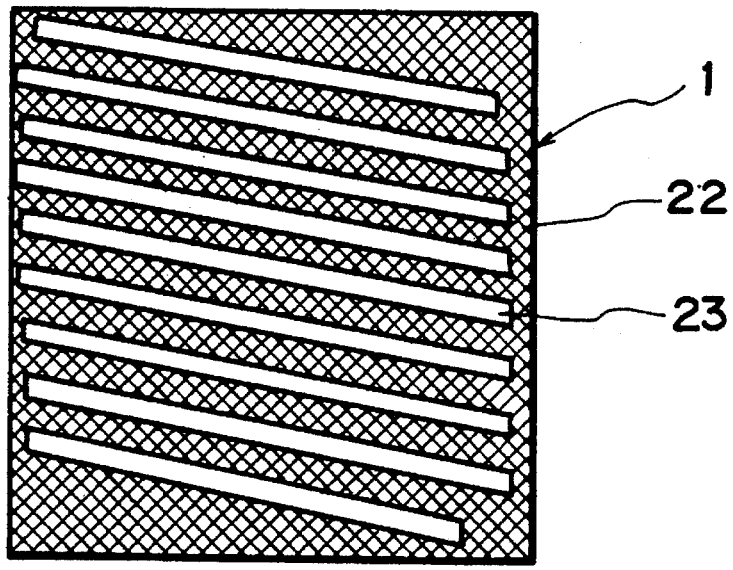
FIG. 11 is a schematic top view showing a display state of a liquid crystal device according to an embodiment of the invention.

FIG. 11 is a schematic view for illustrating a liquid crystal display apparatus according to this embodiment.

Figure 12:
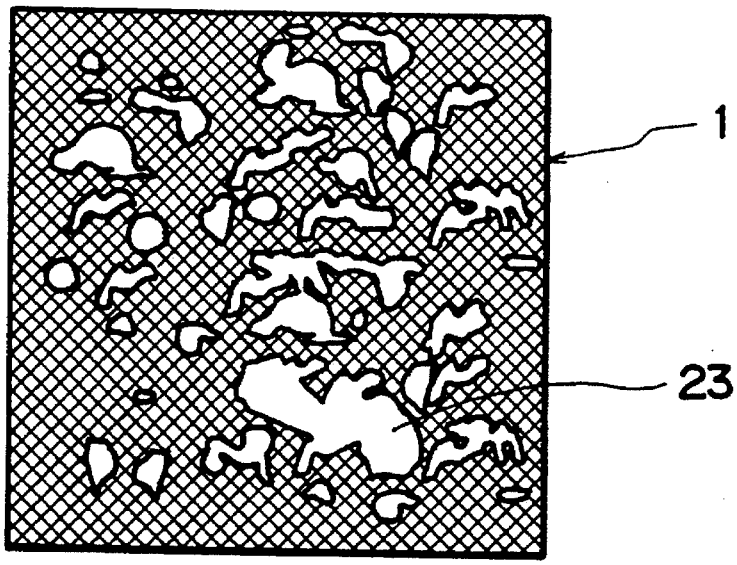
FIG. 12 is a schematic top view showing a display state of a liquid crystal device.

More specifically, FIG. 11 schematically shows a pixel 1 wherein, within a region (black region) 22 comprising liquid crystal molecules in one of their bistable states as the initial state, a plurality of stripe-shaped domains (white regions) 23 polarity-inverted to the other of the bistable states of liquid crystal molecules. On the other hand, FIG. 12 shows a pixel 1 wherein polarity-inverted domains 23 are formed not in a stripe form but in a disorderly manner. In this case of stripe-shaped domains 23, identical domains appear at a very high probability in response to application of an identical signal. Further, the length and density of the stripe domains are linearly changed depending on the waveheight and/or pulse durations of the signal. Accordingly, a good controllability of transmittance is attained suitably for gradational display.

In this embodiment, the above-mentioned one-dimensionally changing domains appear up to a certain number and thereafter the domains grow so as to increase their width. More specifically, in case of a low applied voltage, a small number of domains appear. In case of a high applied voltage, the number of domains increases and/or the widths of the domains are enlarged. In order to cause such a domain growth, it is particularly preferred to appropriately set the longitudinal direction of the stripes and the liquid crystal molecular orientation direction in a manner as described hereinafter.

On the other hand, in the case of FIG. 12, repetitive application of identical signals is liable to develop domains with different shapes and sizes on each application, thus resulting in a poor reproducibility. Accordingly, the resultant domains do not completely correspond to the waveheight and/or pulse width of the applied signal.

The ferroelectric liquid crystal used in the present invention may preferably comprise a liquid crystal assuming a chiral smectic C phase, H phase, I phase, etc., particularly preferably a chiral smectic C phase.

As for a pair of opposing electrodes constituting a pixel in a liquid crystal cell of the present invention, at least one of the opposing electrodes may preferably comprise a transparent conductor, suitable examples of which may include tin oxide, indium oxide and indium tin oxide (ITO).

The halftone or gradation signal used in the present invention may be a signal with a modulated waveheight (pulse height), a signal with a modulated pulse width (inclusive of a modulated pulse number), or a signal with a waveheight and a pulse width both modulated. The halftone signal generating means for generating such halftone signals may be prepared by a semiconductor integrated circuit. It is preferred to use a system wherein a pair of electrodes are supplied with independent signals so as to provide a halftone signal as a combination of the signals.

By appropriately selecting the liquid crystal material, electrode material and alignment state in the cell, a polarity-inverted region in response to an applied halftone signal is developed as stripe-shaped regions substantially parallel to the smectic layer direction of the ferroelectric liquid crystal.

In this embodiment of the present invention, it is preferred to provide stripe-shaped unevennesses (preferably, projections) onto the liquid crystal side of at least one electrode.

Such a stripe-shaped unevennesses may be formed in a uniform shape or ununiform shapes within one pixel. Moreover, it is possible to divide one pixel into sub-pixels so that each sub-pixel is provided with stripes of a uniform shape within the sub-pixel, and different sub-pixels are provided with different shapes of stripes. Such a stripe unevenness may be formed by an electrode per se or an alignment film thereon, or by an additional member for providing such a stripe. In any case, the stripes may formed easily by a combination of film formation and patterning.

It is preferred that the stripe direction is set to form acute angles with two molecular orientation directions in the bistable states of the liquid crystal so that the smallest one in terms of an absolute value of the acute angles is at most the cone angle of the ferroelectric liquid crystal. The molecular orientation directions (n1, n2) in the bistable states may be determined from extinction positions when the cell in a memory state is observed through cross-nicol polarizers. The cone angle Ⓗ may be determined from extinction positions when the cell under application of bipolar rectangular pulses of amplitude of 20 volts and frequency of 10 Hz is observed through cross nicol polarizers. Thus, a half of the angle between the two extinction positions is taken as the cone angle Ⓗ. The layer normal direction L of the liquid crystal may be determined by a bisector of the angle between the two extinction positions for the above-mentioned measurement of the angle Ⓗ.

Figure 13:
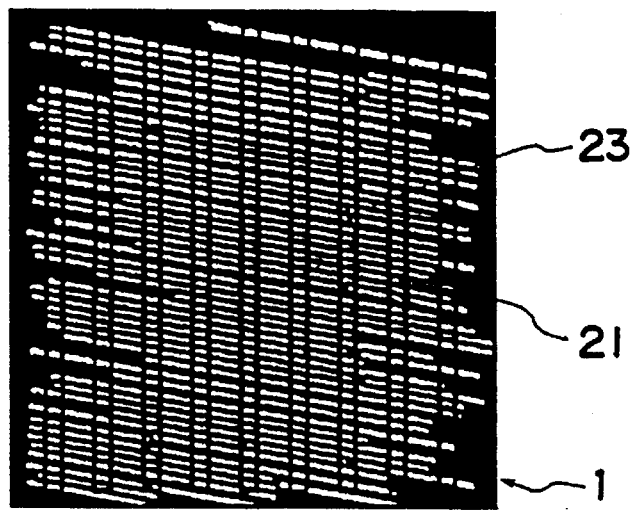
FIGS. 13(a), (b) and (c) are schematic views for illustrating a liquid crystal device according to an embodiment of the invention.
Figure 13:
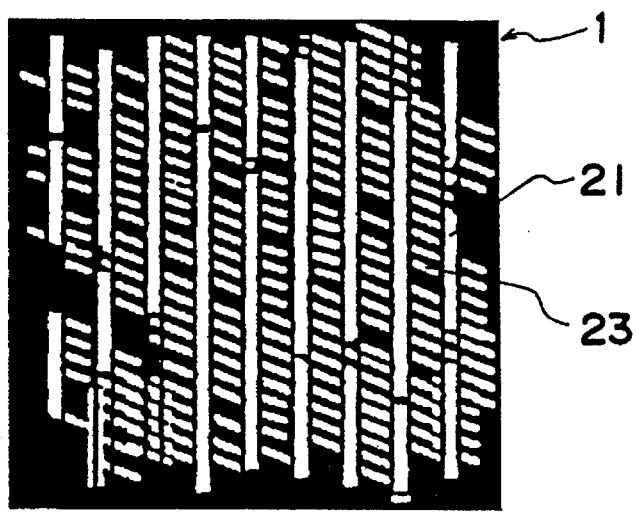
Figure 13:
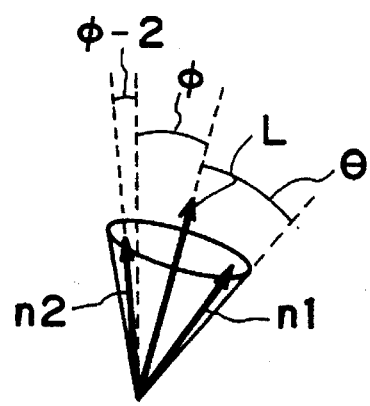

FIG. 13 is a schematic view of one pixel 1 provided with stripe projections 21 for showing a state of inverted domains 23 as viewed from a direction perpendicular to the pixel 1. The inverted domains 23 are formed in stripes. Every inverted domain 23 in FIG. 23 substantially corresponds to a direction perpendicular to the layer normal direction L, i.e., extends in a direction of smectic layers. There are typically two cases including one wherein stripe domains 23 extend across a plurality of stripe projections 21 as shown at (a), and another case wherein stripe domain 23 extend clearly in an identical direction only in recesses between stripe projections 21 like ladder steps. If stripe projections are formed with an identical pitch and with a narrow projection width, e..g, at most one half of the helical pitch of the liquid crystal, it is possible to preferentially result in state (a). In either case of (a) and (b), the inverted domains change their width depending on the applied signal while keeping the number thereof. Further, once the domain walls are formed after the signal application, there is observed little instability that the domains are enlarged or shrinked thereafter and there is observed little fluctuation in transmittance among pixels.

In the case of no stripe unevennesses, the inverted domains do not have a clear directionality or appear regularly regarding positions, thus resulting in fluctuation in transmittance among pixels as described with reference to FIG. 2. Further, even after the formation of domain walls, there is observed instability of domains.

Incidentally, in order to develop domains extending in the direction of smectic layers at a good controllability, it is preferred that the angle formed between the layer normal direction and the direction of stripe unevennesses is made at most two times the cone angle Ⓗ of the liquid crystal.

In order to obtain the above-mentioned layer structure of the liquid crystal, it is possible to modify both electrodes with stripe unevennesses. In this instance, if the stripe directions on both sides are made substantially parallel, both the alignment state and the gradational display state are improved.

In order to develop the stripe domains, it is preferred to apply a rubbing treatment for controlling the alignment state. In this case, it is possible to apply such a rubbing treatment to both electrode sides or either one electrode side with or without stripe unevennesses. In case of rubbing a face with stripe unevennesses, it is preferred that the rubbing direction is substantially parallel to the stripe direction. A particularly good gradational display state is accomplished when the rubbing direction and the stripe unevenness direction forms an acute angle not greater than (H). In case of rubbing both substrates, both substrates may be applied to each other so that their rubbing directions are parallel and identical (parallel rubbing) or parallel and opposite to each other (anti-parallel rubbing). A further better gradational characteristic is attained if the stripe domains are formed in a pitch which is in a range of from about one half to two times the helical pitch of the liquid crystal measured in a thick cell, i.e., in a bulk state, and is generally about 1–20 μm, and the stripe domain length is at least two times the stripe domain width (generally at least 2 μm, preferably at least 20 μm) in a halftone display state of 50% transmittance.

As described above, the threshold voltage can be better controlled if the stripe unevennesses are disposed with different pitches in a pixel. FIG. 14 shows four pixels with stripe projections 21 at different pitches on one electrode side, thus showing different states of inverted domains, wherein L denotes the layer normal direction. In FIG. 14, at (a) is shown a case of a small pitch, at (b) is shown a case of a medium pitch, at (c) is shown a case of large pitch, and at (d) is shown a case of no stripe projections. The cells in all the cases are assumed to be initially occupied with a black region 22 entirely. When such four types of cells are supplied with identical voltages, the respective cells are provided with inverted domains 23, of which the areas are in the order of (a)>(b)>(c)>(d). Further, in the cells (a)–(c), the inverted domains extend in the direction of layers but, in the cell (d), the inverted domains 23 are formed at random. The above phenomena may be attributable to that not only the stripe unevennesses cause stripe inverted domains but also a strong dynamic interaction occurs between stripes in case of a small pitch so that the resultant inverted domains are easily latched.

Figure 15A:
FIGS. 15A and 15B(a)–(d) are schematic views for illustrating domain growth in a liquid crystal device.
Figure 15B:
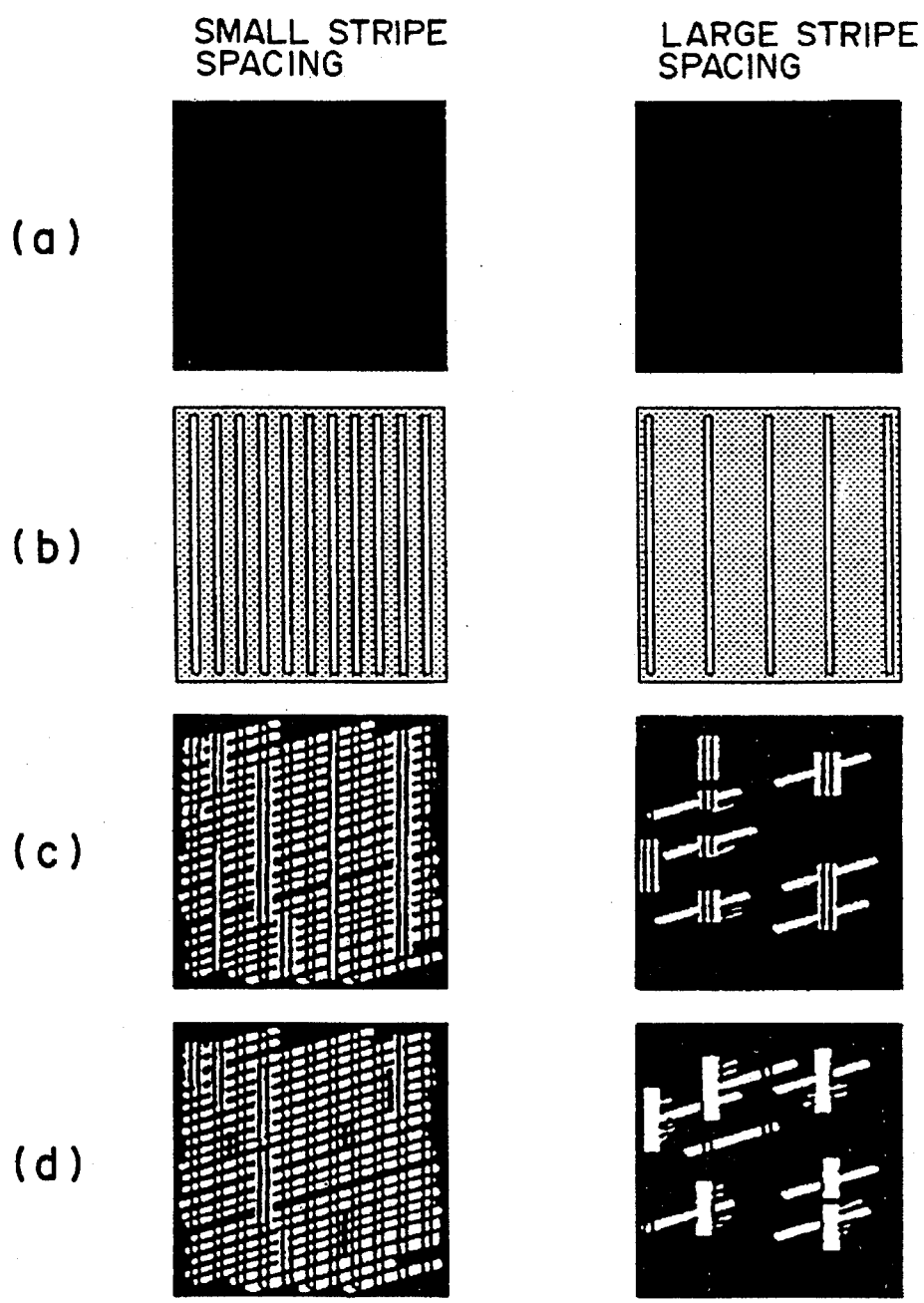

A change with time of pixel states at the time of signal application is explained with reference to FIGS. 15A and 15B. In FIG. 15B, four pixel states in a left column corresponds to a case of a small stripe spacing at the time (a)–(d) in FIG. 15A, and four pixel states in a right column correspond to a case of a large stripe spacing, respectively when a completely new pulse is applied. In either case, the parts on the stripe projections are first inverted at time (b). At time (c), a region of different transmittance has started to be seen in the case of a small stripe spacing but, in the case of a large spacing, the transmittance is lowered as a whole. Finally, at time (d), stripe domains are latched in the case of small stripe spacing, but, in the other case, the stripe domains do not remain as inverted domains. In other words, it is considered that a difference in threshold occurs depending on a difference in dynamic interaction in a transient state. The domain forming process described above is noticeably observed when a voltage with a pulse width of 100 μs or shorter is applied.

Figure 16:
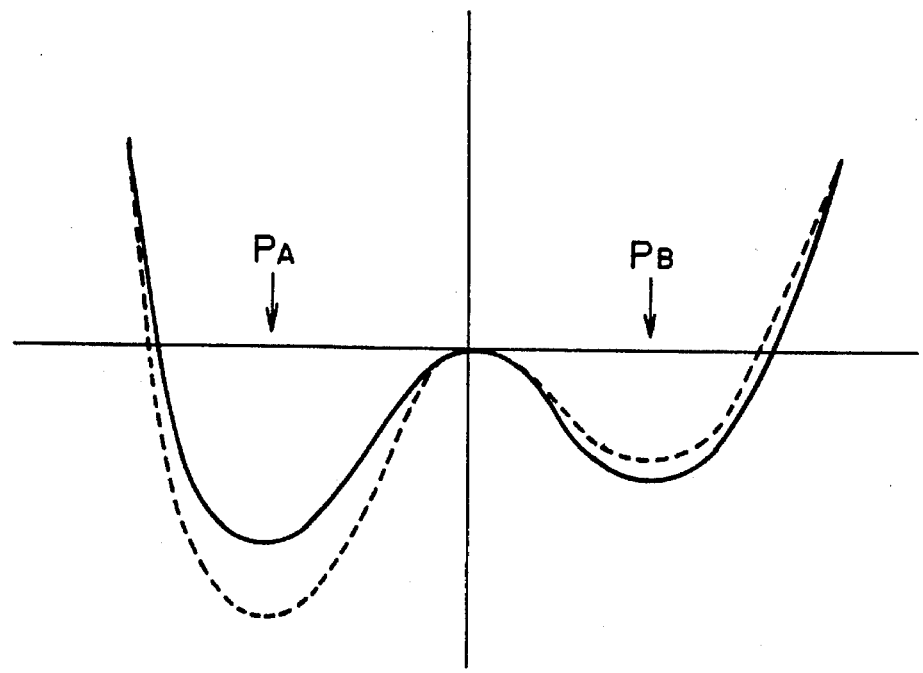
FIG. 16 is a liquid crystal molecule potential diagram in a liquid crystal device according to an embodiment of the invention.

In addition to the above cause, it is also considered that, in addition to an alignment control force due to rubbing, an alignment control force is exerted by a stripe projection, so that a certain asymmetry in stability is caused between the bistable states of the ferroelectric liquid crystal. FIG. 16 shows a potential curve of bistable states. In FIG. 16, a stable state at PA corresponds to a case where the molecular axes are oriented closer to the stripe direction and one at PB corresponds to case where the molecular axes are oriented farther from the stripe direction. Herein, the abscissa represents a parameter relating to a spontaneous polarization, e.g., a phase angle of C director. In case of a small stripe spacing, this alignment control force is large to provide a large asymmetry as represented by a dashed line in FIG. 16. In other words, a larger threshold is given in case of writing from PA to PB and a smaller threshold is given in case of writing from PB to PA.

Accordingly, in actual gradational display, it is preferred that the molecular orientations are reset to one of the two stable orientation directions in the bistable states, which is farther from the direction of the stripe unevennesses inclusive of setting of the polarizer and analyzer. In this case, the inversion threshold value becomes larger in a region of a smaller stripe pitch than in a region of a large stripe pitch. If the switching is in a reverse direction, of course, the magnitudes of threshold voltage are reversed.

Figure 17:
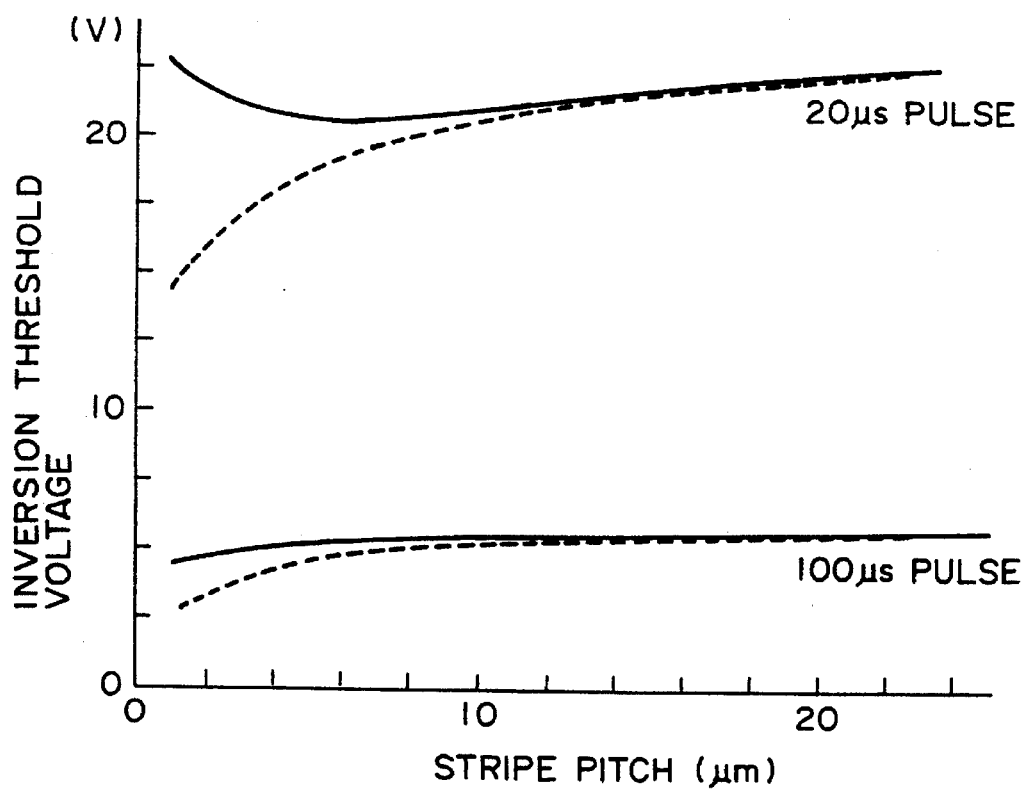
FIG. 17 is a graph showing a correlation between inversion threshold voltage and projecting stripe pitch in a liquid crystal device used in the invention.

FIG. 17 shows a change in inversion threshold when the stripe pitch is varied. Solid lines represent cases of writing from the PA state to PB state in FIG. 16 and dashed lines represent cases of writing from the PB to PA state.

Herein, the reset state is assumed to be a black state, followed by application of a polarity pulse for writing in white domain. As is understood from FIG. 17, the pulse width may preferably be at most 100 μs, particularly preferably 40 μs or less, more specifically around 20 μs as shown in FIG. 17. The fact that such a short pulse width is sufficient, means that a sufficient gradational display characteristic can be obtained even when the number of scanning lines is increased.

As described above, in a preferred embodiment of the present invention, a good gradation control characteristic is retained without any problem even if the number of pixels is increased by disposing a plurality regions with different pitches of stripe unevennesses.

The stripe pitch used in this embodiment should be selected at an optimum value depending on the liquid crystal and the cell thickness used so as to be at least one half of the helical pitch, more specifically 3–50 μm. Further, the pitch should desirably be at least three times, preferably at least ten times, a smaller one of the widths of the projection and indentations constituting the unevennesses. The stepwise difference between the projection and the indentation may selected within an extent of retaining a uniform alignment state, i..e, at most one half of the cell gap and generally in the range of 10 nm–500 nm. The unevenness pattern need not be perfect rectangular.

Incidentally, it is of course possible to effect a thermal control in order to retain the cell within a desired temperature range. The alignment film for liquid crystal alignment may comprise an organic film of, e.g., polyimide, polypyrrole, and polyvinyl alcohol, or an obliquely evaporated film of, e.g., SiO.

In the above-described embodiments, disposition of unevennesses and orientations of liquid crystal molecules are optimized to improve the gradational display characteristic. In the following embodiment, a liquid crystal device is provided with improved electrical properties so as to remove factors adversely affecting the gradational display.

One difficulty encountered in gradational or halftone display arises from a reverse electric filled effect induced by spontaneous polarization of the ferroelectric liquid crystal per se. Thus, an electric field formed by an internal ion localized corresponding to the spontaneous polarization can presumably unstabilize a desired halftone state and cause a hysteresis of optical response in response to an externally applied voltage. More specifically, a "black state" or a "white state" with a respective spontaneous polarization direction is further accompanied with a respective localization of ion stabilizing the respective spontaneous polarization direction. Due to the difference in polarity of the localized ion, even if an identical voltage is applied after a short period of resetting (erasure into "black"), the resultant halftone state can vary depending on whether the previous state is "white" or "black" having received a different voltage.

According to still another embodiment of the present invention, there is provided a ferroelectric liquid crystal optical device with good alignment characteristic and capable of providing a uniform and stable halftone with easy gradational display designing.

More specifically, according to this embodiment, there is provided a liquid crystal optical device: comprising a plurality of pixels each comprising a pair of opposing electrodes and a ferroelectric liquid crystal layer disposed between the opposing electrodes, so as to form an optically gradational state in response to an external voltage between the opposing states depending on a given gradation signal, wherein at least one opposing electrode is coated with a fine particle-dispersion layer containing electroconductive ultrafine particles having an average particle size of 30–300 Å and further an alignment control layer disposed to allow a local direct contact of the fine particle dispersion layer with the ferroelectric liquid crystal layer.

Figure 18A:
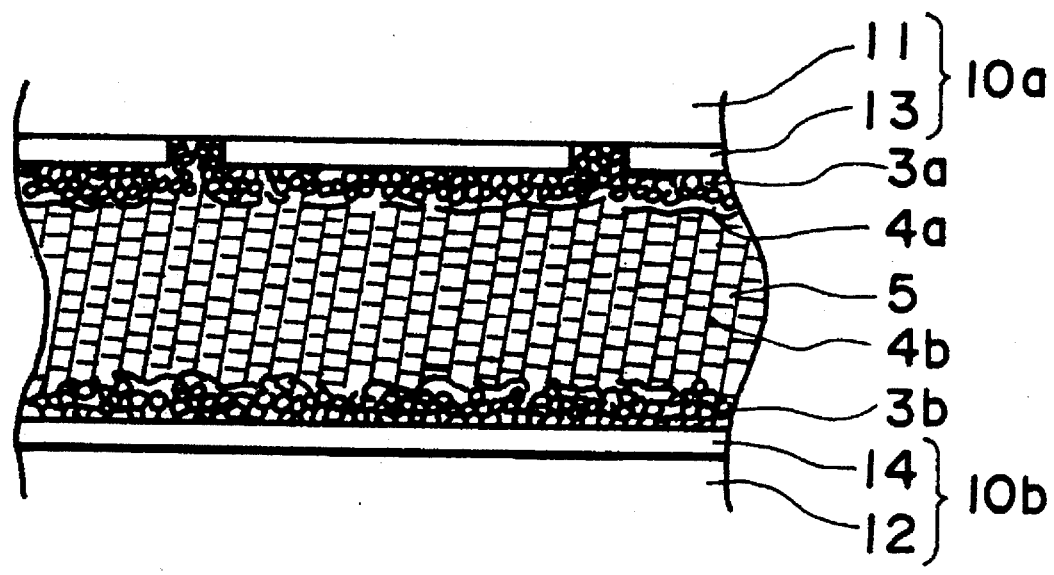
FIGS. 18A and 18B are a schematic sectional view and a partial enlargement thereof of a liquid crystal according to the invention.
Figure 18B:
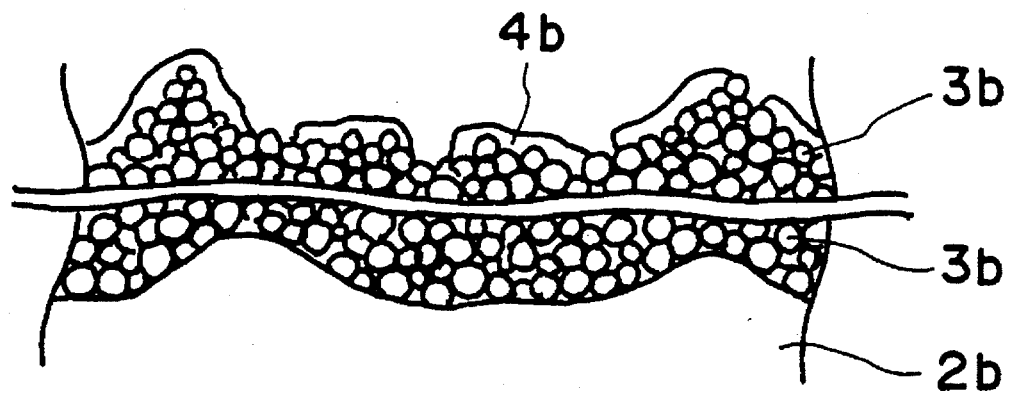

FIG. 18A is a schematic sectional view of a liquid crystal optical device according to the present invention and FIG. 18B is a partially enlarged view thereof.

Referring to FIGS. 18A and 18B, the device includes a pair of transparent substrates 11 and 12 of, e.g., glass or quartz, provided with transparent electrodes 13 and 14 of, e.g., ITO, $SnO_2$ or $In_2O_3$, one of which can be replaced with a metal electrode of, e.g., Al or Au. In this embodiment, electrode plates 10a and 10b composed of the above members are coated with layers 3a and 3b containing electroconductive ultrafine particles having an average particle size of 30–300 Å, and then further coated with a film of, e.g., polyimide, polyamide or polyvinyl alcohol formed by spin coating or by the LB process, followed by aligning treatment to form alignment control layers 4a and 4b.

Between the alignment control layers 4a and 4b is disposed a ferroelectric liquid crystal (FLC) layer preferably having a moderately larger 5 spontaneous polarization (e.g., 1 $nC/cm^2$–100 $nC/cm^2$).

In contrast with an ordinary insulating film of, e.g., polyimide or polyvinyl alcohol, the fine particles-dispersion films 3a and 3b of this embodiment can have a sufficiently lower resistivity to lower the time constant of the entire cell and can retain a large film capacitance $C_A$ compared with the above-mentioned insulating film if the thickness thereof is on the same order. As a result, it is possible to sufficiently minimize the effect of conductivity hindrance due to the pressure of an insulating layer which has been considered to be problematic.

Figure 19:
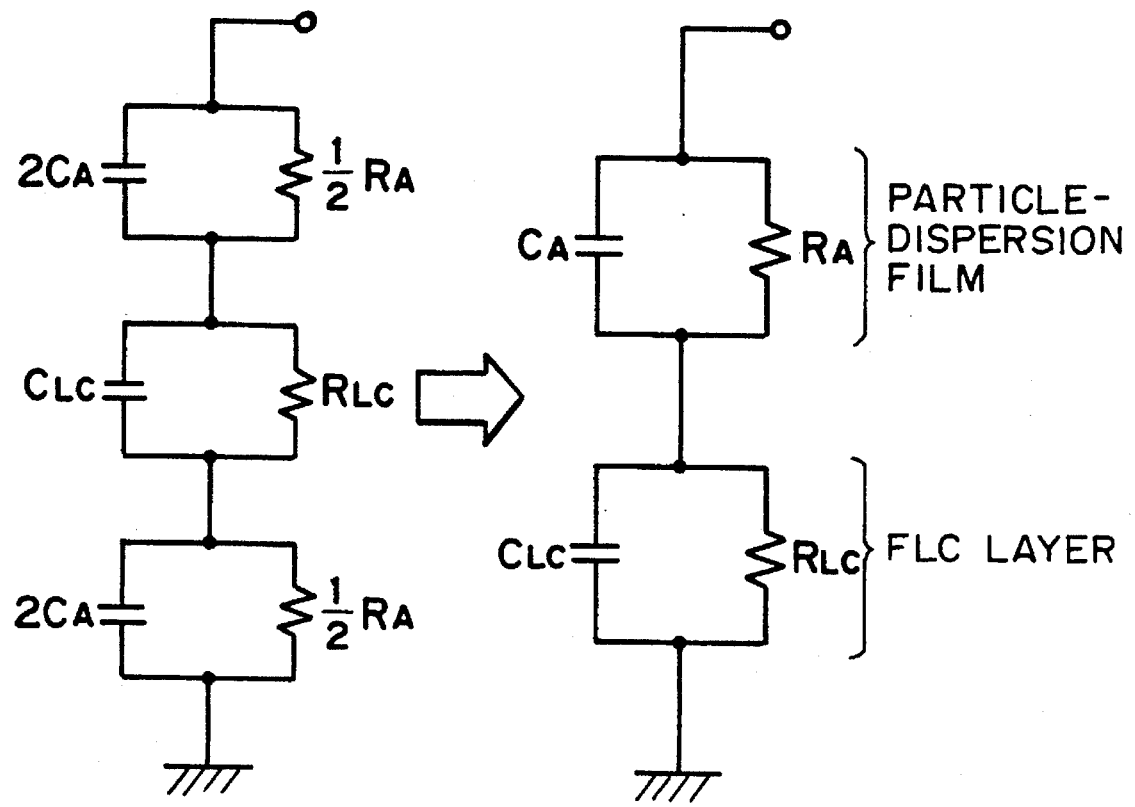
FIG. 19 is an equivalent circuit diagram of a liquid crystal device.

More specifically, the above-mentioned problematic phenomena of transmittance change and hysteresis are caused by a change in $\Delta Q_{PS}$ (localized ionic charge) due to a difference in spontaneous polarization in various halftone states of FLC as described above. In this embodiment, by using a small resistance of the fine particle-dispersion film, it is possible to provide a small synthetic time constant $[R_A R_{LC} (C_A+C_{LC})]/(R_A+R_{LC})$ derived from an artificial equivalent circuit as shown in FIG. 19, which time constant may be approximated to $R_A (C_A+C_{LC})$ in case of $R_A \ll R_{LC}$, thereby quickly relaxing the effect of fluctuation in $\Delta Q_{PS}$ as described above. Further, by retaining a large apparent film capacitance $C_A$, it is possible to sufficiently minimize the value of $\Delta Q_{PS}/(C_A+C_{LC})$ which is a factor representing the effect of $\Delta Q_{PS}$ on the liquid crystal partial voltage.

In order to provide a desirably short approximate time constant of about 30 msec or shorter, i.e., equal to or shorter than one frame period according to an ordinary motion picture rate, to the fine particle-dispersion film while avoiding a voltage decrease or device breakage due to a short circuit caused by contamination with dust etc., between the pair of electrodes, the fine particle-dispersion film may desirably have a resistivity of $10^4$ ohm.cm–$10^9$ ohm.cm, more desirably on the order of $10^7$ ohm.cm. The fine particle dispersion can have an apparently increased capacitance by about one digit, i..e, an apparent permittivity of 10–50, compared with a film having an identical thickness of an ordinary insulating material. This is a desired characteristic as described above.

Further, the alignment control layer disposed on the fine particle-dispersion film is disposed in a thickness which is smaller than the average particle size of the electroconductive fine particles within the fine particle dispersion film, so that the above-mentioned low impedance effect is not hindered, i.e., desirably in a thickness of 10–100 Å, preferably 10–50 Å, so as to provide a film rich in pinholes and allowing electrical contact between the liquid crystal and the fine particle-dispersion film.

The ultrafine particles may for example comprise ITO or $SnO_2$ of which the electroconductivity may be controlled by doping with antimony (Sb), etc.

Further, if the alignment control layer is formed in a thickness of at most 20 Å, an improved alignment characteristic is provided. In order to provide a better alignment characteristic, it is preferred to use a polymer as a matrix or a binder resin.

A thin alignment control layer used in this embodiment exhibits a second major function, i.e., a synergistic functional effect with the alignment characteristic and gradation control characteristic given by the particle size of the fine particle-dispersion film. This point will be described hereinbelow.

An electrode substrate provided with a transparent electrode of ITO, etc., is generally accompanied with a naturally occurring unevenness fluctuation on the order of several tens to several hundreds Å. When such an electrode plate is coated with a thin alignment control layer of, e.g., 30 Å, followed by aligning treatment and cell construction to provide a parallel cell arrangement (FIG. 20(a)), a local alignment irregularity or even an alignment defect can occur. Further, if such a device is used in matrix gradational display drive, there can occur a difference in voltage transmittance characteristic among pixels, as shown in FIG. 21 or a poor gradational characteristic (γ characteristic).

Figure 21:
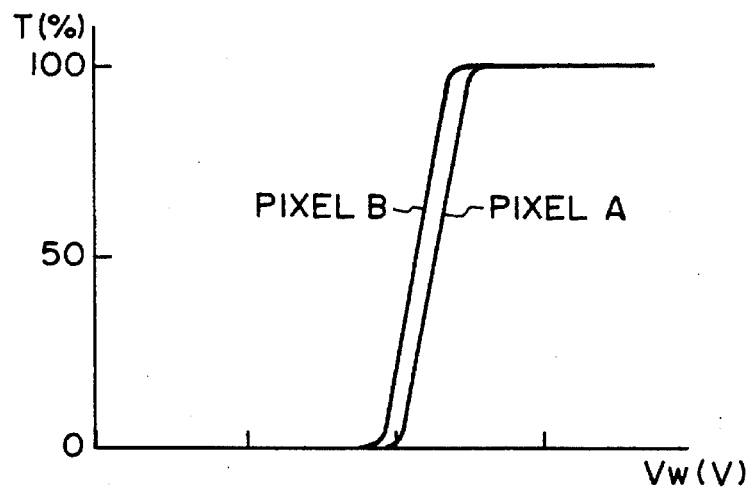
FIGS. 21–23 are respectively a graph showing a voltage-transmittance characteristic of a liquid crystal device.

In contrast thereto, if the above-mentioned fine particle-dispersion layer is disposed according to the present invention, a relative long periodical unevenness can remain but the respective minute portions are covered with short periodical unevennesses to provide a good alignment characteristic with little fluctuation among pixels, as shown in FIG. 21 and also a good gradation characteristic.

In the present invention, the fine particles used have an average particle size which is larger than an ordinary FLC molecule length (on the order of 10–30 Å) but at most ten times the FLC molecules length. This is considered to be a reason why a good gradation characteristic and a smooth switching characteristic are attained without causing alignment defects.

The thickness of the alignment control layer used in this embodiment may be at most about the above-mentioned short period, thus providing an alignment uniformity and a good gradation characteristic.

Figure 20:
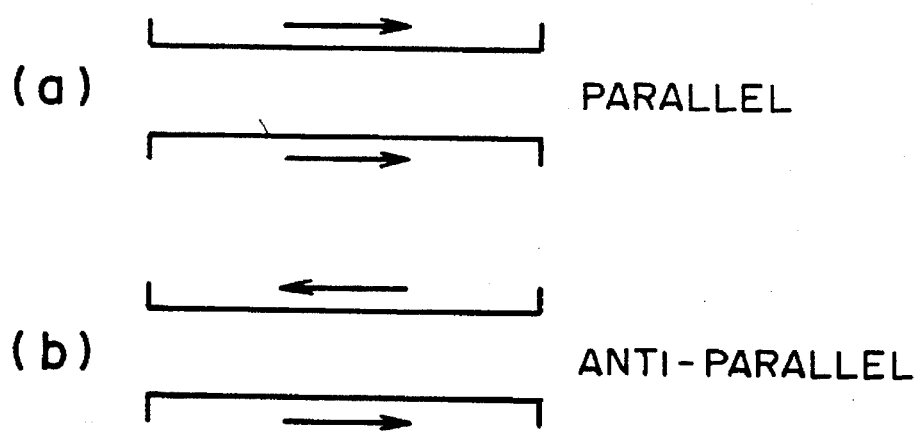
FIGS. 20(a) and (b) are schematic illustrations of rubbing directions of a liquid crystal device.

In a specific example of the liquid crystal device according to this embodiment, a cell was prepared by rubbing alignment control layers ("LQ 1802") on a pair of substrates and stacking the substrates to each other to form an anti-parallel cell (FIG. 20(b)), which was then filled with an FLC. In the cell immediately after the filling, the cell entirely could show a splay alignment state in some cases. In such a case, when the cell was supplied with a rectangular AC voltage of 30 volts and 10 Hz, a uniform alignment state of a high homogeneity could be obtained while providing an increased apparent switching angle between memory states of the FLC molecules.

When the cell was driven for gradational display, a good gradation characteristic was attained.

As a comparison, a cell was prepared by coating the same electrode substrates directly with 30 Å-thick polyimide films, followed by rubbing and stacking to each other, to form an anti-parallel cell. The cell could only show clearly inferior alignment characteristic and gradation characteristic.

Figure 23:
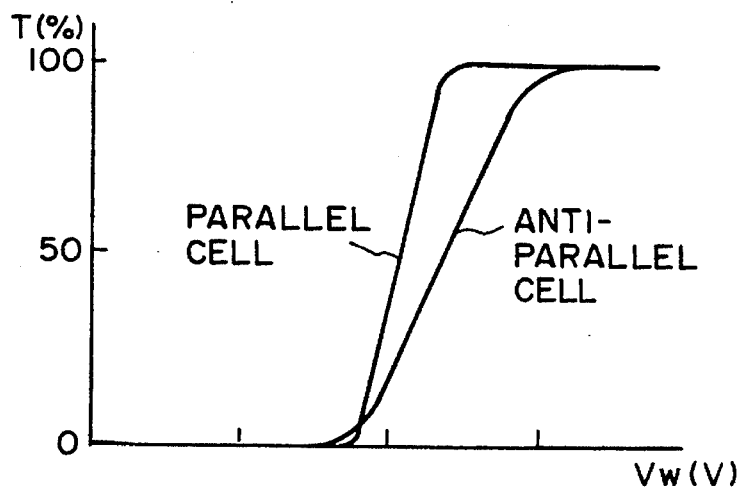

Incidentally, an anti-parallel cell obtained by stacking a pair of substrates so that their rubbing directions were parallel and opposite to each other on both sides of the liquid crystal layer could provided a better γ-characteristic than that of a parallel cell having rubbing directions which were parallel and identical (FIG. 23).

In order to provide a good film property, the fine particle-dispersion film may preferably be formed by the above-mentioned fine particles together with a binder or matrix resin which may be selected as showing a good dispersibility of the ultra fine particles or metal fine particle. The film-forming binder or matrix resin may also be selected from conventional alignment film materials, such as polyimide, polyamide and polyvinyl alcohol, or another material such as polysiloxane. Other examples may include electroconductive film-forming materials, such as polypyrrole, polyacetylene, polythiophene, and charge transfer complexes such as polyvinylcarbazole doped with tetracyanoquinodimethane (TCNQ).

In case where the binder or matrix resin is used, it is preferred that the fine particle-dispersion film contains about 10–90 wt. % of the ultrafine powder.

The fine particle dispersion film may preferably be formed in a relatively small thickness of about 300–1500 Å.

It has been also found effective to apply a surface treatment for providing a lower surface energy onto the alignment control layer as by a vapor deposition of a silane coupling agent within a non-excessive extent for the purpose of stabilizing the gradation characteristic. The surface treatment is considered to be effective in enhancing the effects of the above-mentioned short periodical unevenness provided by the fine particle-dispersion film which has effects of smoothening the molecular movement at the liquid crystal substrate boundary and removing difficulties, such as local cell thickness change due to unnecessary elastic distortion. This surface treatment is particularly effective where the alignment treatment directions on both sides of the liquid crystal layer are made anti-parallel, and also when an AC application treatment is applied immediately after the liquid crystal injection or filling so as to obtain a uniform alignment. This means that the surface energy lowering treatment has a function of persistently stabilizing the layer structure obtained by the AC treatment.

In the present invention, it is also possible to enhance the uniformity of gradation characteristic by intentionally combining relatively long periodical unevennesses which have a height difference larger than that of the short periodical minute unevennesses given by the fine particles, and are arranged at a pitch larger than an ordinary FLC layer thickness.

FIG. 24(a) is a partial sectional view of a pixel wherein long periodical unevennesses 7 are intentionally provided by patterning or deposition through a mask. FIG. 24(b) is a corresponding plan view showing an arrangement of 5 μm-square projections disposed at a pitch of both vertically and horizontally within a 200 μm-square pixel. Each projection may preferably have a height which is sufficiently small so that the fine particle-dispersion layer 3b can be applied without a substantial application irregularity thereon but is larger than the average particle size of the fine particles, and optimally on the order of 300–5000 Å. The projections 7 may preferably be disposed at a pitch which is equal to or larger than the FLC layer thickness, preferably at least several times the thickness, more specifically at least 0.5 μm, preferably about 1–50 μm, so as to show a synergistic effect with the short periodical unevennesses. Such unevennesses may be formed with an inorganic insulating substance such as $SiO_2$; a metal such as Al, Ti or Au; a transparent conductive oxide, such as $SnO_2$, $Tn_2O_3$, or ITO, or a resin such as polyimide or polyamide by a known patterning technique or deposition technique. The long periodic unevennesses may be formed at a constant pitch or different pitches within a pixel. One pixel may be provided with a region where the unevenness are formed in a different pitch. Further, the unevennesses may be formed at locally different heights within a pixel. The unevennesses can also be formed in the form of lines or stripes, or islands.

In this case, the thin alignment control layer on the fine particle-dispersion film can also be formed as a known oblique evaporation layer of an inorganic substance, such as SiO or $TiO_2$ desirably with a columnar length of at most 400 Å, instead of the above-mentioned organic alignment layer. In this case, the unevenness effect given by the lower fine particle-dispersion film is also exhibited and an electroconductive path is formed between the deposited columns, thus showing combined effects of long periodical unevennesses and short periodical unevennesses and providing a good gradation characteristic. In a specific example, a pair of substrates were coated with obliquely evaporated SiO columns and were stacked to each other so that their SiO-evaporated directions were anti-parallel, followed by filling with FLC. As a result, the thus obtained cell provided a good uniform alignment state without applying an AC voltage as described above and realized a gradation characteristic with a high uniformity.

Further, the above unevennesses can also be formed by dispersion of particles so as to increase the uniformity among pixels.

For example, such unevennesses of particles may be formed by extending a dispersion liquid containing core-shell structure particles having a hydrogel shell layer as disclosed in Polymer Preprints, Japan, Vol. 40, No. 11 (1991) 4090–4092, "Preparation of core-shell particles having a hydrogel layer, and surface characteristics thereof", and utilizing the property of self-aligning to precipitate of the particles, whereby an appropriate periodic arrangement structure can be formed. Details of the conditions for obtaining such core-shell structure particles are described in the above reference. Briefly speaking, for example, core-shell structure particles suitable for production of periodical arrangement of unevennesses may be formed by using latex particles as seed or core particles and by using N-isopropylacrylamide as a temperature-sensitive hydrogel shell-forming material. For example, the thus prepared dispersion liquid may be extended to dispose the deposited particles of about 0.4 μm-diameter with an average particles spacing of about 1 μm to several μm on a transparent electrode substrate after drying. These particles may be affixed onto the substrate, e.g., by a thermal treatment. Thereon, the above-mentioned electroconductive fine particle-dispersion layer may be formed by coating.

In the present invention, it is also possible to first form the above-mentioned electroconductive fine particle-dispersion layer, then forming the alignment control layer, followed by aligning treatment, and then dispersing the core-shell structure particles on the alignment control layer.

EXAMPLES

Hereinbelow, the present invention will be described based on examples, which however should not understood to restrict the present invention. Particularly, it should be understood that the disclosed members or elements can be replaced or modified within an extent of accomplishing the objects of the present invention.

Example 1

Figure 25:
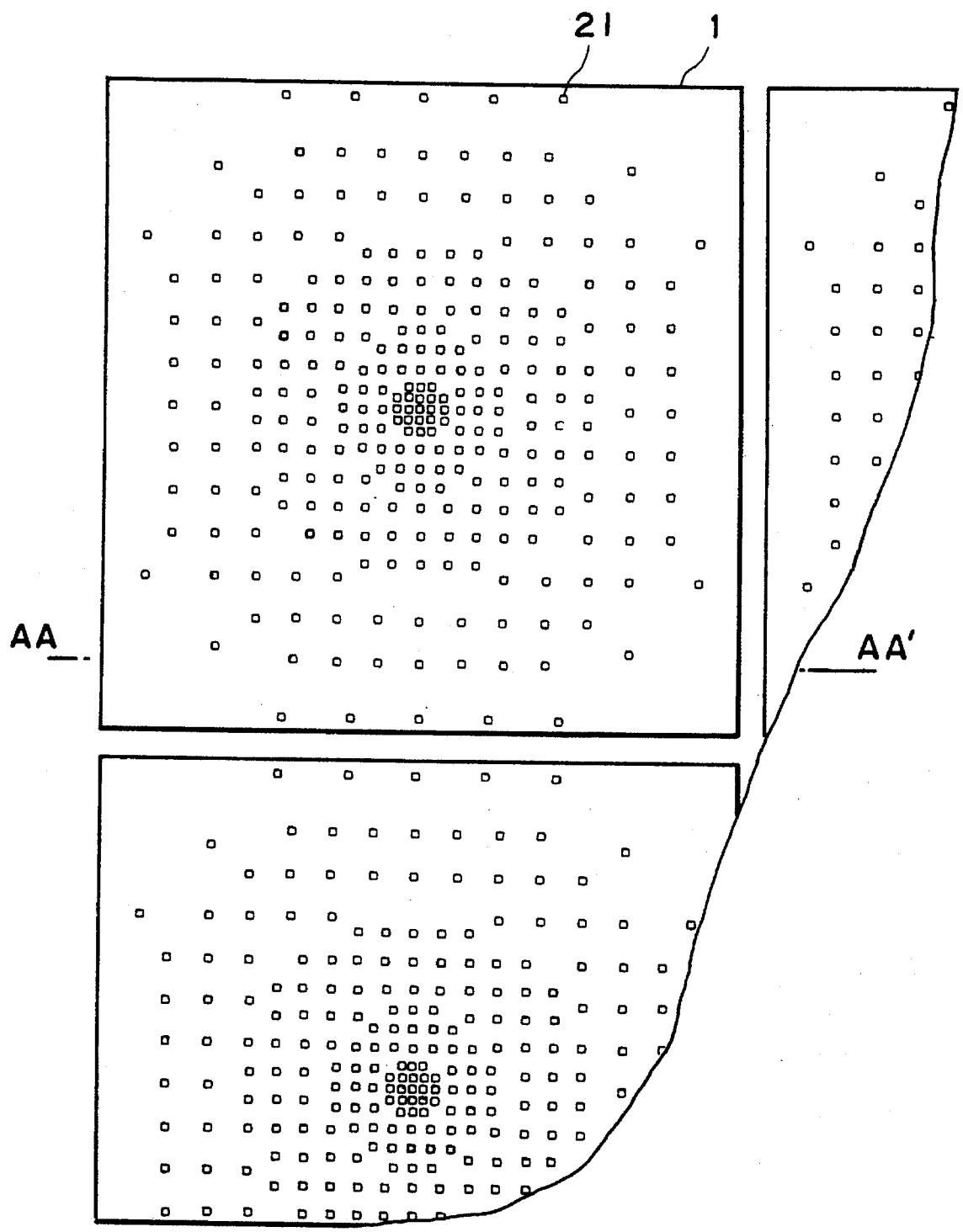
FIG. 25 is a top illustration of an island pattern in Example 1 of the invention.

FIG. 25 shows a pattern of pixels 1 used in this Example. Each pixel 1 was provided with modifications 21 (island-like projections) formed on a transparent film electrode. The projections were disposed densely at a central part and sparsely at a peripheral part. Each pixel had a size of 200 μm-square, and each projection 21 had a size of 2 μm-square. The projections were disposed at a pitch of 2 μm at the central part and at a pitch of 15 μm at a peripheral part, respectively of the pixel.

Figure 26:
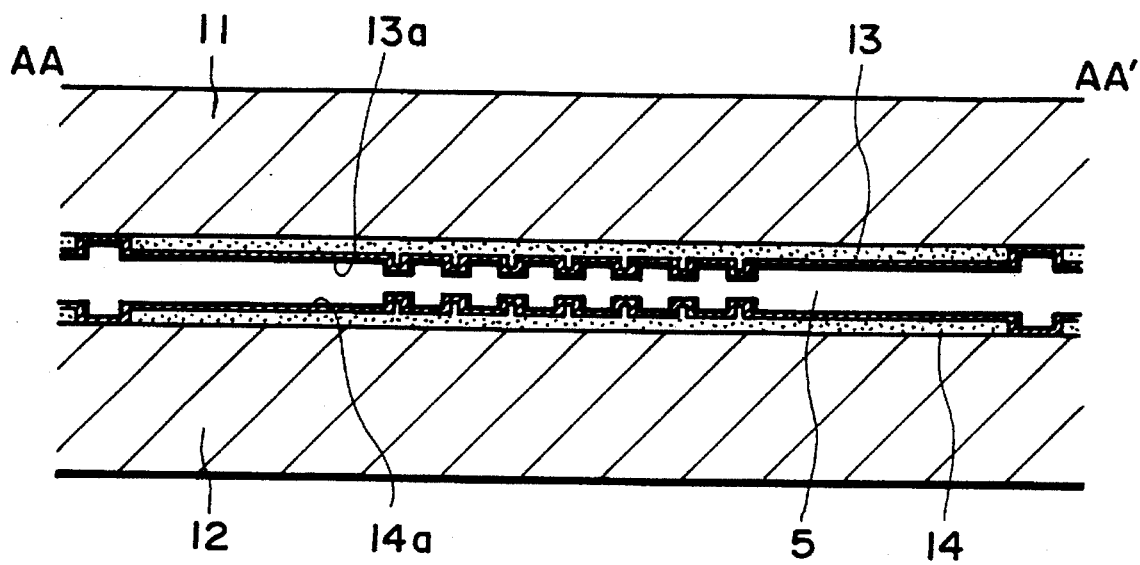
FIG. 26 is a sectional view of an AA–AA' section in FIG. 25.
Figure 27:
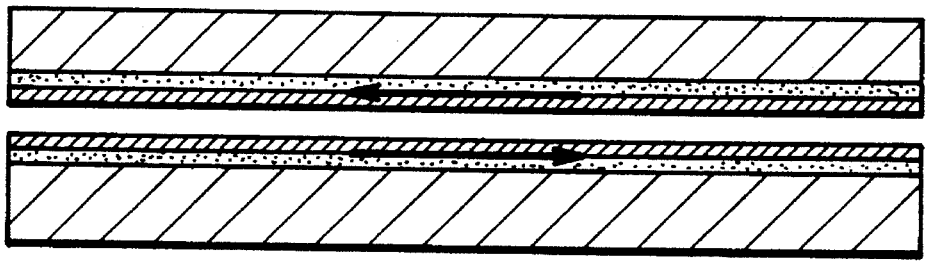
FIGS. 27(a) and (b) are illustrations of rubbing directions in a liquid crystal device.
Figure 27:
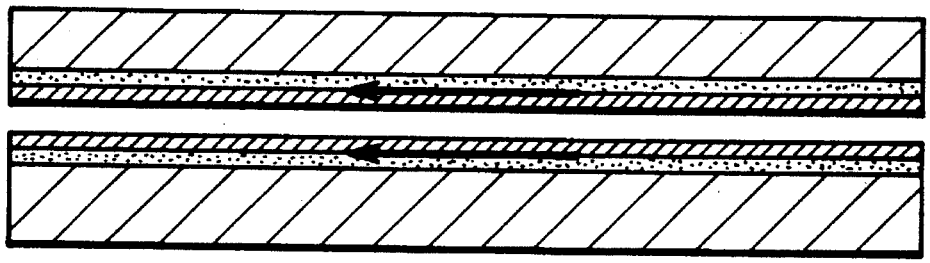
Figure 28:
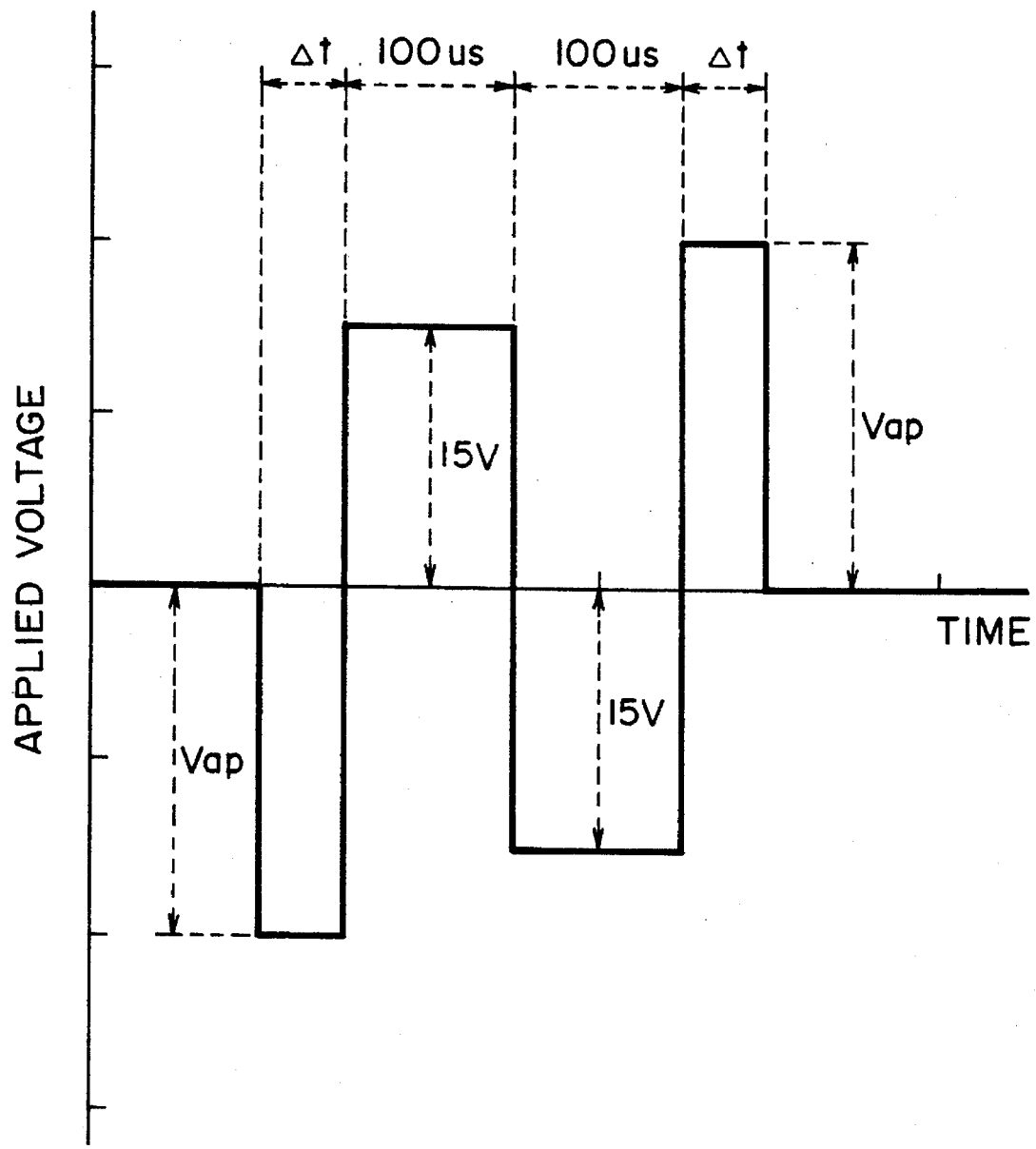
FIG. 28 is a driving voltage waveform diagram applied to a liquid crystal device.
Figure 29:
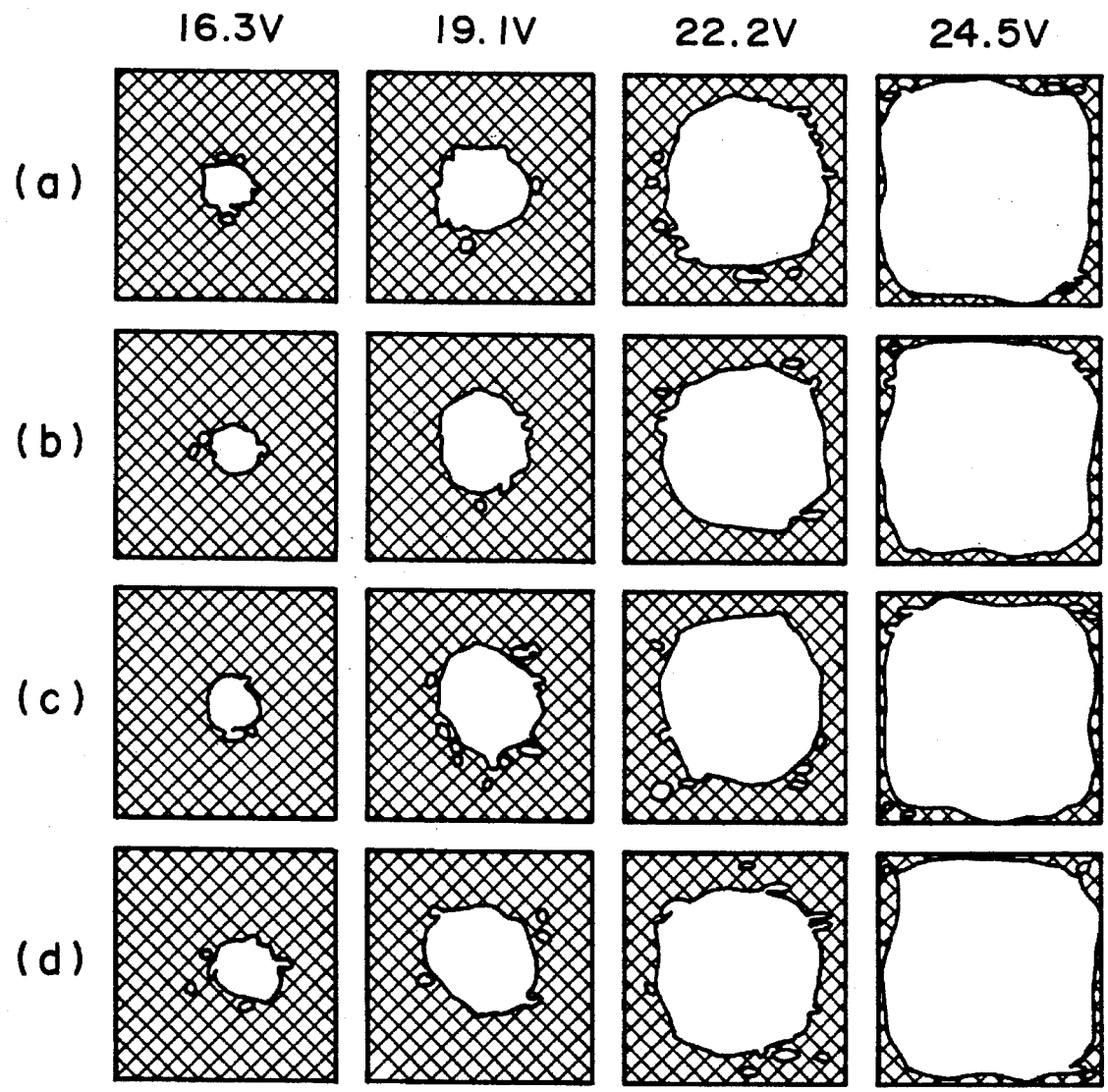
FIG. 29 is an illustration of various inverted domains depending on different applied voltages in Example 1 of the invention.
Figure 30:
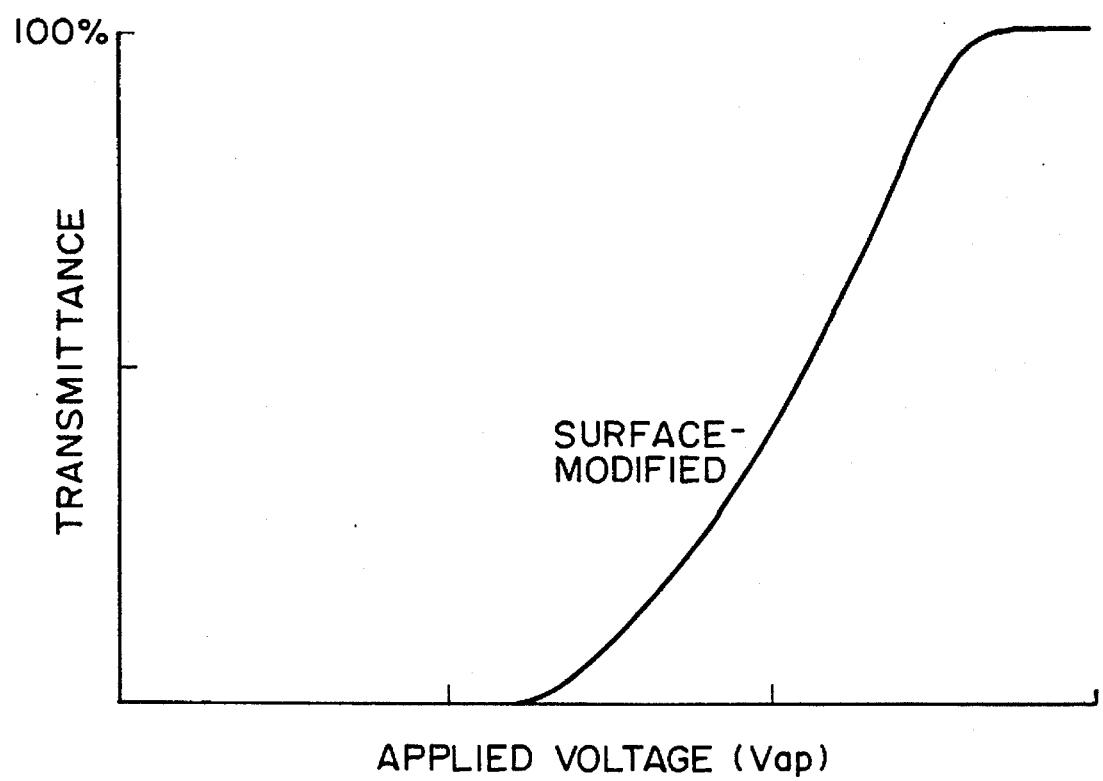
FIG. 30 is a graph showing a voltage-transmittance characteristic in Example 1.

FIG. 26 shows an AA–AA' section in FIG. 25. Glass plates 11 and 12 were coated with 1500 Å-thick ITO films 13 and 14 which were formed into a pixel pattern and provided with the above-described pattern of projections through two cycles of photolithographic steps. The projections had a stepwise height of about 7700 Å. Thereon, 200 Å-thick polyimide films were formed and rubbed to form alignment films 13a and 14a. The thus treated substrates were applied to each other so as to form a parallel cell as shown in FIG. 27(b) with a cell gap of 1.2 μm therebetween, and the gap was filled with a ferroelectric liquid crystal (a blend based on a commercially available ferroelectric liquid crystal "CS-1014" available from Chisso K.K.). The cell showed a good alignment. Between a pair of electrodes of the cell thus prepared, pulse voltages as shown in FIG. 28 were applied to examine the optical response characteristic. In this Example, Δt=50 μs, Vap=16–30 volts. A matrix of 4×4 pixels with the initial state of black were examined by applying different pulse voltages Vap for the respective columns to examine the inverted domain shapes, the results of which are shown in FIG. 29. The transmittance fluctuation among pixels for each applied voltage was very small, and the occurrence centers (centers of gravity) of the inverted domains were all found at the central part of each pixel. Further, as shown in FIG. 30, as a result of the surface modification with projections, the controllability of gradational display was improved.

Example 2

Figure 31:
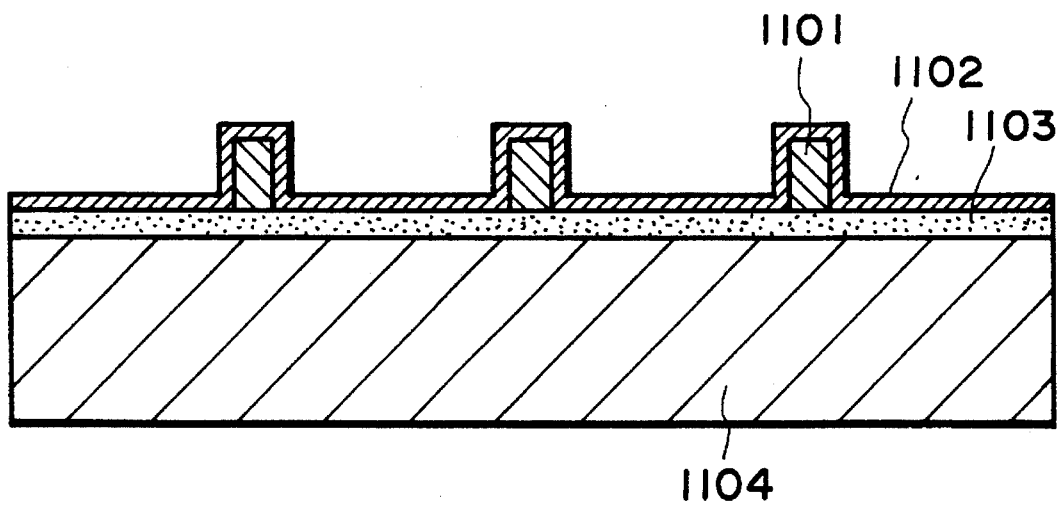
FIG. 31 is a sectional view of an island pattern adopted in Example 2 of the invention.

A liquid crystal cell was prepared by forming square projections similar to those in Example 1 with $SiO_2$. FIG. 31 shows a section of an electrode substrate used herein. A glass substrate 1104 was coated with a 700 Å-thick ITO film 1103 and then with an 800 Å-thick $SiO_2$ sputtered film, which was then patterned photolithographically into square projections 1101. Then, an alignment layer 1102 was formed thereon by oblique evaporation of $SiO_2$.

Pairs of substrates thus treated were assembled to form both a parallel cell and an anti-parallel cell (FIGS. 27(a) and 27(b), wherein the arrows represent the oblique evaporation directions). Then, the cells were examined with respect to the optical response characteristics. As a result, the cells showed a good and uniform gradational display characteristic similarly as in Example 1, whereas the anti-parallel cell showed a more uniform gradational characteristic and a larger γvalue.

Example 3

Figure 32:
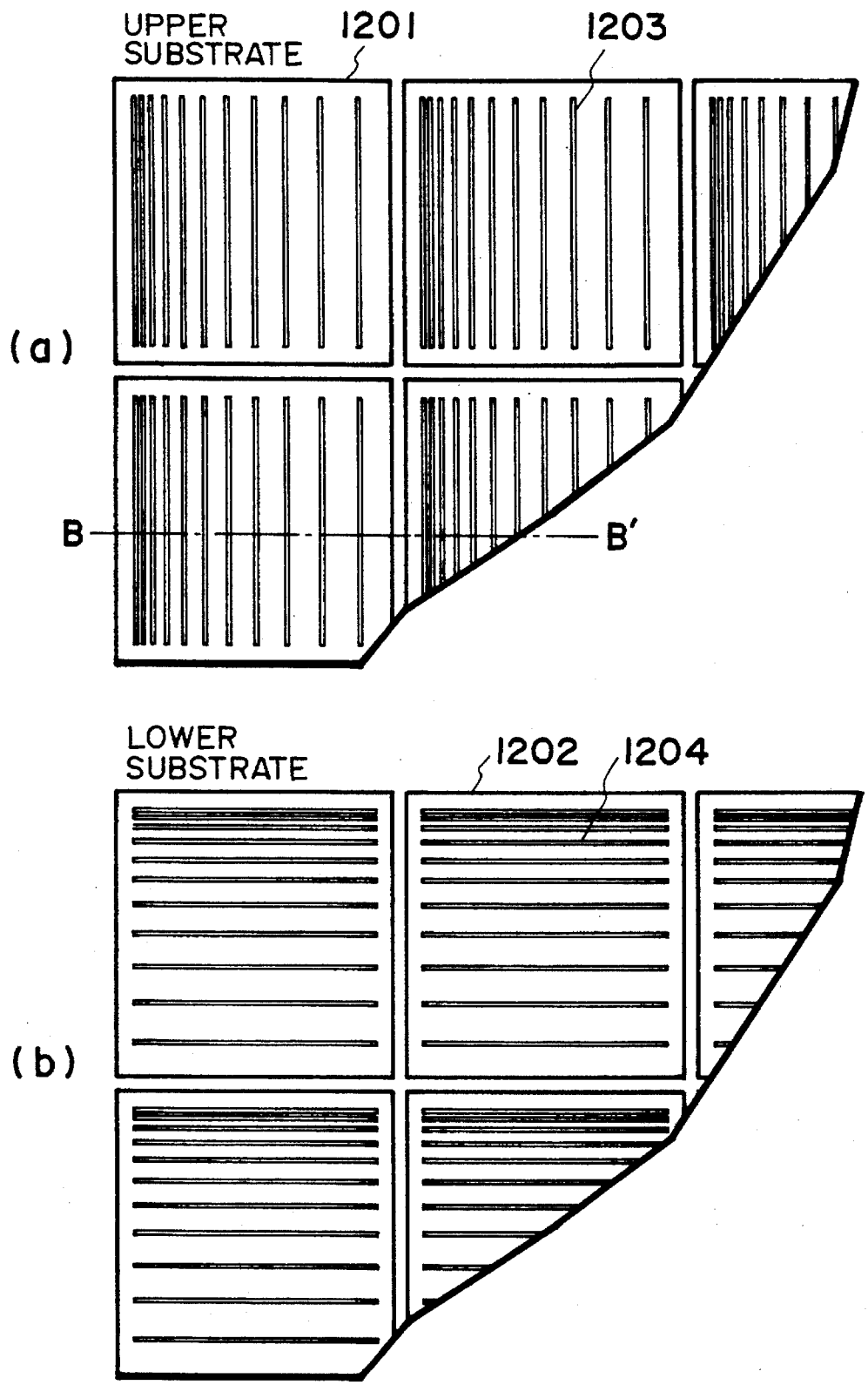
FIG. 32(a)–(b) are illustrations of a stripe pattern used in Example 3 of the invention.
Figure 33:
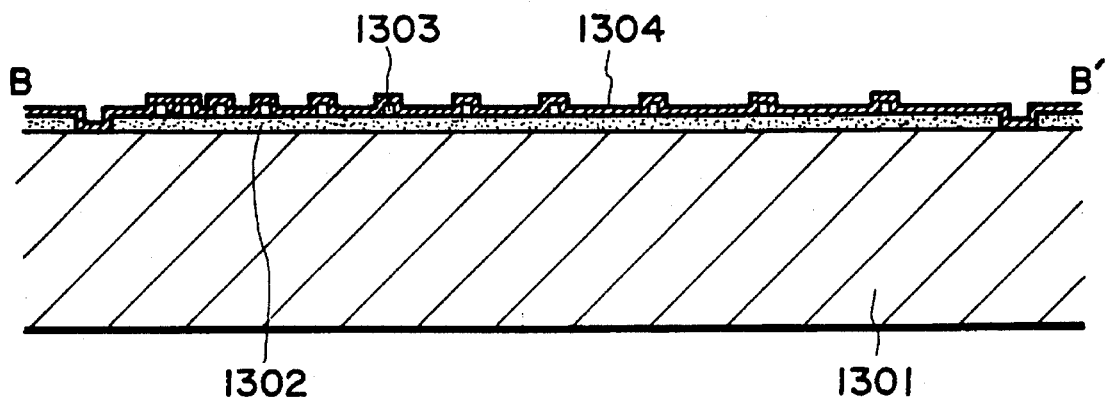
FIG. 33(a) is a sectional view of a B–B' section in FIG. 32.

In this Example, stripe projections 1203 and 1204 were formed in pixels 1201 and 1202 respectively. Each pixel had a size of 100 μm-square, and each stripe projection had a width of 2 μm. The stripe projections were arranged at pitches gradually increasing from 2 μm (densest part) to 12 μm (sparsest part). The upper substrate and the lower substrate were disposed so that their stripe projections were perpendicular to each other with respect to each pixel. FIG. 33 shows a B–B' section in FIG. 32. Thus, a glass substrate 1301 was provided with 700 Å-thick patterned ITO electrodes 1302, thereon stripe projections 1303 formed by patterning a 200 Å-thick Pt film, and then further coated with a 200 Å-thick polyimide film 1304, which was then rubbed in the direction of the stripes on the upper substrate.

Figure 34:
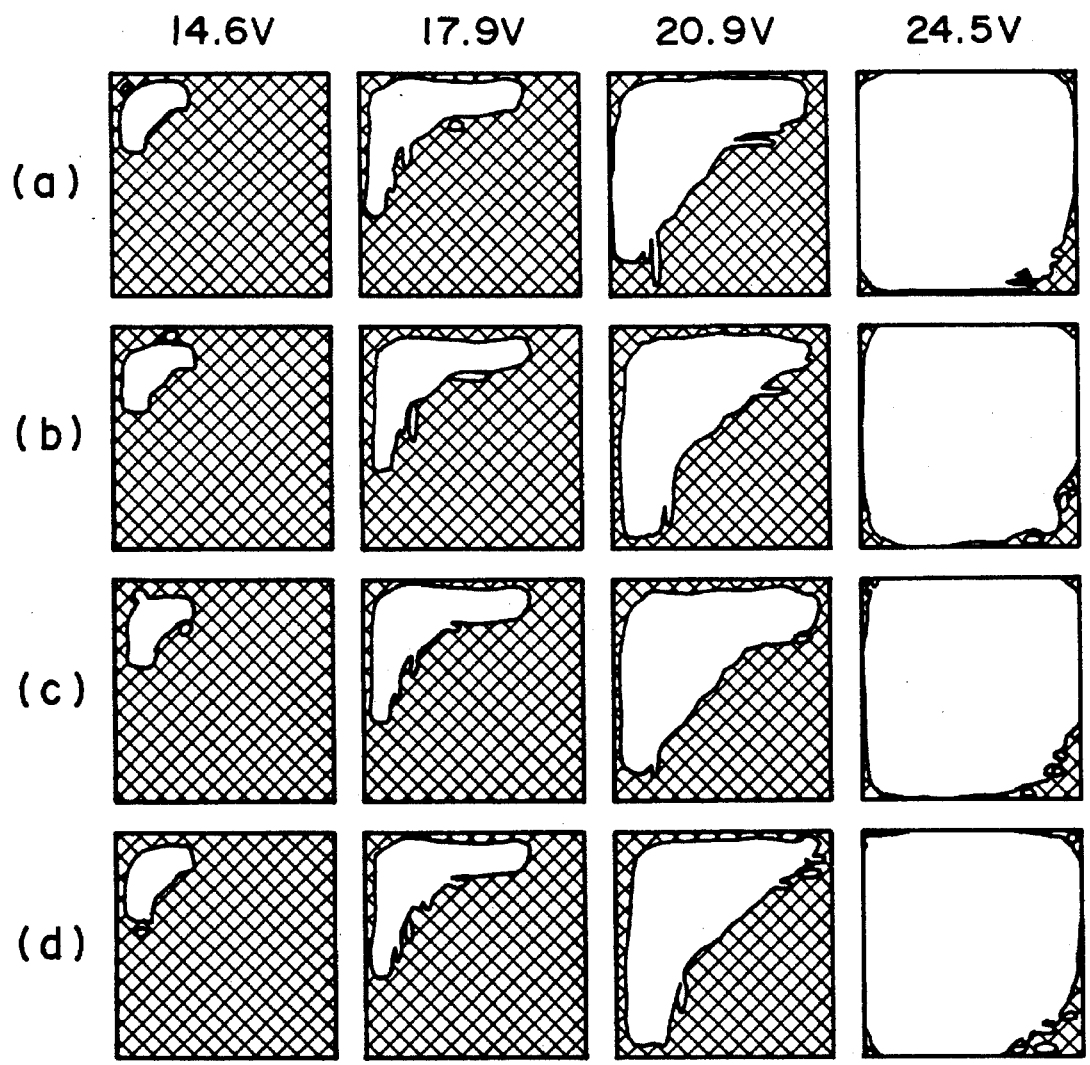
FIG. 34 is an illustration of pixels showing domains formed by application of different voltages.

The thus treated pair of substrates were affixed to each other so as to form an anti-parallel cell. The cell thus prepared with 4×4 pixels in initially black state was supplied with pulse voltages in the same manner as in Example 1 with different amplitudes of pulse voltages Vap for each column to examine the inverted domain shapes, the results of which are shown in FIG. 34. As shown in FIG. 34, the inverted domains were grown with an upper left part as the occurrence center (center of gravity). The transmittance fluctuation among the pixels in each column was very small, and a display device with a uniform and rich gradation characteristic could be obtained.

Example 4

In this Example, stripe projections similar to those formed in Example 1 were disposed at a high density at a central part and at a low density at a peripheral part. FIG. 35 shows a schematic view showing a pixel pattern used in this Example. A lower substrate and an upper substrate were provided with stripe projections 1501 and 1502, respectively. In a pixel of this Example, an inverted domain was grown from the center of the pixel as a domain growth center by application of a halftone display voltage. As the applied voltage increased, the domain area was enlarged while the center of gravity of the growing domain was always at the center of the pixel, thus effecting a good gradational display was performed on the entire device.

Example 5

FIG. 36 shows a pixel pattern used in this Example.

Each pixel 1 of 200 μm-square was provided with 2 μm-wide stripe-shaped unevennesses 21 disposed with a spacing of 10 μm FIG. 37 shows an AB–AB' section in FIG. 36.

Glass substrates 11 and 12 were provided with 1500 Å-thick films 13 and 14 (as opposing electrodes) which were formed into a pixel pattern and provided with the above-described pattern of unevennesses through two cycles of photolithographic steps. The unevennesses 21 had a stepwise difference of about 200 Å. Thereon, 200 Å-thick polyimide films were formed thereon and rubbed the direction of the stripe unevennesses to form alignment films 13a and 14a.

The thus-treated substrates were applied to each other with a cell gap of 1.2 µm therebetween, and the gap was filled with a ferroelectric liquid crystal (a blend based on "CS-1014"). In this way, two types of cells, i.e., a parallel cell and an anti-parallel cell (FIGS. 27(b) and 27(a)), were prepared by changing the direction of applying two substrates. Both cells prepared in this way showed a good alignment.

Between a pair of opposing electrodes 13 and 14 of each cell, pulse voltages as shown in FIG. 28 were applied to examine the optical response characteristic. In this Example, $\Delta t=50$ µs, Vap=16–30 volts. A matrix of 2×2 pixels with the initial state of black were examined by applying different pulse voltages Vap of about 20 volts to examine the inverted domain shapes, the results of which are shown in FIG. 38 (in the case of an anti-parallel cell).

For the purpose of comparison, a cell with no stripe unevennesses was also prepared. However, the cell provided with stripe unevennesses showed a clearly lower polarity inversion threshold voltage. The domain shape was generally linear and, under application of different voltages, the number and the length of the linear domains were principally changed, so that one-dimensional domain change was confirmed.

The transmittance fluctuation among pixels was very small, and the occurrence centers (centers of gravity) of the inverted domains were all found at the central part of each pixel. Substantially the same results were obtained with respect to the parallel cell.

Further, a cell was prepared by providing the stripe unevennesses to only one of the substrates 11 and 12. However, the cell showed a smaller decrease in polarity inversion threshold voltage and a weak one-dimensional behavior.

Example 6

In this Example, an upper substrate was provided with stripe unevennesses similarly as in example 5, and a lower substrate was provided with stripe unevennesses of $SiO_2$ disposed at different densities within a pixel.

Figure 39:
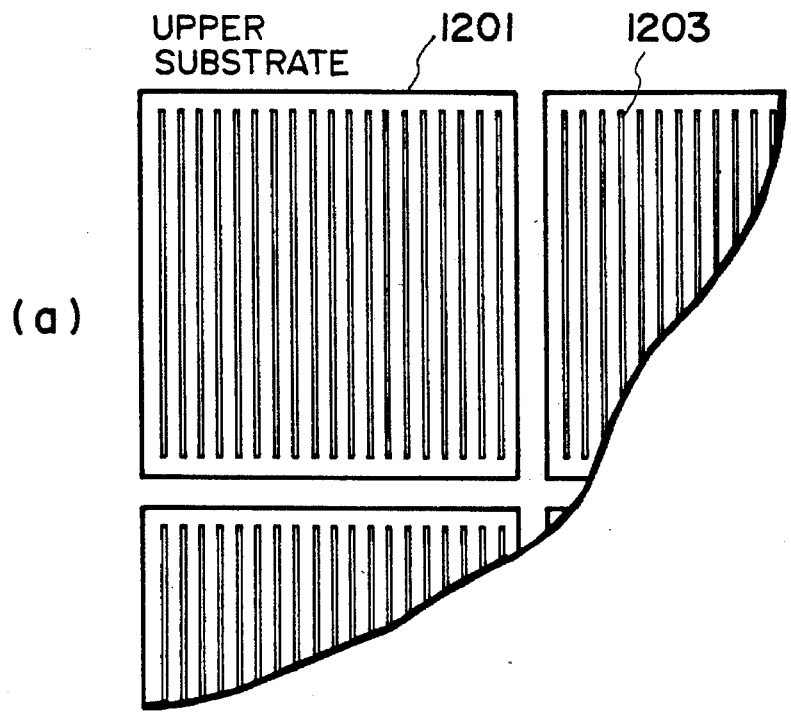
FIG. 39(a)–(b) are illustrations of a pixel pattern used in Example 6.
Figure 39:
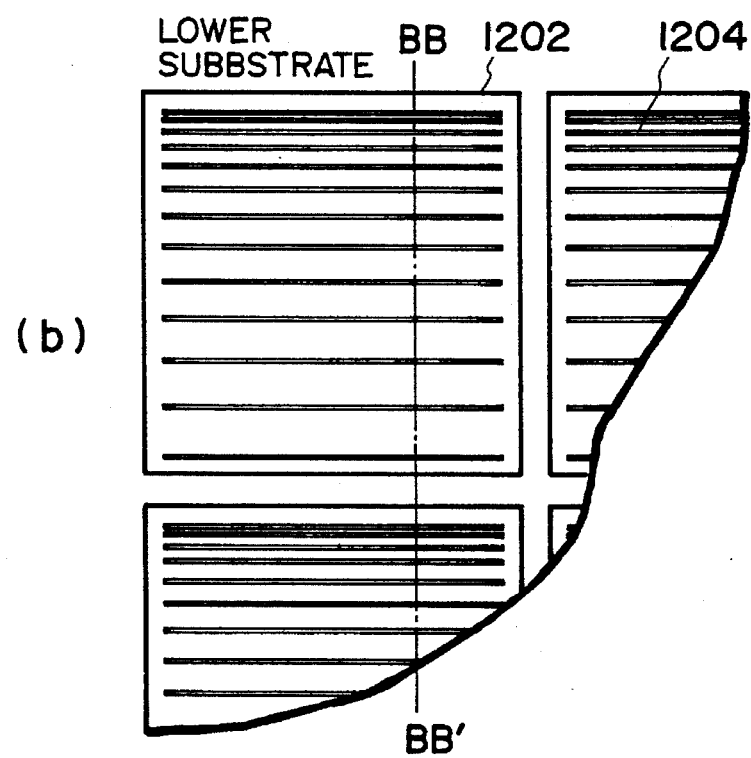

FIG. 39 shows a pixel pattern used in this Example.

Pixels 1201 on an upper substrate and pixels 1202 on a lower substrate were provided with stripe projections 1203 and 1204, respectively.

Each pixel had a size of 100 µm-square, and each stripe projection had a width of 2 µm. The stripe projections on the upper substrate and the lower substrate were designed to intersect perpendicularly with each other. On the lower substrate, the stripe projections were disposed with a spacing of from 2 µm (at the densest part) to 15 µm (at the sparsest part).

Figure 40:
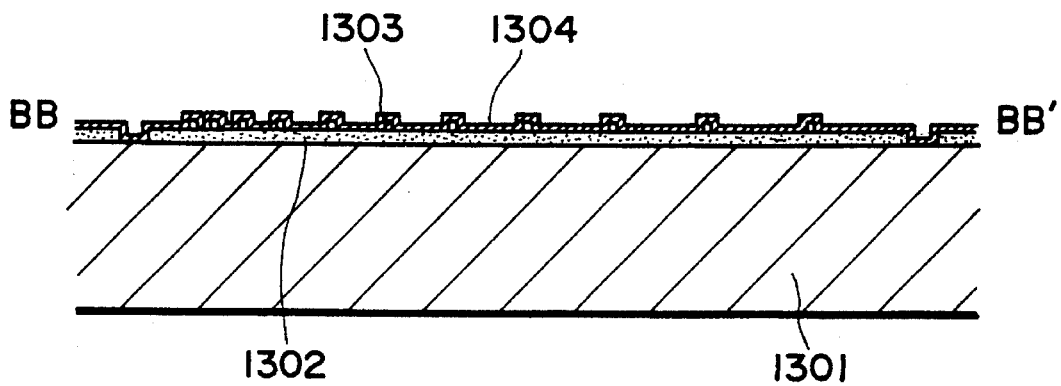
FIG. 40 is a sectional view of a BB–BB' section in FIG. 39(b).

FIG. 40 shows a BB–BB' section in FIG. 39.

The lower substrate 102 included a glass substrate 1301, opposing electrodes 1302 of 700 Å-thick ITO film, 2000 Å-thick stripe projections 1303 of patterned $SiO_2$ film and thereon a 200 Å-thick alignment film 1304 of polyimide rubbing-treated in the direction of the stripe projections 1303 (1204) on the lower substrate.

The upper substrate 1201 was prepared similarly as the lower substrate except that polyimide alignment film thereon was rubbing-treated in a direction perpendicular to the stripe projections.

The thus-prepared upper and lower substrates were applied to each other so as to form a parallel cell with a cell gap of 1.6 µm and filled with a ferroelectric liquid crystal material showing a short helical pitch. The cell was supplied with an AC electric field of ±15 volts and 10 Hz while being cooled from smectic A phase to smectic C phase, whereby the resultant cell showed a good alignment.

Figure 41:
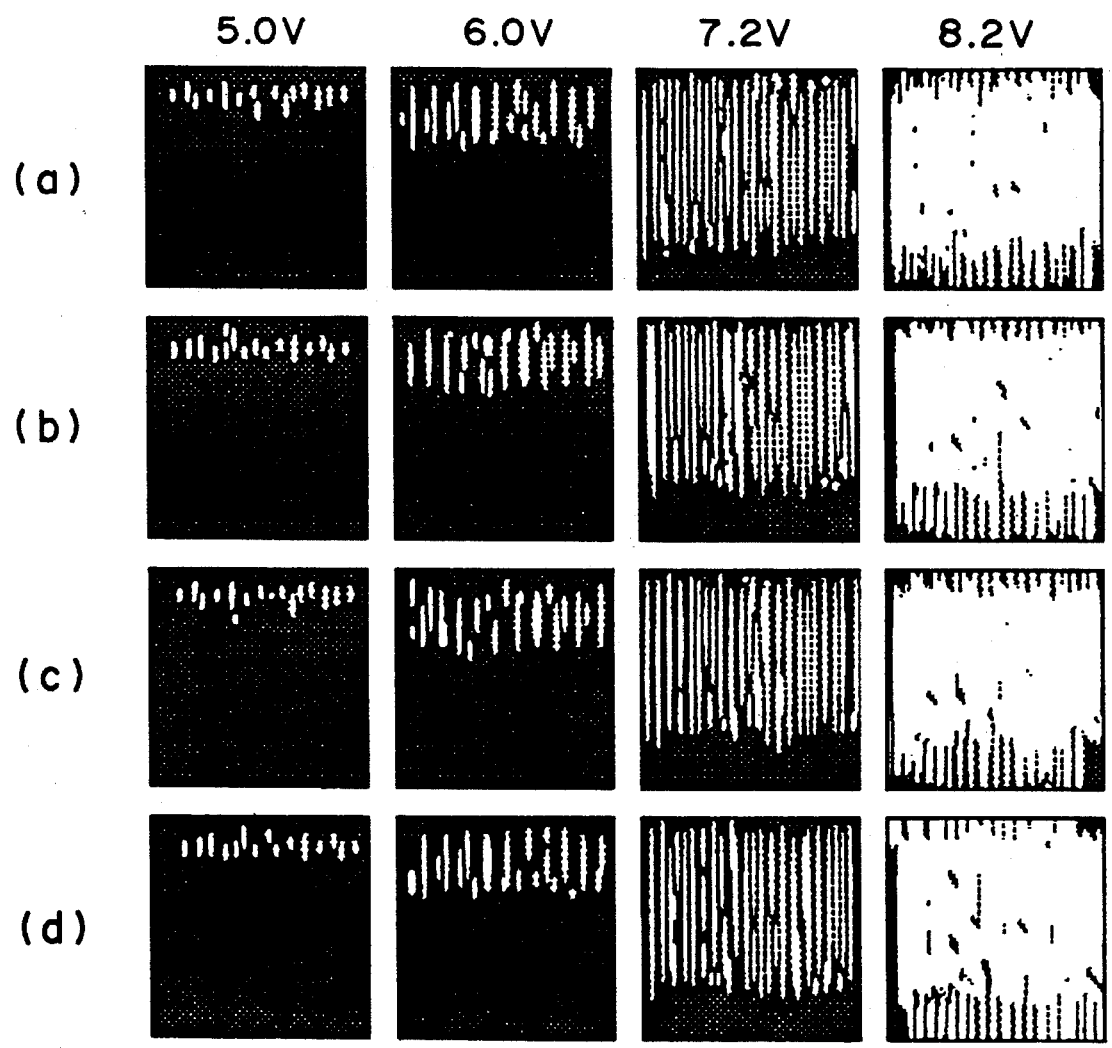
FIGS. 41(a)–(b) are illustrations of polarity-inverted domains observed in Example 6.

The thus-prepared cell with a matrix of 4×4 pixels with the initial state of black was examined by applying a different pulse voltage Vap for each column to observe the inverted domain shapes, the results of which are shown in FIG. 41.

The domains in each pixel showed a good one-dimensional behavior. At a low voltage, the respective pixels showed inverted domains only at the upper parts thereof so that it was confirmed possible to control the position of domain occurrence by the pattern of $SiO_2$ stripe unevennesses provided to the lower substrate, i.e., to provide a regulated threshold voltage distribution. The transmittance fluctuation among pixels at each voltage was very small, and a display device with a uniform and rich gradation characteristic was obtained.

Example 7

Figure 42:
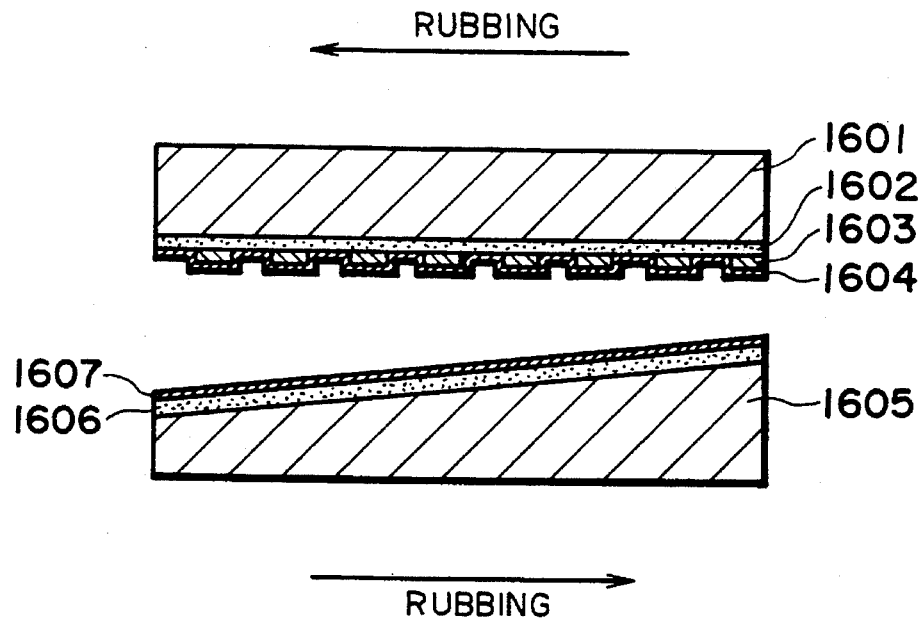
FIG. 42 is a sectional view of a pixel in Example 7.

FIG. 42 is a sectional view showing a pixel used in this Example.

An upper substrate 1601 was coated with a 500 Å-transparent opposing electrode 1602 of ITO on which were further disposed island-shaped (square) projections 1603 of ITO by lifting-off and then a 100 Å-thick alignment layer 1604 of polyimide, followed by rubbing.

On the other hand, a lower substrate 1605 was provided with a slope or gradient within a pixel and coated with a transparent opposing electrode 1606 of 500 Å-thick ITO, and an alignment film 1607 of 100 Å-thick polyimide, followed by rubbing in the maximum gradient direction.

The thus prepared upper substrate 1601 and lower substrate 1605 were applied to each other with a spacer therebetween to form an anti-parallel cell, which was then filled with a ferroelectric liquid crystal to obtain a liquid crystal cell.

Figure 43:
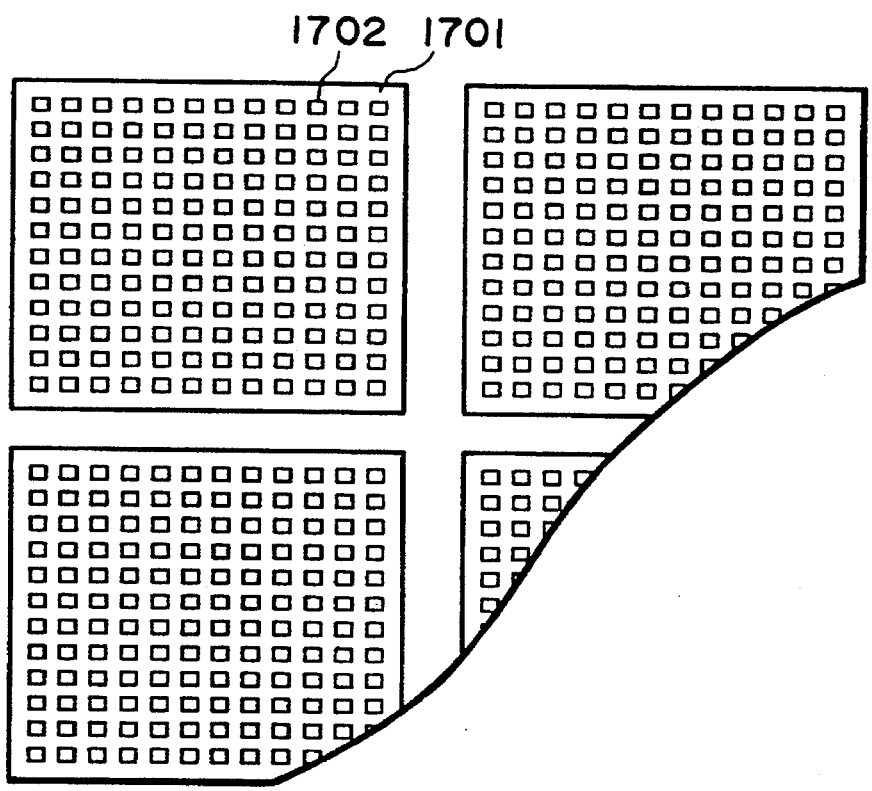
FIG. 43 is a plan view of pixels in Example 7.

FIG. 43 shows a plan view of the upper substrate 1601 including a pixel 1701 and 10 µm-square projection 1702 of 1000 Å in height.

The cell was supplied with different values of voltage to examine the inverted domain shapes, the results of which are shown in FIG. 44. In FIG. 44, at (a) is shown a domain state at a low voltage application, at (b) is shown a medium voltage application, and at (c) is shown a high voltage application. The inverted domains were generally linear, and showed a one-dimensional behavior and a good gradation characteristic.

For the purpose of comparison, a cell was prepared in the same manner as above except that the square projections 1702 were not provided to the upper substrate. The cell showed only a small lowering in polarity inversion threshold voltage, thus failing to provide a large Vsat/Vth ratio between the threshold voltage Vth at a transmittance of 0% and the saturation voltage Vsat at a transmittance of 100%, so that accurate gradation control was impossible.

Example 8

Figure 45:
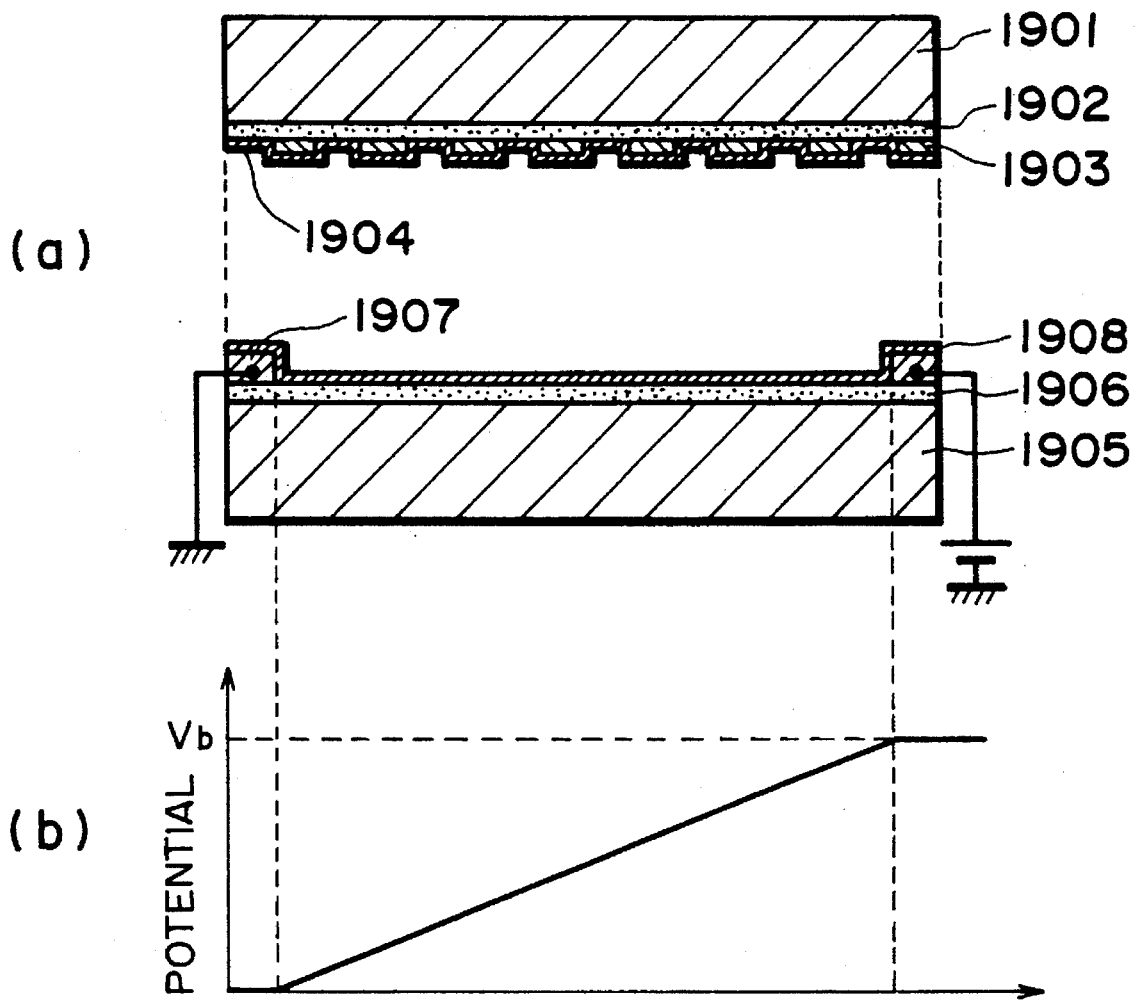
FIGS. 45(a)–(b) are sectional views of a pixel in Example 8.

FIG. 45 is a sectional view used in this Example.

An upper substrate 1901 was coated with a transparent opposing electrode 1902 of 500 Å-thick ITO on which were further disposed island-shaped (square) projections 1903 of ITO by lifting-off and then an alignment film 1904 of 100 μm-thick polyimide, followed by rubbing.

On the other hand, a lower substrate 1905 was coated with an opposing electrode 1906 of 300 Å-thick high-resistivity ITO film showing a sheet resistivity of 1–100 MΩ. Further, on both sides of the opposing electrode 1906 constituting a pixel, 1000 Å-thick Al electrodes 1907 were disposed, and the entire electrodes were covered with an alignment film of 100 Å-thick polyimide, followed by rubbing.

The thus-prepared upper substrate 1901 and lower substrate 1905 were applied to each other with a spacer therebetween to form an anti-parallel cell, which was then filled with a ferroelectric liquid crystal to form a liquid crystal cell.

Then, one of the Al electrodes was grounded, and a bias voltage Vb of about 10 volts was applied to the other to develop a one-dimensional potential gradient in parallel with the rubbing direction in the pixel.

Then, the cell was supplied with different values of voltages between the opposing electrodes 1902 and 1906 to examine the resultant inverted domain shapes. As a result, the inverted domains caused at different voltages were substantially as shown in FIG. 44, and a good gradation characteristic was obtained.

Example 9

Figure 46:
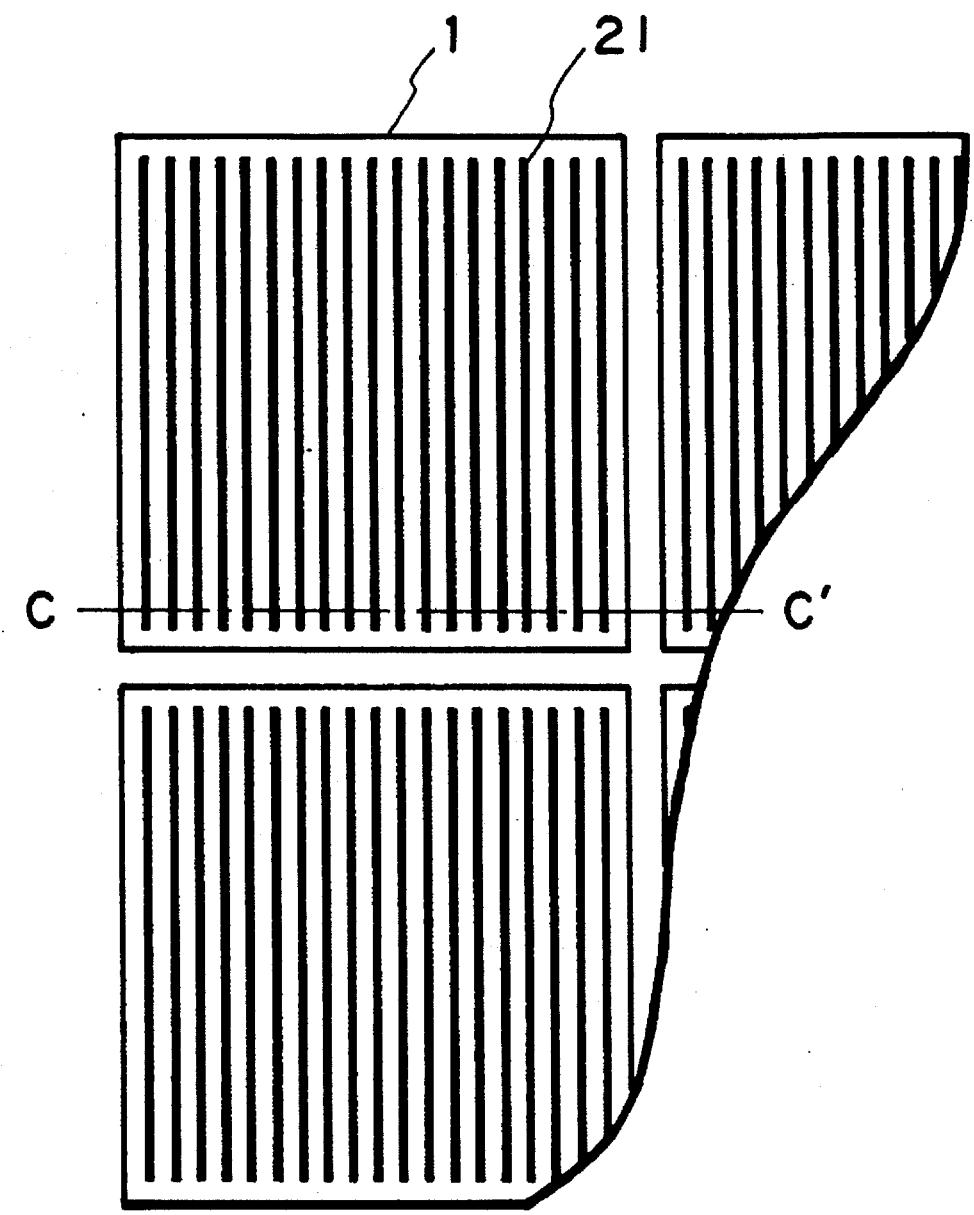
FIG. 46 is a schematic plan view of a stripe pattern used in a liquid crystal display device of Example 9.

FIG. 46 shows a pixel pattern of a liquid crystal display device according to this Example. Each pixel 1 in size of 200 μm-square was provided with stripe projections 21 which were disposed in a width of 3 μm and at a spacing of 5 μm on a transparent film electrode on a substrate.

Figure 47:
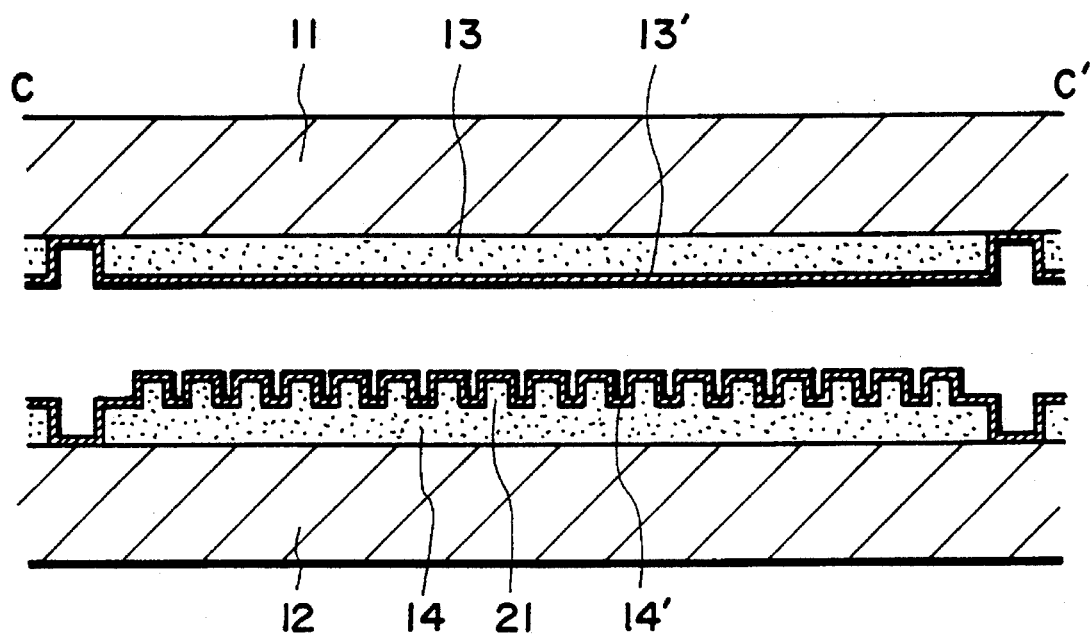
FIG. 47 is a sectional view of a C–C' section in FIG. 46.

FIG. 47 shows a cell section along a C–C' line in FIG. 46. The cell included glass substrates 11 and 12 coated with 150 μm-thick ITO films 13 and 14, the former being formed into a pixel pattern and the latter being formed into a pixel pattern and provided with the stripe projections 21 through two cycles of lithographic steps. The stripe projections were formed to have a height of about 70 nm. The ITO films 13 and 14 were further coated with about 20 nm-thick polyimide films 13a and 14a, followed by rubbing.

Figure 48:
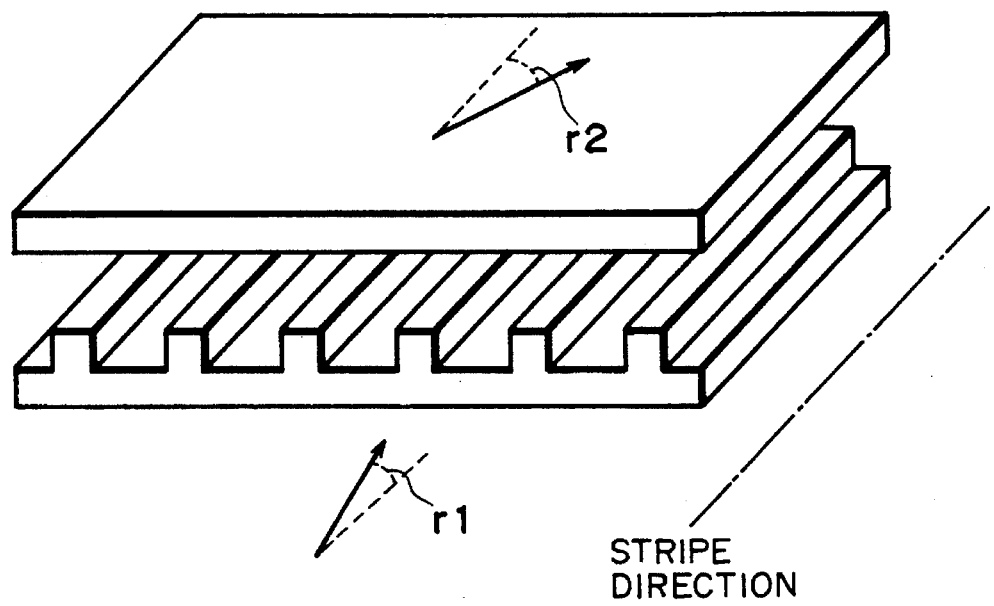
FIG. 48 is a schematic illustration of rubbing directions.

Referring to FIG. 48, the rubbing was effected in a direction of r1 on the lower substrate 12 provided with stripe projections and in a direction of r2 on the upper substrate 11 with no stripe projections. As viewed from the upper substrate toward the lower substrate, the direction r1 was set to form an angle of 0 degrees and the direction r2 was set to form a clockwise angle of 10 degrees, respectively with respect to the stripe direction.

Then, the substrates were applied to each other with a gap of 0.12 μm to form a parallel cell, which was then filled with a ferroelectric liquid crystal (a blend based on "CS-1014") showing a cone angle in chiral smectic C phase of about 15 degrees and chiral pitch of about 10 μm at 30° C.

The thus-prepared liquid crystal cell showed a good alignment. In the cell, the direction of a bisector between the bistable directions of liquid crystal molecules was in a direction forming a counterclockwise angle of –2 degrees with respect to the stripe direction.

Figure 49:
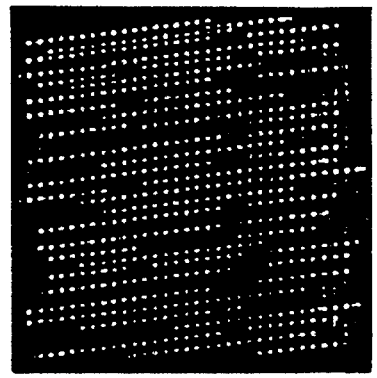
FIGS. 49(a)–(b) are schematic illustrations of inverted domains at different voltages in Example 9.
Figure 49:
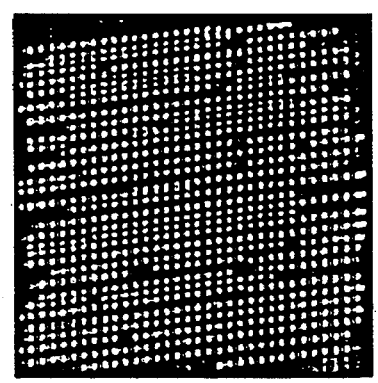
Figure 49:
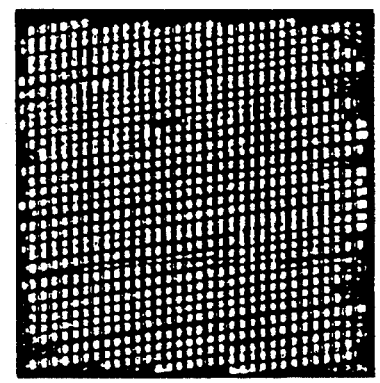
Figure 49:
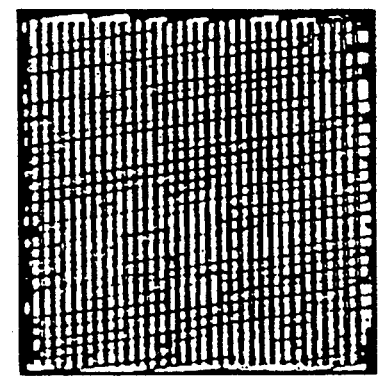

Between a pair of electrodes of the cell thus prepared, pulse voltages as shown in FIG. 28 were applied to examine the optical response characteristic. In this Example, Δt=50 μs, Vap=16–30 volts. A matrix of 4×4 pixels with the initial state of black were examined by applying different pulse voltages Vap for the respective columns to examine the inverted domain shapes. As a result, the pixels supplied with different voltages showed pixel states as shown in FIG. 49. The inverted domains extended in a direction of 88 degrees from the stripe direction. The stripe domains were formed at a pitch of about 8 μm and in a length substantially crossing the pixel. The fluctuation in transmittance among the pixels at an identical voltage was very small, and the inversion center of gravity was constantly in the vicinity of each pixel.

Further, four additional cells were prepared in basically the same manner as above except that the rubbing directions on the upper substrate with no projections were in a direction r2 of 10 degrees, 5 degrees, 0 degrees and –5 degrees with respect to the stripe direction. Each cell showed good characteristics.

Further, an additional cell was prepared by providing similar stripe projections to both substrates while selecting the rubbing directions of r1 and r2 at 0 degrees and –8 degrees, respectively, and applying the substrates each other so that their stripe projections were parallel to each other. The cell thus obtained showed substantially identical results.

Example 10

A liquid crystal cell was prepared in the same manner as in Example 9 except that the rubbing directions r1 and r2 were set to angles of 0 degrees and 180 degrees, respectively. The direction of the bisector between the bistable states in the cell substantially coincided with the stripe direction. As a result of measurement of optical response characteristics in the same manner as in Example 9, it was possible to obtain a uniform display with good gradation control characteristic.

Example 11

Figure 50:
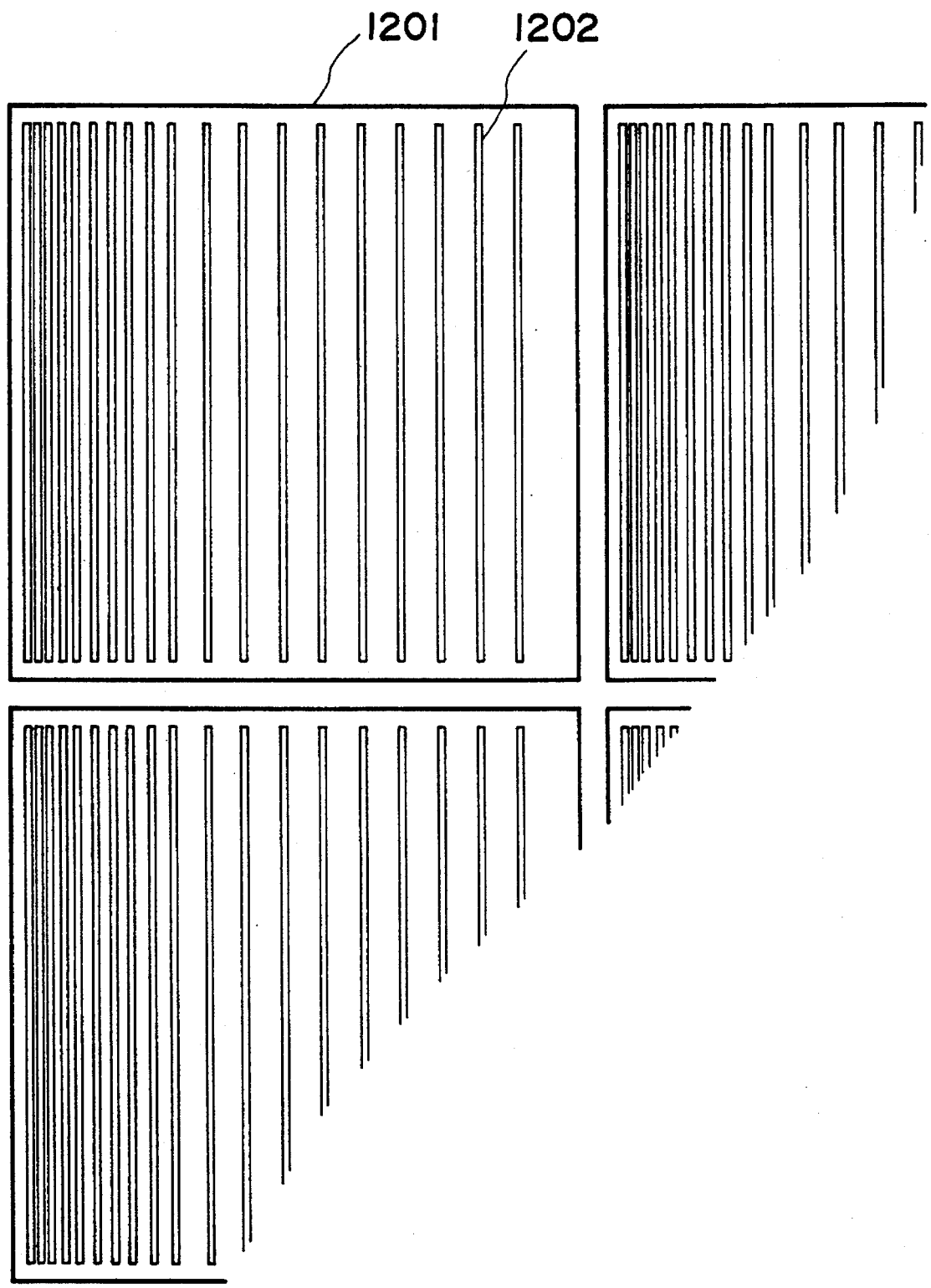
FIG. 50 is a schematic plan view of a stripe pattern used in a liquid crystal display device of Example 11.

FIG. 50 shows a pattern of pixels and stripe projections formed on a substrate used in a liquid crystal display device of this Example. Each pixel 1201 of 200 μm-square was provided with 3 μm-wide stripe projections 1202, which were disposed with a spacing of from 1 μm (at the densest part) to 15 μm (at the sparsest part). A liquid crystal cell was prepared by using the substrate otherwise (preparation method, liquid crystal material and cell gap) in the same manner as in Example a except that r1 and r2 were taken in substantially parallel directions. The cell showed a good alignment state.

Figure 52:
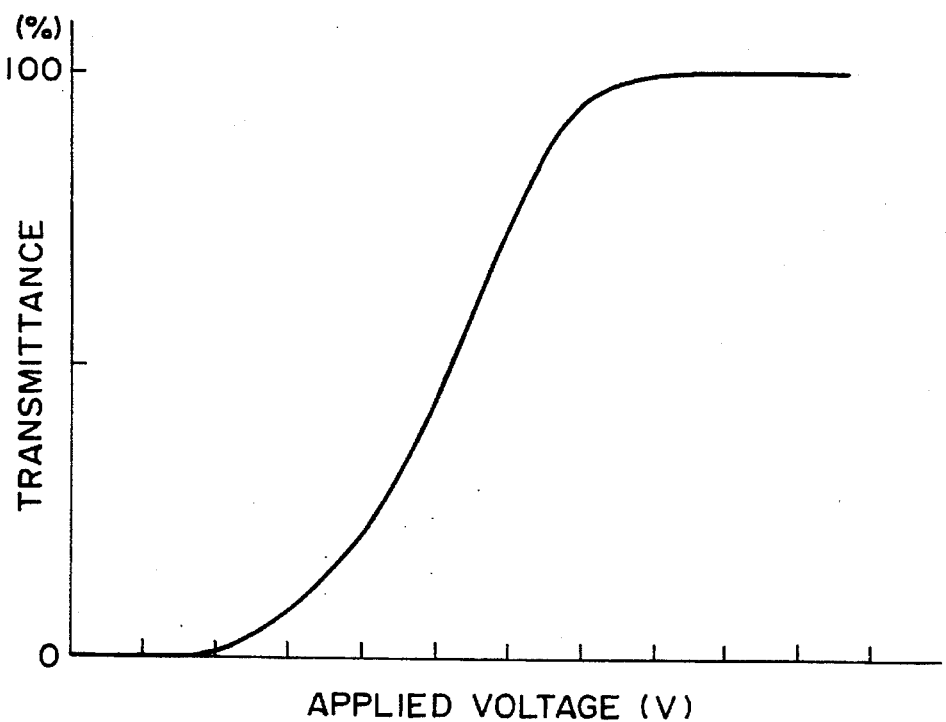
FIG. 52 is a graph showing a voltage-transmittance characteristic.

The cell was provided with cross nicol polarizers set to a position so that one of the bistable states remoter to the stripe direction provided a reset position (black state). The cell was then supplied with different pulse voltages Vap to examine the inverted domain shapes, the results of which are shown in FIG. 51. The inverted domains initially occurred at the position with stripe projections disposed with the narrowest spacing. The voltage-transmittance characteristic curve in this Example is shown in FIG. 52. As shown in FIG. 52, it was possible to take a large gradation control range (voltage width). The transmittance fluctuation among pixels at a constant a voltage was very small, and a display with a uniform and rich gradation characteristic was realized.

Example 12

A liquid crystal cell was prepared basically in the same manner as in Example 11 except that the rubbing on the substrate provided with the stripe projections was omitted and the rubbing treatment on the other substrate alone was performed in a direction r2 at a counterclockwise angle of −10 degrees. The cell provided a substantially identical alignment state as in Example 11 and good optical response characteristics similarly as in Example 11.

Example 13

Figure 53:
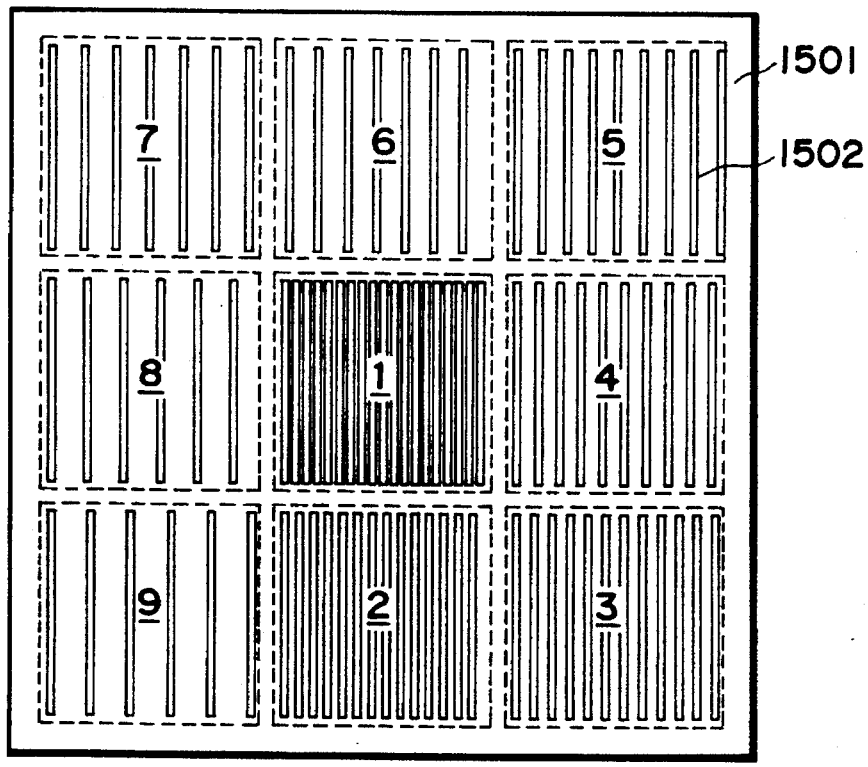
FIG. 53 is a schematic plan view of a stripe pattern used in a liquid crystal display device of Example 13.

FIG. 53 shows a pixel area 1501 of stripe projections 1502. More specifically, each pixel area 1501 of 200 μm-square was divided into 9 regions each provided with stripe projections 1502 of 3 μm in width at respectively different pitches. More specifically, 9 regions had different stripe pitches so that the stripe pitch gradually increased from 1 μm (region 1) to 9 μm (region 9). The stripe projections per se were prepared in the same manner as in Example 9.

A lower substrate having a pixel and projection pattern as described above was combined with an upper substrate identical to the one used in Example 9 so as to prepare a liquid crystal cell otherwise in the same manner as in Example 9. The resultant cell showed a good alignment state.

Figure 54:
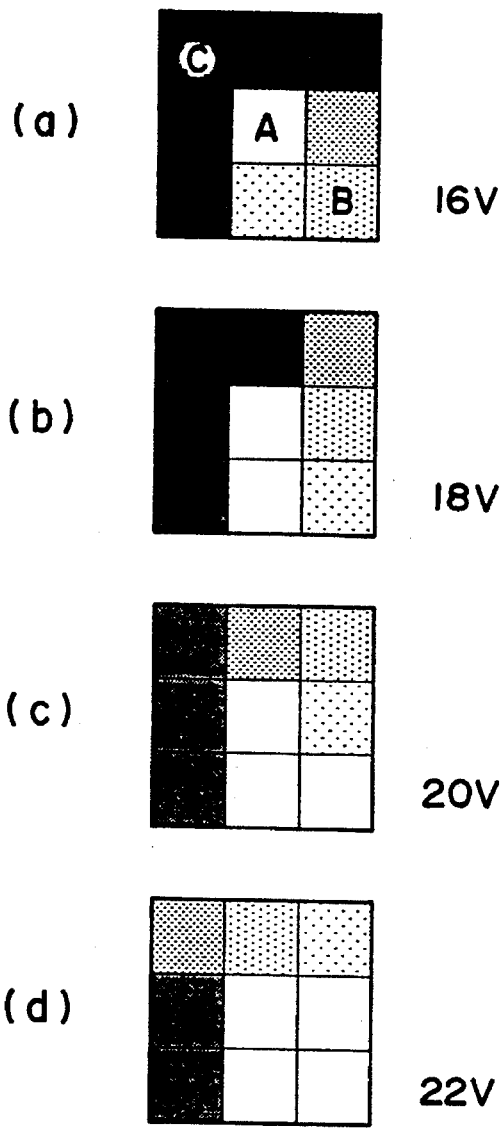
FIG. 54(a)–(b) are is a schematic illustrations of an example of inverted domains at different voltages in Example 13, and the accompanying voltage diagram.
Figure 54:
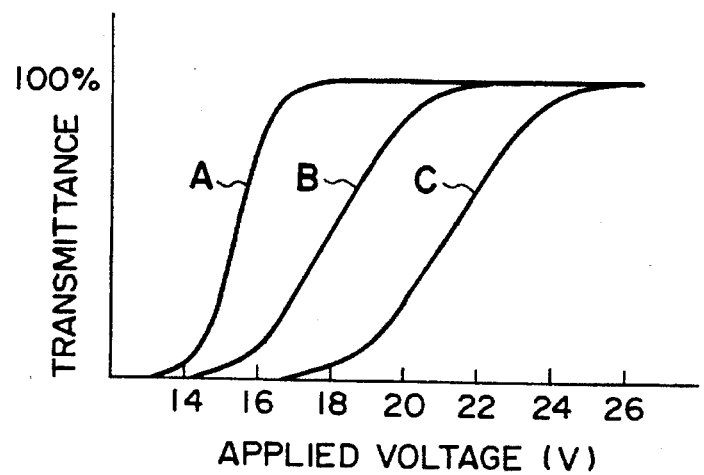

The cell was provided with cross nicol polarizers set to a position so that one of the bistable states remoter to the stripe direction provided a reset position (black state). The cell was then supplied with different pulse voltages Vap to examine the inverted domain shapes, the results of which were schematically as shown in FIG. 54. The inverted domains initially occurred in the region 1 with stripe projections disposed with the narrowest spacing.

At the lower part of FIG. 54, there are also shown voltage-transmittance curves obtained at regions A, B and C (1, 3 and 7 in FIG. 53), respectively.

Figure 55:
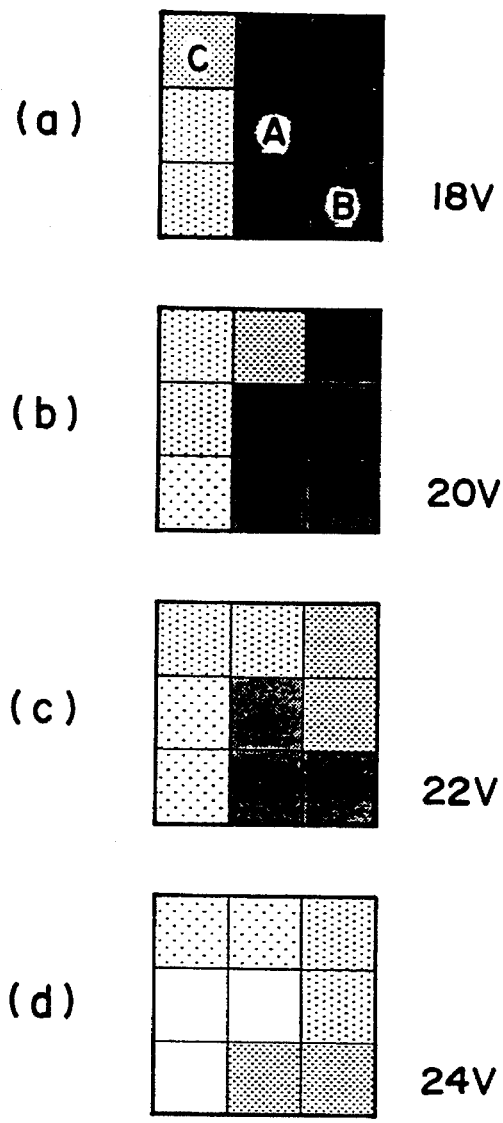
FIG. 55(a)–(b) are schematic illustrations of another example of inverted domains at different voltages in Example 13.
Figure 55:
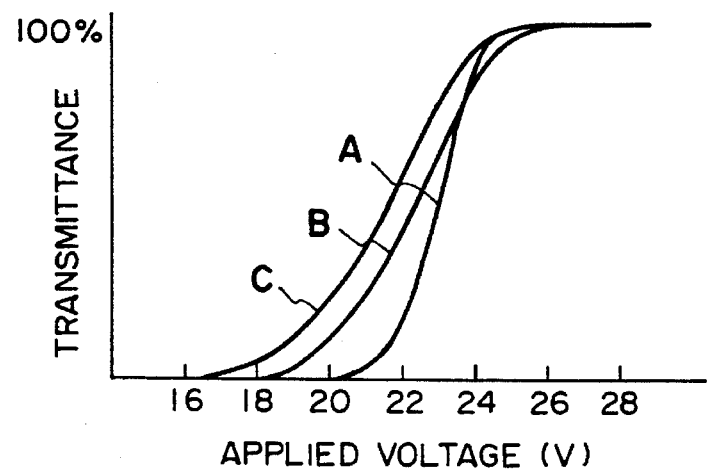

Further, the position of the cross nicol polarizers was shifted so that one of the bistable states of liquid crystal molecules closer to the stripe direction provided a reset position (black state). The cell was then supplied with different voltages Vap to examine the inverted domain shapes, the results of which were schematically as shown in FIG. 55. The inverted domains initially occurred in region 9 with the stripe projections disposed with the broadest spacing. At the lower part of FIG. 55, there are also shown voltage-transmittance curves obtained at regions A, B and C (1, 3 and 7 in FIG. 53), respectively.

In any case, it was possible to form plural regions with different inversion threshold voltages within one pixel, and it was possible to realize a display with a uniform and rich gradation characteristic similarly as in Example 11.

Example 14

A liquid crystal cell was prepared in the same manner as in Example 13 inclusive of the use of a lower substrate having stripe projections as shown in FIG. 53 except that the rubbing directions r1 and r2 were set to angles of 0 degree and 180 degrees (anti-parallel), respectively. The cell also provided a display with uniform and provided a display with uniform and rich gradation characteristic similarly as in Example 13.

Example 15

Figure 56:
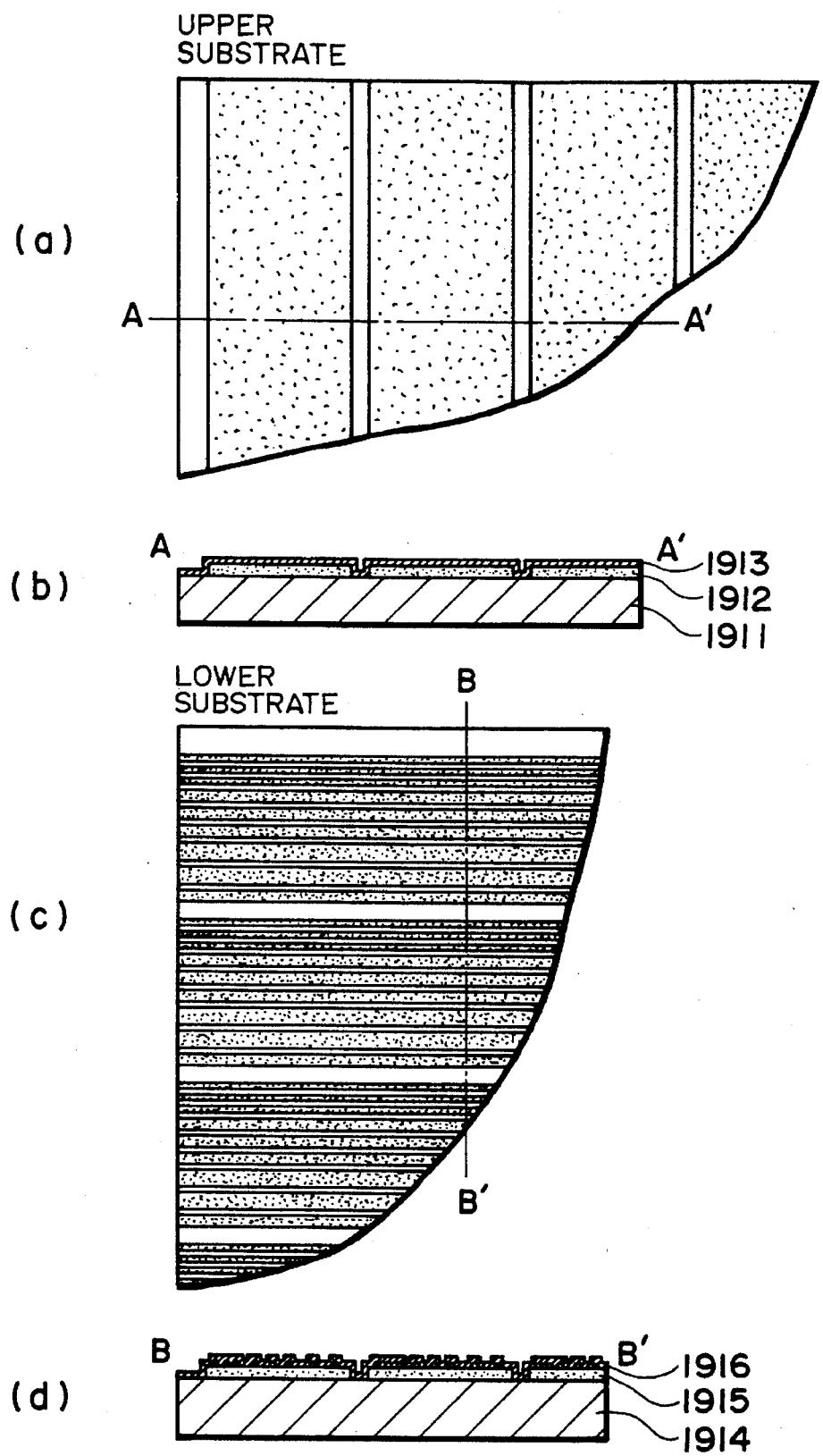
FIG. 56(a)–(b) are a set of schematic views for illustrating a cell structure of a liquid crystal display device.

FIG. 56 illustrates a cell structure of a liquid crystal display according to this Example.

An upper substrate included a glass substrate 1911 provided with patterned ITO (transparent) electrodes 1912 and coated with a polyimide alignment film 1913. A lower substrate included a glass substrate 1914 provided with patterned ITO (transparent) electrodes 1915, ITO stripe projections 1916 formed thereon and a polyimide alignment film 1917. The ITO electrodes 1905 and 1915 were formed in a width of 200 μm and a spacing of 20 μm on both substrates. The stripe projections 1916 on the lower substrate were disposed in a width of 3 μm and at a spacing ranging from 1 μm (at the densest part) to 15 μm (at the sparsest part).

A liquid crystal cell was prepared by using the two substrates otherwise in the same manner as in Example 11 (inclusive of preparation method, liquid crystal material and cell gap) and the rubbing direction r1 and r2 were also substantially parallel as in Example 11.

In this Example, the transparent electrodes and the stripe projections were were continuous over the adjacent pixels inclusive of the spacing therebetween. This arrangement provided a better uniformity by rubbing.

The thus prepared cell was filled with the liquid crystal material of Example 11 by heating the liquid crystal material to isotropic temperature and injecting the material in the direction of the stripes so as to suppress the injection irregularity to the minimum.

The thus obtained cell showed a good alignment state. The cell was provided with cross nicol polarizers set to a position so that one of the bistable states remoter to the stripe direction provided a reset position (black state) and then driven by applying different pulse voltages in the same manner as in Example 11, whereby a good gradational display characteristic was obtained. Further, the position of the cross nicol polarizers was shifted so that one of the bistable states of liquid crystal molecules closer to the stripe direction provided a reset position (black state). The cell was then driven by applying different voltages, whereby a similarly good gradational display characteristic was obtained.

As described above, according to the present invention, it is possible to effect a halftone or gradational display with a desired applied signal-transmittance characteristic (γ-characteristic) while retaining a good reproducibility of halftone display. Further, a good halftone display can be effected at a high speed, an increased number of gradation levels and a high definition without requiring substantial complication of the device structure.

Example 16

In this Example, a liquid crystal optical device according to the present invention as shown in FIG. 18 was prepared.

First, 1.1 mm-thick glass plates 11 and 12 were coated with about 700 Å-thick ITO films 13 and 14 by sputtering to form transparent electrode substrates 10a and 10b.

Then, ultrafine particle mixture of tin oxide-antimony ($SnO_2$-Sb) having an average particle size of 50 Å was dispersed in a siloxane-type polymer dispersion to form a dispersion liquid, which was then applied by a spinner rotating at about 1000–3000 rpm onto the transparent electrode substrates 10a and 10b, followed by heating at 150° C. for 60 min. to form about 1000 Å-thick polysiloxane films 3a and 3b containing 70 wt. % the above ultra fine particles. Incidentally, the film thickness may be controlled within a range of 100 Å to several thousand Å (e.g., 3000 Å) by controlling the polymer dispersion density and the spinner coating conditions. Further, the film conductivity and other electrical properties may be varied widely by changing the mixing ratio of the ultrafine particles and the dispersion ratio thereof within the polymer dispersion liquid.

Then, the fine particle-dispersion films 3a and 3b were coated with a diluted solution of polyimide film-forming liquid ("LQ-1802") having a resin concentration of about 0.8 wt. % by a spinner rotating at 2000 rpm for 20 sec, followed by drying at 80° C. and baking at 270° C. for 1 hour, to form about 30 Å-thick alignment control films 4a and 4b.

The above film thickness was first confirmed with respect to a polyimide film formed on a chromium plate under the same conditions as above by measurement using an automatic ellipsometer (available from Gardner Co.), and then the above-coated film on the device was directly observed through an electron microscope to confirm the presence of pinholes everywhere within the polyimide film and an average film thickness of about 30 Å at the film-retaining portion.

Further, the surfaces of the polyimide films 4a and 4b were rubbed and, then onto one of the polyimide films, a dispersion liquid containing 1.4 μm-dia. silica beads was applied and dried. On the other substrate, an epoxy adhesive was applied at prescribed parts, followed by light degree of drying. Then, the pair of substrates were disporsed and applied to each other so as to form a parallel-rubbing cell (FIG. 20(a)), which was then filled with an ferroelectric liquid crystal material having a spontaneous polarization of about 7 nC/cm$^2$ by injection under vacuum.

Figure 22:
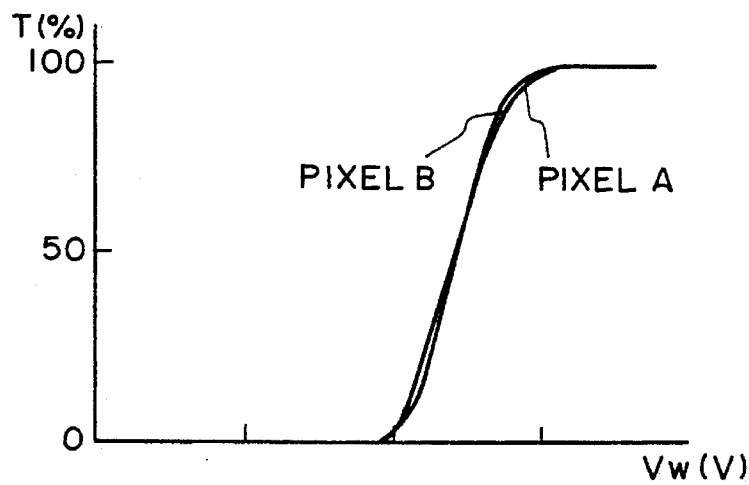

The thus prepared liquid crystal cell showed a uniform alignment state. When the cell was subjected to a matrix gradational drive, a good gradational characteristic was attained with little fluctuation between pixels (A and B) as shown in FIG. 22.

Example 17

A pair of substrates were treated up to formation of the alignment control films in the same manner as in Example 16 and the substrates were applied to each other so as to form an anti-parallel cell, which was then filled with the same ferroelectric liquid crystal material as in Example 16. Immediately after the liquid crystal injection, the liquid crystal assumed a splay state over the entire cell area in some cases. However, if the cell was gradually cooled from the SmA phase to Sm*C phase , of the ferroelectric liquid crystal while applying a rectangular AC electric field of 30 volts and 10 Hz, the ferroelectric liquid crystal assumed a uniform alignment state having a high homogeneity and provided an increased apparent switching tilt angle between the memory states of the ferroelectric liquid crystal molecules.

Figure 57:
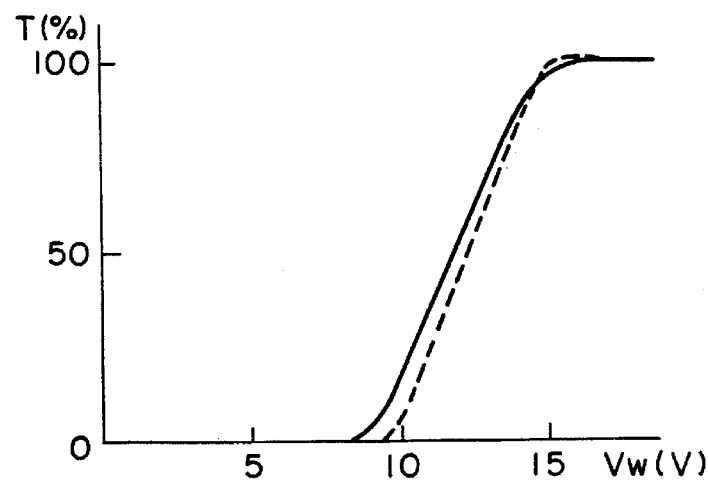
FIG. 57 is a graph showing another example of a voltage-transmittance characteristic curve.

When the cell was subjected to a gradational drive similarly as in Example 16, the cell showed a good gradational display characteristic as represented by a solid line in FIG. 57 which was further better than that of Example 16 as represented by a dashed line in FIG. 57.

Comparative Example 1

A liquid crystal cell was prepared in the same manner as in Example 17 except that the fine particle-dispersion films 3a and 3b were not formed.

The cell, even after the AC application treatment in the same manner as in Example 17, could only provide alignment characteristic and gradation characteristic which were clearly inferior to those of Example 17.

Example 18

Figure 24:
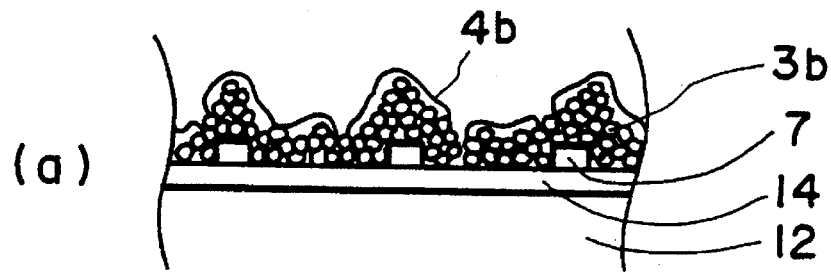
FIGS. 24(a) and (b) are schematic views for illustrating a liquid crystal device according to an embodiment of the present invention.
Figure 24:
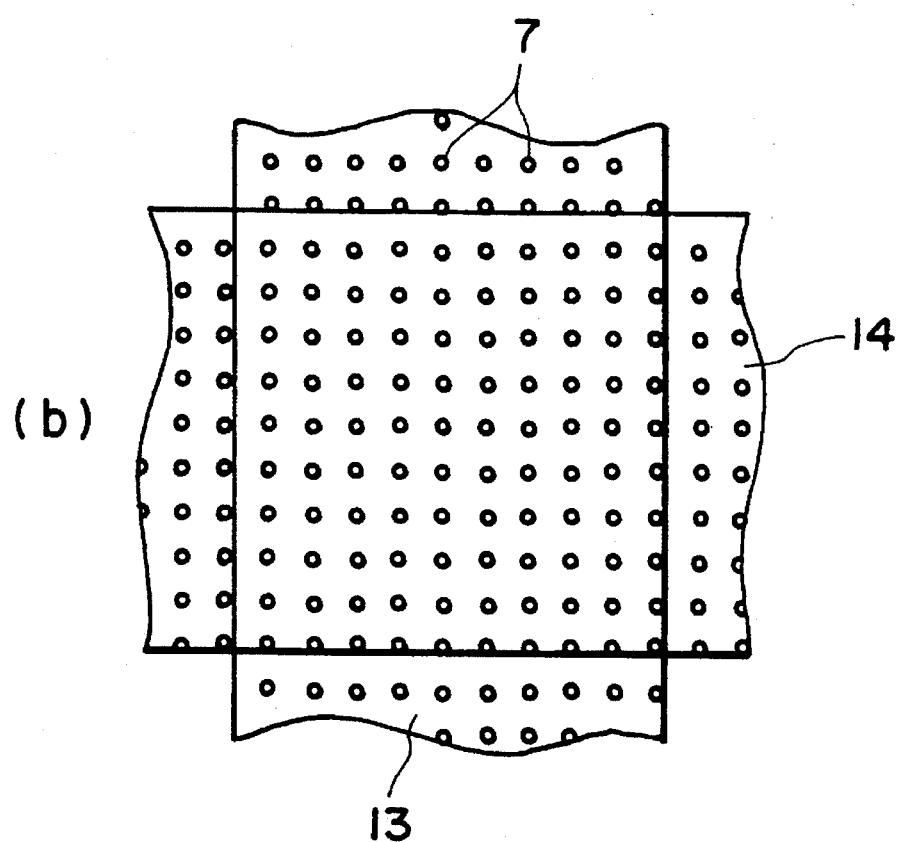

In this Example, a liquid crystal optical device as shown in FIG. 24 was prepared.

Similarly as in Example 16, 1.1 mm-thick glass plates were coated with about 700 Å-thick ITO films 13 and 14 by sputtering to form transparent electrode substrates 10a and 10b, and then coated with about 1000 Å-thick films of SiO$_2$, which were then patterned to leave 5 μm-square projections 7 at a pitch of 20 μm within a pixel area of 200 μm-square.

Then, on the substrates, the fine particle-dispersion films 3a and 3b, and the polyimide alignment control films 4a and 4b were formed in the same manner as in Example 16, whereby pinholes of the polyimide films 4a and 4b were observed everywhere on the fine particle-dispersion films 3a and 3b.

After rubbing the polyimide films 4a and 4b, a cell was prepared in the same manner as in Example 16 and filled with the same ferroelectric liquid crystal material under vacuum.

The thus prepared device of this Example showed a uniform alignment state and showed a further uniform gradational characteristic compared with Example 16.

According to Examples 16–18 as described above, it is possible to provide a liquid crystal optical device suitable for use as a static picture or motion picture display panel having a large area inclusive of a large number of pixels and suitable for gradational drive uniform and good characteristics.

Figure 58:
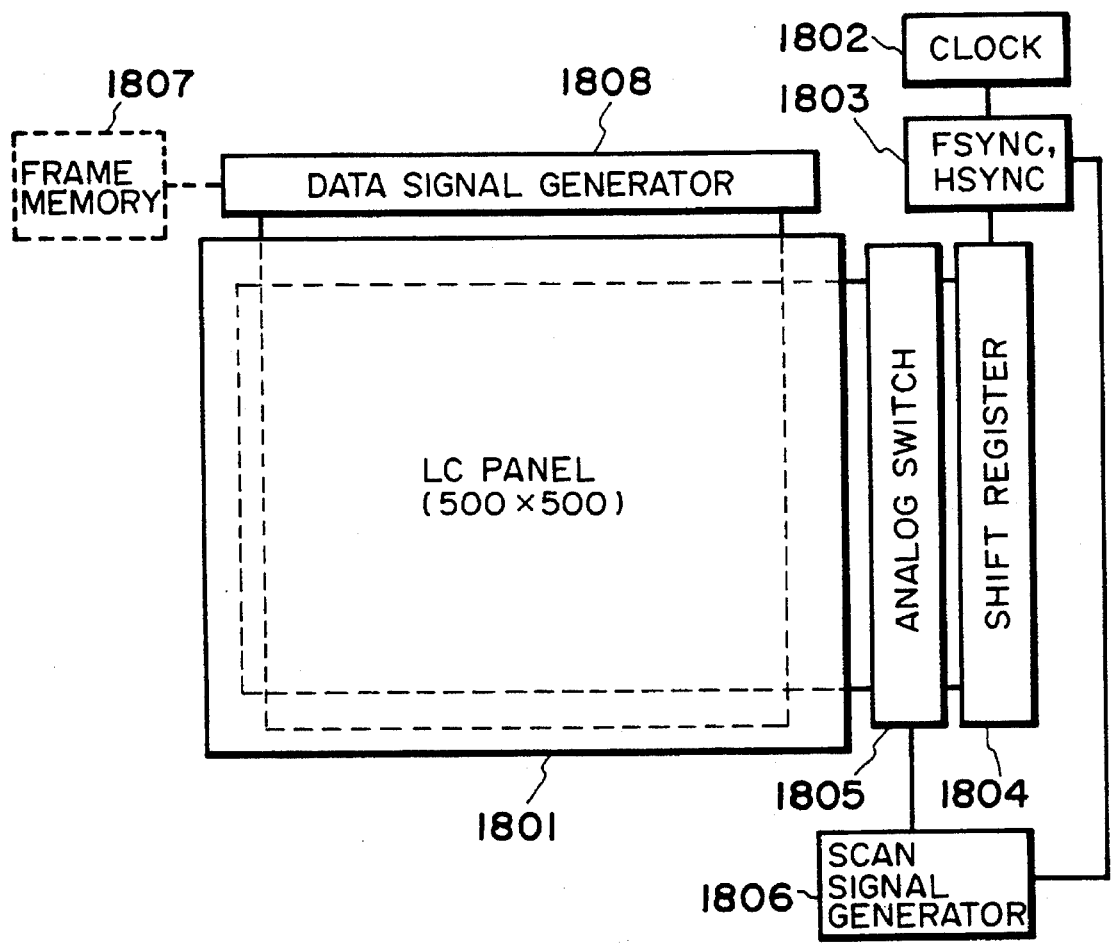
FIG. 58 is a block diagram of a display apparatus including a liquid crystal display device (panel).

FIG. 58 shows an example of an image display apparatus inclusive of an example of the liquid crystal display device (LC panel) according to the present invention. The apparatus includes a LC panel with 500×500 matrix pixels, a clock pulse generator 1802, a synchronizing circuit 1803, a scanning signal waveform generator 1806 inclusive of a shift register 1804 and an analog switch 1805, and a data signal generator 1808 for receiving image data from, e.g., a frame memory 1807, and converting the image data into drive signals. These circuits may be disposed on either one or both of upper and lower sides, and/or on either one or both of left and right sides of a matrix substrate loaded with or constituting the LC panel. Data signal waveforms carrying halftone signals may be applied as voltage-modulated signals as an ordinary method of providing gradational data. However, it is also possible to use pulse-width-modulated signals or phase modulated signals. This is particularly effective when domains coupled by elastic propagation in chiral smectic C layer direction are utilized for domain growth, so as to control the propagation time.

What is claimed is:

1. A liquid crystal device, comprising a plurality of pixels each comprising a pair of opposing electrodes, and a ferroelectric smectic liquid crystal disposed between the opposing electrodes so as to develop bistable states, the liquid crystal device being equipped with a halftone signal application means for applying a halftone signal between the opposing electrodes, each pixel being provided with stripe-shaped projections having substantially equal heights and being disposed with a prescribed spacing therebetween, such that each pixel is provided with locally different threshold voltages so as to develop at least one inverted region corresponding to the halftone signal in a stripe pattern substantially parallel to smectic layers of the liquid crystal.

2. A device according to claim 1, wherein the polarity-inverted region is caused to have a varying size and/or density so as to display a varying halftone.

3. A device according to claim 1, wherein said halftone signal comprises plural signals having different waveheights and/or pulse widths.

4. A liquid crystal device, comprising a plurality of pixels, each comprising a pair of opposing electrodes and a smectic liquid crystal disposed between the opposing electrodes, the liquid crystal device being electrically connected with a halftone signal application means for applying a halftone signal between the opposing electrodes, at least one of the pair of opposing electrodes having stripe-shaped projections thereon having substantially equal heights, each pixel including plural regions wherein the projections are disposed at different spacings so as to selectively switch liquid crystal molecules in a region depending on the spacing of projections in a region depending on a supplied halftone signal.

5. A device according to claim 4, wherein the stripe-shaped projections are covered with a film.

6. A device according to claim 4 wherein the projections are disposed at a spacing which gradually increases in a prescribed direction.

7. A device according to claim 4, wherein the other one of the opposing electrodes has a substantially flat surface.

8. A device according to claim 4, wherein each pixel is provided with nine regions having mutually different spacings for projections.

9. A device according to claim 4, wherein said one of the opposing electrodes is an elongated transparent electrode and the stripe-shaped projections are disposed thereon in parallel with a direction of the elongation.

10. A liquid crystal device, comprising a plurality of pixels, each comprising a pair of opposing electrodes and a liquid crystal assuming either one of two orientation states depending on a voltage applied thereto disposed between the opposing electrodes, the liquid crystal device being electrically connected with a halftone signal application means for applying a halftone signal between the opposing electrodes, at least one of the pair of opposing electrodes having stripe-shaped projections thereon having substantially equal heights, each pixel including plural regions wherein the projections are disposed at different spacings so as to selectively switch liquid crystal molecules in a region depending on the spacing of projections in a region depending on a supplied halftone signal.

11. A device according to claim 10, wherein the stripe-shaped projections are covered with a film.

12. A device according to claim 10, wherein the projections are disposed at a spacing which gradually increases in a prescribed direction.

13. A device according to claim 10, wherein the other one of the pair of opposing electrodes has a substantially flat surface.

14. A device according to claim 10, wherein each pixel is provided with nine regions having mutually different spacings for projections.

15. A device according to claim 10, wherein said one of the opposing electrodes is an elongated transparent electrode and the stripe-shape projections are disposed thereon in parallel with the direction of the elongation.

16. A device according to claim 4 or 10, wherein said stripe-shaped projections comprise a conductor.

17. A device according to claim 4 or 10, wherein said stripe-shaped projections comprise an insulating material.

18. A liquid crystal device comprising:

a plurality of pixels each comprising a pair of opposing electrodes and a liquid crystal disposed therebetween assuming either one of two orientation states depending on a voltage applied thereto, each pixel further comprising a plurality of regions wherein strip-shaped projections having substantially equal heights are disposed at mutually different spacings, so that liquid crystal molecules in at least one of said regions are selectively switched in response to a halftone signal applied to one of the pair of opposing electrodes.

19. A device according to claim 18, wherein said liquid crystal is a chiral liquid crystal.

20. A device according to claim 18, wherein said liquid crystal is a chiral smectic liquid crystal.

21. A device according to claim 18, wherein said liquid crystal is a ferroelectric liquid crystal.

22. A device according to any one of claims 4, 18 or 10, where each said pixel includes a first region wherein a plurality of said stripe-shaped projections are disposed at a first uniform spacing, and a second region wherein a plurality of said stripe-shaped projections are disposed at a second uniform spacing different from the first uniform spacing.

23. A device according to any one of claims 4, 18 or 10, wherein each said pixel is divided into a plurality of regions such that the stripe-shaped projections are disposed at a uniform spacing in each region and the spacings indifferent different regions are different from each other.

* * * * *

UNITED STATES PATENT AND TRADEMARK OFFICE
CERTIFICATE OF CORRECTION

PATENT NO. : 5,604,613

DATED : February 18, 1997

INVENTOR(S) : KATSUHIKO SHINJO ET AL.

It is certified that error appears in the above-identified patent and that said Letters Patent is hereby corrected as shown below:

On title page,

AT [56] REFERENCES CITED

U.S. Patent Documents,
"5,327,272  7/1994  Fujwara et al." should read
--5,327,272  7/1994  Fujiwara et al.--.

FOREIGN PATENT DOCUMENTS

"3154030   7/1991   Japan
 4127124   4/1992   Japan
 4296821  10/1992   Japan" should read
--3-154030   7/1991   Japan
  4-127124   4/1992   Japan
  4-296821  10/1992   Japan--.

COLUMN 1

Line 59, "table" should read --stable--.

COLUMN 3

Line 53, "device:" should read --device--.
Line 63, "to" should read --to a--.
line 64, "device:" should read --device--.

UNITED STATES PATENT AND TRADEMARK OFFICE
CERTIFICATE OF CORRECTION

PATENT NO. : 5,604,613
DATED : February 18, 1997
INVENTOR(S) : KATSUHIKO SHINJO ET AL.

It is certified that error appears in the above-identified patent and that said Letters Patent is hereby corrected as shown below:

COLUMN 5

Line 20, "FIG. 32(a)-(b)" should read --FIGS. 32(a)-(b)--.
Line 22, "FIG. 33(a)" should read --FIG. 33--.
Line 23, "32." should read --32(a).--.
Line 35, "FIG. 39(a)-(b)" should read --FIGS. 39(a)-(b)--.
Line 40, "FIGS. 41(a)-(b)" should read --FIGS. 41(a)-(d)--.
Line 47, "FIGS. 45(a)-(b) are sectional views" should read --FIG. 45 is a sectional view--.
Line 53, "FIGS. 49(a)-(b)" should read --FIGS. 49(a)-(d)--.
Line 58, "FIGS. 51(a)-(b)" should read --FIGS. 51(a)-(d)--.
Line 65, "FIG. 54(a)-(b) are is a" should read --FIGS. 54(a)-(d) are--.

COLUMN 6

Line 1, "FIG. 55(a)-(b)" should read --FIGS. 55(a)-(d)--.
Line 3, "13." should read --13, and the accompanying voltage diagram.--.
Line 4, "FIG. 56(a)-(b)" should read --FIGS. 56(a)-(d)--.
Line 44, "Each" should read --Each of the--.

COLUMN 8

Line 58, "γare" should read --γ are--.
Line 61, "$G=\alpha'R-R^2$" should read --$G=\alpha'R-\gamma R^2$--.

UNITED STATES PATENT AND TRADEMARK OFFICE
CERTIFICATE OF CORRECTION

PATENT NO. : 5,604,613

DATED : February 18, 1997

INVENTOR(S) : KATSUHIKO SHINJO ET AL.

It is certified that error appears in the above-identified patent and that said Letters Patent is hereby corrected as shown below:

COLUMN 9

Line 13, "disadvana-" should read --disadvantageous--.
    Line 14, "geous" should be deleted.
    Line 50, "$\phi$1-50$\mu$m." should read --1-50$\mu$m.--.

COLUMN 12

Line 46, "shrinked" should read --shrunk--.

COLUMN 13

Line 44, "sponds" should read --spond--.

COLUMN 14

Line 35, "regions" should read --of regions--.
    Line 44, "may" should read --may be--.
    Line 48, "perfect" should read --perfectly--.

COLUMN 15

Line 17, "device:" should read --device--.
    Line 46, "5" should be deleted.

COLUMN 17

Line 28, "could" should be deleted.

COLUMN 18

Line 31, "unevenness" should read --unevennesses--.

UNITED STATES PATENT AND TRADEMARK OFFICE
CERTIFICATE OF CORRECTION

PATENT NO. : 5,604,613
DATED : February 18, 1997
INVENTOR(S) : KATSUHIKO SHINJO ET AL.

It is certified that error appears in the above-identified patent and that said Letters Patent is hereby corrected as shown below:

COLUMN 19

Line 20, "not understood" should read
        --not be understood--.
    Line 41, "7700 Å." should read --700 Å.--.
    Line 44, "The-thus treated" should read
        --The thus-treated--.

COLUMN 20

Line 15, "$\gamma$value." should read --$\gamma$ value.--.
    Line 59, "effecting" should be deleted.
    Line 67, "10 $\mu$m" should read --10 $\mu$m.--.

COLUMN 22

Line 36, "500 Å-trans-" should read --500 Å trans- --.

COLUMN 24

Line 29, "each" should read --to each--.
    Line 54, "a" should read --9--.

COLUMN 25

Line 67, "uniform and provided a display with"
        should be deleted.

UNITED STATES PATENT AND TRADEMARK OFFICE
CERTIFICATE OF CORRECTION

PATENT NO. : 5,604,613
DATED : February 18, 1997
INVENTOR(S) : KATSUHIKO SHINJO ET AL.

It is certified that error appears in the above-identified patent and that said Letters Patent is hereby corrected as shown below:

COLUMN 26

Line 14, "1905" should read --1912--.
Line 16, "of3" should read --of 3--.
Line 26, "were were" should read --were--.

COLUMN 27

Line 31, "disporsed" should read --disposed--.
Line 33, "an" should read --a--.

COLUMN 28

Line 29, "with" should read --with Example 16.--.
Line 30, close up spacing.
Line 32, "Example 16." should be deleted.

COLUMN 29

Line 30, "claim 4" should read --claim 4,--.

UNITED STATES PATENT AND TRADEMARK OFFICE
CERTIFICATE OF CORRECTION

PATENT NO.   :   5,604,613
DATED        :   February 18, 1997
INVENTOR(S)  :   KATSUHIKO SHINJO ET AL.

It is certified that error appears in the above-identified patent and that said Letters Patent is hereby corrected as shown below:

COLUMN 30

Line 28, "strip-shaped" should read --stripe-shaped--.
   Line 50, "indifferent" should read --in--.

Signed and Sealed this

Ninth Day of September, 1997

Attest:

BRUCE LEHMAN

Attesting Officer    Commissioner of Patents and Trademarks